United States Patent
Zhou et al.

(10) Patent No.: US 12,557,147 B2
(45) Date of Patent: Feb. 17, 2026

(54) RANDOM ACCESS METHOD, BASE STATION, USER EQUIPMENT, DEVICE AND MEDIUM

(71) Applicant: DATANG MOBILE COMMUNICATIONS EQUIPMENT CO., LTD., Beijing (CN)

(72) Inventors: Lei Zhou, Beijing (CN); Yanping Xing, Beijing (CN); Erlin Zeng, Beijing (CN); Jinhua Miao, Beijing (CN); Jing Fu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 609 days.

(21) Appl. No.: 17/914,316

(22) PCT Filed: Mar. 23, 2021

(86) PCT No.: PCT/CN2021/082277
§ 371 (c)(1),
(2) Date: Sep. 23, 2022

(87) PCT Pub. No.: WO2021/190471
PCT Pub. Date: Sep. 30, 2021

(65) Prior Publication Data
US 2023/0122052 A1   Apr. 20, 2023

(30) Foreign Application Priority Data
Mar. 25, 2020   (CN) .......................... 202010218953.0

(51) Int. Cl.
*H04W 74/0833* (2024.01)
*H04L 1/00* (2006.01)
(Continued)

(52) U.S. Cl.
CPC ....... *H04W 74/0841* (2013.01); *H04L 1/0003* (2013.01); *H04W 72/02* (2013.01);
(Continued)

(58) Field of Classification Search
CPC .. H04L 1/0038; H04L 1/0009; H04W 74/006; H04W 74/0836; H04W 74/0833;
(Continued)

(56) References Cited

U.S. PATENT DOCUMENTS 12,200,776 B2 *   1/2025   Lee .................. H04W 72/0453
2019/0116010 A1   4/2019   Li et al.
(Continued)

FOREIGN PATENT DOCUMENTS

CN    103687009 A    3/2014
CN    105898883 A    8/2016
(Continued)

OTHER PUBLICATIONS

Extended European Search Report for the corresponding European Patent Application No. 21774969.6 issued by the European Patent Office on Jul. 6, 2023.
(Continued)

*Primary Examiner* — Marcus Smith
(74) *Attorney, Agent, or Firm* — Ladas & Parry, LLP

(57) ABSTRACT

A random access method, a base station, a user equipment, a device, and a medium are provided. The method includes: obtaining uplink transmission resources for sending a MSGA by a terminal side, wherein configuring the uplink transmission resources for sending the MSGA is performed by a network side, at least two uplink transmission resources exist, sizes of uplink data blocks transmitted on different uplink transmission resources are different; selecting one of the uplink transmission resources by the terminal side according to a size of a transmitted uplink data block;
(Continued)

sending the MSGA to the network side by the terminal side on the selected uplink transmission resource; and sending MSGB by the network side after receiving the MSGA sent by the terminal.

12 Claims, 19 Drawing Sheets

(51) Int. Cl.
　　*H04W 72/02* 　　(2009.01)
　　*H04W 74/08* 　　(2024.01)
　　*H04W 74/0836* 　　(2024.01)

(52) U.S. Cl.
　　CPC ... *H04W 74/0833* (2013.01); *H04W 74/0866* (2013.01); *H04W 74/0836* (2024.01)

(58) Field of Classification Search
　　CPC ........... H04W 74/004; H04W 72/0446; H04W 72/23; H04W 72/0453; H04W 72/1268
　　See application file for complete search history.

(56) References Cited

U.S. PATENT DOCUMENTS

| | | | |
|---|---|---|---|
| 2020/0344818 A1* | 10/2020 | Höglund | H04W 74/004 |
| 2021/0243812 A1* | 8/2021 | Agiwal | H04W 74/0838 |
| 2021/0345426 A1 | 11/2021 | Liu | |
| 2021/0368493 A1 | 11/2021 | Lin | |
| 2022/0061104 A1 | 2/2022 | Sun et al. | |
| 2022/0104226 A1 | 3/2022 | Hu et al. | |
| 2022/0159740 A1* | 5/2022 | Xiong | H04W 72/0453 |
| 2022/0264659 A1* | 8/2022 | Enbuske | H04W 74/002 |
| 2022/0294588 A1* | 9/2022 | Harrison | H04W 74/0836 |
| 2022/0295480 A1* | 9/2022 | Xu | H04W 72/0446 |
| 2023/0044206 A1* | 2/2023 | Miao | H04W 72/542 |
| 2023/0072789 A1* | 3/2023 | Lei | H04L 5/10 |
| 2023/0102946 A1* | 3/2023 | Wang | H04W 74/0808 370/329 |
| 2023/0125571 A1* | 4/2023 | MolavianJazi | H04L 5/0094 370/329 |
| 2024/0049289 A1* | 2/2024 | Ko | H04W 74/0833 |
| 2025/0016845 A1* | 1/2025 | Xu | H04L 5/0007 |

FOREIGN PATENT DOCUMENTS

| | | | |
|---|---|---|---|
| CN | 109863817 A | 6/2019 | |
| CN | 110312312 A | 10/2019 | |
| CN | 110536418 A | 12/2019 | |
| CN | 110650548 A | 1/2020 | |
| CN | 110856276 A | 2/2020 | |
| CN | 111565456 A | 8/2020 | |
| CN | 111615210 A | 9/2020 | |
| IN | 109644467 A | 4/2019 | |
| WO | 2018009105 A1 | 1/2018 | |
| WO | WO-2020060371 A1 * | 3/2020 | ........... H04B 17/318 |
| WO | 2020068596 A1 | 4/2020 | |

OTHER PUBLICATIONS

"Channel structure for two-step RACH," 3GPP TSG RAN WG1 #96, R1-1902466, Athens, Greece, Feb. 25-Mar. 1, 2019, Source: Intel Corporation, Agenda Item: 7.2.1.1, all pages.
"Discussion on channel structure for 2-step RACH," 3GPP TSG RAN WG1 #97, R1-1906863, Reno, USA, May 13-17, 2019, Source: Panasonic, Agenda Item: 7.2.1.1, all pages.
"Procedures for Two-Step RACH," 3GPP TSG-RAN WG1 Meeting #98, R1-1909240, Prague, Czech Republic, Aug. 26-30, 2019, Agenda Item: 7.2.1.2 Source Qualcomm Incorporated, all pages.
International Search Report for PCT/CN2021/082277 issued on Jun. 15, 2021 and its English Translation provided by WIPO.
Written Opinion for PCT/CN2021/082277 issued on Jun. 15, 2021 and its English Translation provided by WIPO.
International Report on Patentability PCT/CN2021/082277 issued on Sep. 22, 2022 and its English Translation provided by WIPO.
"Channel structure for 2-step RACH," 3GPP TSG RAN WG1 #96bis, R1-1904280, Xi'an, China, Apr. 8-12, 2019, Source: Intel Corporation, Agenda item: 7.2.1.1, all pages.
"On 2-step RACH Channel Structure," 3GPP TSG RAN WG1 #97, R1-1906746, Reno, USA, May 13-17, 2019, Agenda item: 7.2.1.1, Source: Nokia, Nokia Shanghai Bell, all pages.
"Feature Lead Summary #2 of 7.2.1.1 Two-step RACH Channel Structure," 3GPP TSG RAN WG1 #97, R1-1907830, Reno, USA, May 13-17, 2019, Agenda Item: 7.2.1.1, Source: ZTE, all pages.
First Office Action and search report for Chinese Patent Application 202010218953.0 issued on Jun. 1, 2022 and its English Translation provided by Global Dossier.

* cited by examiner

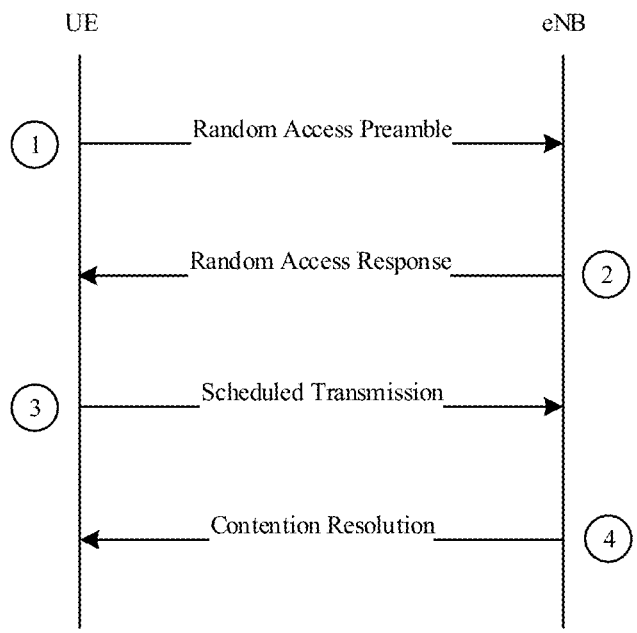

Fig. 1

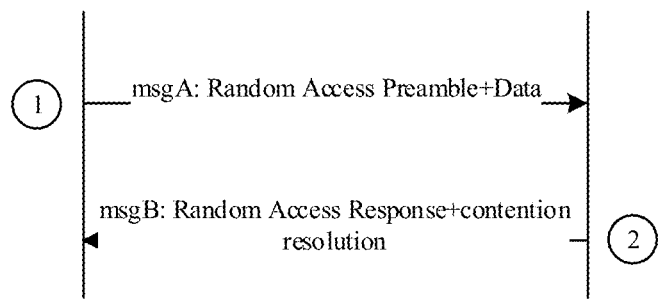

Fig. 2

Receiving a MSGA from a terminal by a network side, wherein uplink transmission resources for transmitting the MSGA are configured by the network side, at least two uplink transmission resources exist, and uplink data blocks transmitted on each of the at least two uplink transmission resources have different sizes; the terminal selects, according to a size of a transmitted uplink data block, one of the uplink transmission resources for transmitting the MSGA ⸺ 301

Sending a MSGB to the terminal by the network side ⸺ 302

Fig. 3

RANDOM ACCESS METHOD, BASE STATION, USER EQUIPMENT, DEVICE AND MEDIUM

CROSS-REFERENCE TO RELATED APPLICATIONS

This application is a U.S. national phase application of a PCT Application No. PCT/CN2021/082277 filed on Mar. 23, 2021, which claims a priority to Chinese Patent Application No. 202010218953.0 filed in China on Mar. 25, 2020, the disclosures of which are incorporated in their entireties by reference herein.

TECHNICAL FIELD

The present disclosure relates to the technical field of radio communication, in particular, relates to a random access method, a base station, a user equipment, a device, and a medium.

BACKGROUND

Four-step RACH (Random Access Channel) is described below.

A random access of LTE (Long Term Evolution) and a normal random access of NR (New Radio) are divided into two types: contention-based random access and non-contention-based random access. A procedure of the contention-based random access is as follows.

FIG. 1 is a schematic diagram of a four-step contention-based random access (4-step RACH) procedure. As shown in FIG. 1, the contention-based random access procedure is divided into four steps, i.e., 4-step RACH, which are respectively as follow:

Msg1 (message 1): UE (User Equipment) selects a random access preamble and a PRACH (Physical Random Access Channel) resource, and transmits the selected random access preamble to a base station using the PRACH resource.

Msg2 (message 2): the base station receives the preamble and sends a random access response.

Msg3 (message 3): the UE sends uplink transmission on a UL grant (uplink scheduling information) specified by the Msg2, contents of msg3 uplink transmissions according to different random access reasons are different. For example, for initial access, an RRC (Radio Resource Control) connection establishment request is transmitted in the Msg3; a C-RNTI (Cell Radio Network Temporary Identifier) MAC CE (Media Access Control Control Element) is transmitted in the Msg3 by the UE. In summary, the Msg3 sends a UE-specific identifier which is used by the base station to finally and uniquely determine the UE.

Msg4 (message 4): a contention resolution message, according to the Msg4, the UE determines whether the random access is successful. For an idle UE (UE in an idle state) or an inactive UE (an UE in an inactive state), CCCH (Common Control Channel) MAC CE (Media Access Control Control Element) is carried by Msg4 and includes contents of a RRC signaling of the Msg3. For a UE in a connected state, the Msg4 is scheduled by a PDCCH (Physical Downlink Control Channel) of a unique identifier C-RNTI of the UE in a cell, and the PDCCH can realize contention resolution. For the idle UE or the inactive UE, a temporary C-RNTI is converted into the unique identifier C-RNTI of the UE in the cell after the contention resolution is successful.

Next, two-step RACH (2-step RACH) will be described.

In a new generation radio network NR system, a two-step random access procedure (2-step RACH) is drawn on basis of the 4-step RACH and used for the contention-based random access. FIG. 2 is a schematic diagram of a two-step contention-based random access procedure (2-step RACH). As shown in FIG. 2, a msgA (message A) is divided into preamble transmission on a PRACH and data transmission on a Physical Uplink Shared Channel (PUSCH), and is equivalent to Msg1+Msg3 of the 4-step RACH; a msgB (message B) for random access response and contention resolution is equivalent to Msg2+Msg4 of the 4-step RACH. Because the msgB contains UE contention resolution information, a size of the msgB must be different from Msg2.

In a random access procedure of FIG. 2, the base station may send multiple random access responses (or data messages) to the UE, for example: random access success (success response);

a response for falling back to 4-step (fallback response);
a random access identifier (a random access ID response);
a data message.

In the MsgA of the 2-step RACH, uplink data transmission can only support transmission of small data.

A disadvantage of the related art is that the 2-step RACH in the related art does not support transmission of different data blocks.

SUMMARY

A random access method, a base station, a user equipment, a random access device, and a computer-readable storage medium are provided, for solving the problem that when a UE in a non-connected state initiates a random access procedure to a network, it is unable to flexibly provide one or more users with different data block transmissions according to needs of different users.

A random access method is provided in some embodiments, this method includes: receiving a message A (MSGA) sent by a terminal by a network side, wherein, configuring uplink transmission resources for sending the MSGA is performed by the network side, at least two uplink transmission resources exist, and sizes of uplink data blocks transmitted on the at least two uplink transmission resources are different, the terminal selects, according to a size of a transmitted uplink data block, one of the uplink transmission resources for sending the MSGA; sending a message B (MSGB) to the terminal by the network side.

During implementation, configuring the uplink transmission resources by the network side includes: configuring Physical Random Access Channel (PRACH) resources and Physical Uplink Shared Channel (PUSCH) resources, and mapping relationship between the PRACH resources and the PUSCH resources; and allocating one or more Modulation and Coding Schemes (MCSs) or Transport Block Sizes (TBSs) and time-frequency resources of uplink transmission resources corresponding to the one or more MCSs or TBSs based on a size of each uplink data block. During implementation, the mapping relationship between the PRACH resources and the PUSCH resources is established according to a following formula:

$$N_{preamble} = \text{ceil}(T_{preamble}/\alpha T_{PUSCH})$$

wherein, ceil is a function that returns a minimum integer larger than or equal to a specified expression, $T_{PUSCH} = T_{PO} * N_{DMRSperPO}$, $T_{PO} = \text{nrofslotsMsgAPUSCH} * \text{nrofMsgAPOperSlot}$, $N_{DMRSperPO}$ is obtained from msgA-DMRS-Configuration, $N_{POperTBS}$=ceil($T_{PO}/T_{TBS}$ or $T_{MCS}$), $N_{POperTBS}$ is a quantity of PUSCH transmission resources corresponding to each TBS, Tms is a total quantity of TBS indexes, and $T_{MCS}$ is a total quantity of MCS indexes, wherein the parameters have the following meanings:

$N_{preamble}$: a quantity of random access preamble (Preamble) indexes or a quantity of PRACH resources corresponding to each PUSCH resource in one cycle;

$T_{preamble}$: a total quantity of Preamble indexes or a total quantity of PRACH resources in one cycle;

$T_{PUSCH}$: a total quantity of PUSCH resources in one cycle;

$T_{PO}$: a total quantity of PUSCH transmission occasions in one cycle;

nrofslotsMsgAPUSCH: in one cycle, a total quantity of slots that can carry PUSCH transmissions;

nrofMsgAPOperSlot: a quantity of PUSCH transmission occasions in each slot;

$N_{DMRSperPO}$: a quantity of Demodulation Reference Signals (DMRS) included in each PUSCH transmission occasion;

α: an aggregation level of PUSCH resources in $T_{PO}$ within a cycle, which takes a value of α≤1.

During implementation, allocated relationship between sequence numbers of TBS indexes or MCS indexes and uplink transmission resources is: sorting PUSCH resources, by arranging PUSCH occasions in an order from low to high in a frequency domain and arranging PUSCH slot indexes in an order from low to high in a time domain; allocating one or more PUSCH occasions for multiple MCSs or TBSs, wherein $N_{POperTBS}$=ceil($T_{PO}/T_{TBS}$), a matching formula between a TBS index or a MCS index and a PUSCH is that: a j-th TBS index or a j-th MCS index corresponds to a k-th PUSCH transmission resource: jTBSindex or jMCSindex=mod(kPUSCHindex, $T_{TBS}$ or $T_{MCS}$); or, allocating $N_{POperTBS}$ to each TBS index or MCS index from low to high, starting from a lowest TBS index or MCS index; or, specifying a quantity of PUSCH occasions corresponding to MCS indexes or TBS indexes by a high-layer signaling, wherein allocation to each TBS index or MCS index is $N_1$, $N_2$, $N_3$ ... $N_n$, $N_1+N_2+N_3+...+N_n=T_{PO}$, from low to high, starting from a lowest TBS index or a lowest MCS index, wherein $N_{POperTBS}$ is a quantity of PUSCH transmission resources corresponding to each TBS or MCS, $T_{TBS}$ is a total quantity of TBS indexes, $T_{PO}$ is a total quantity of PUSCH transmission occasions within one cycle, and $T_{MCS}$ is a total quantity of MCS indexes.

During implementation, configuring by the network side is performed in one or more of the following ways: configuring uplink transmission resources and different sequence numbers of TBS indexes or MCS indexes by the network side, wherein the network side and the UE predefine the mapping relationship between the sequence numbers of TBS indexes or MCS indexes and the uplink transmission resources; or configuring a plurality of MCS indexes that can be transmitted in any uplink transmission resource in the MSGA and different sequence numbers of TBS indexes or MCS indexes by the network side, wherein, the network side does not allocate a dedicated uplink transmission resource in the MSGA for each TBS or MCS, and the network side performs blind decoding of a modulation and coding mode on the uplink transmission resources; or, configuring uplink transmission resources and mapping relationship between the uplink transmission resources and sequence numbers of TBS indexes or MCS indexes by the network side, wherein, the mapping relationship between the uplink transmission resources and the sequence numbers of TBS indexes or MCS indexes is notified to the UE through broadcasting.

During implementation, the mapping relationship between TBS indexes or MCS indexes and uplink transmission resources is indicated to the UE in one or more following ways: numbering uplink transmission resources, and predefining the mapping relationship between the TBS indexes or the MCS indexes and uplink transmission resource numbering values, and indicating the mapping relationship through the uplink transmission resource numbering values; or, predefining that TBS indexes or MCS indexes indicated through broadcast can be transmitted on any uplink transmission resource, and indicating the TBS indexes or the MCS indexes through broadcast; or, indicating the TBS indexes or the MCS indexes and corresponding uplink transmission resources through broadcast.

During implementation, in the mapping relationship between the PRACH resources and the PUSCH resources, the PRACH resources are allocated in groups, and the PUSCH resources are allocated in groups, wherein, one group of PRACH resources corresponds to at least two groups of PUSCH resources; or, one group of PRACH resources corresponds to one group of PUSCH resources.

During implementation, when one group of PRACH resources corresponds to at least two groups of PUSCH resources, each PRACH resource in one group of PRACH resources corresponds to one PUSCH resource in each group of PUSCH resources; or, one group of PRACH resources is divided into several sub-groups of PRACH resources, and each sub-group of PRACH resources corresponds to one group of PUSCH resources.

A random access method is provided in some embodiments of the present disclosure. The method includes: obtaining uplink transmission resources for sending a MSGA by a terminal side, wherein configuring the uplink transmission resources for sending the MSGA is performed by a network side, at least two uplink transmission resources exist, sizes of uplink data blocks transmitted on different uplink transmission resources are different; selecting one of the uplink transmission resources according to a size of a transmitted uplink data block; sending the MSGA to the network side on the selected uplink transmission resource.

During implementation, configuring uplink transmission resources by the network side includes: configuring PRACH resources and PUSCH resources and mapping relationship between the PRACH resources and PUSCH the resources; and allocating one or more MCSs or TBSs and time-frequency resources of uplink transmission resources corresponding to each MCS or TBS by the network side based on a size of each uplink data block.

During implementation, the mapping relationship between PRACH resources and PUSCH resources is determined by the terminal according to the following formula:

$N_{preamble}$=ceil($T_{preamble}/αT_{PUSCH}$)

where, ceil is a function that returns a minimum integer larger than or equal to a specified expression, $T_{PUSCH}=T_{PO}*N_{DMRSperPO}$, $T_{PO}$=nrofslotsMsgAPUSCH*nrofMsgAPOperSlot, $N_{DMRSperPO}$ is obtained from msgA-DMRS-Configuration, $N_{POperTBS}$=ceil($T_{PO}/T_{TBS}$ or $T_{MCS}$), $N_{POperTBS}$ is a quantity of PUSCH transmission resources corresponding to each TBS, $T_{BS}$ is a total quantity of TBS indexes, and $T_{MCS}$ is a total quantity of MCS indexes, wherein the parameters have the following meanings:

$N_{preamble}$: a quantity of Preamble indexes or a quantity of PRACH resources corresponding to each PUSCH resource in one cycle;

$T_{preamble}$: a total quantity of Preamble indexes or a total quantity of PRACH resources in one cycle;

$T_{PUSCH}$: a total quantity of PUSCH resources in one cycle;

$T_{PO}$: a total quantity of PUSCH transmission occasions in one cycle;

nrofslotsMsgAPUSCH: in one cycle, a total quantity of slots that can carry PUSCH transmissions;

nrofMsgAPOperSlot: a quantity of PUSCH transmission occasions in each slot;

$N_{DMRSperPO}$: a quantity of DMRSs included in each PUSCH transmission occasion;

α: an aggregation level of PUSCH resources in $T_{PO}$ within a cycle, which takes a value of α≤1.

During implementation, allocated relationship between sequence numbers of TBS indexes or MCS indexes and uplink transmission resources is: sorting PUSCH resources, by arranging PUSCH occasions in an order from low to high in a frequency domain and arranging PUSCH slot indexes in an order from low to high in a time domain; allocating one or more PUSCH occasions for multiple MCSs or TBSs, wherein $N_{POperTBS}$=ceil($T_{PO}/T_{TBS}$), a matching formula between a TBS index or a MCS index and a PUSCH is that: a j-th TBS index or a j-th MCS index corresponds to a k-th PUSCH transmission resource: jTBSindex or jMCSindex=mod (kPUSCHindex, $T_{TBS}$ or $T_{MCS}$); or, allocating $N_{POperTBS}$ to each TBS index or MCS index from low to high, starting from a lowest TBS index or MCS index; or, specifying a quantity of PUSCH occasions corresponding to MCS indexes or TBS indexes by a high-layer signaling, wherein allocation to each TBS index or MCS index is $N_1$, $N_2$, $N_3$ ... $N_n$, $N_1+N_2+N_3+ ... +N_n=T_{PO}$, from low to high, starting from a lowest TBS index or a lowest MCS index, wherein $N_{POperTBS}$ is a quantity of PUSCH transmission resources corresponding to each TBS or MCS, $T_{TBS}$ is a total quantity of TBS indexes, $T_{PO}$ is a total quantity of PUSCH transmission occasions within one cycle, and $T_{MCS}$ is a total quantity of MCS indexes.

During implementation, configuration performed by the network side is determined in one or more of the following ways: determining uplink transmission resources and TBSs or MCSs configured by the network side by the terminal, according to the mapping relationship between sequence numbers of TBS indexes or MCS indexes and uplink transmission resources agreed on by the terminal and the network side in advance; or determining by the terminal that the MSGA is sent on any uplink transmission resource in the MSGA configured by the network side, according to the MCS index and correspondence between the sequence numbers of TBS indexes or MCS indexes and the uplink transmission resources; or determining the uplink transmission resources and the TBSs or MCSs configured by the network side by the terminal, according to the mapping relationship between the sequence numbers of TBS indexes or MCS indexes and the uplink transmission resources broadcast by the network side.

During implementation, determining the uplink transmission resources and the TBSs or the MCSs configured by the network side by the terminal includes: determining the TBSs or the MCSs and the PRACH resources and the PUSCH resources in the MSGA from a received broadcast signaling; determining, according to the mapping relationship, a quantity of information bits that can be carried in each uplink transmission resource in the MSGA; selecting one of the uplink transmission resources according to a size of an uplink data block to be transmitted and determining a corresponding TBS or MCS.

During implementation, determining the uplink transmission resources and the TBSs or the MCSs configured by the network side by the terminal includes: determining, from a received broadcast signaling, sequence numbers of TBS indexes or MCS indexes and PRACH resources and PUSCH resources in the MSGA allocated for the sequence numbers of TBS indexes or MCS indexes; determining a quantity of information bits that can be carried in each uplink transmission resource in the MSGA corresponding to each TBS index sequence number or MCS index sequence number; selecting one of the uplink transmission resources according to a size of an uplink data block to be transmitted and determining a corresponding TBS or MCS by the terminal.

During implementation, determining the corresponding TBS or MCS by the terminal includes: if the broadcast signaling includes a fixed MCS level, determining the corresponding TBS by the terminal; if the broadcast signaling includes a plurality of MCS levels, selecting one or more MCS levels that can match a RSRP and/or a SINK, and selecting a lowest MCS level as a finally transmitted MCS level, in case that a plurality of matched MCS levels exist.

During implementation, when a plurality of uplink transmission resources are selectable for an MCS level, the terminal randomly selects an uplink transmission resource from the plurality of uplink transmission resources, or selects an uplink transmission resource according to time-frequency resource timing of the uplink transmission resources.

During implementation, the mapping relationship between the TBS indexes or MCS indexes and uplink transmission resources is determined by the terminal according to indication sent by the network side in one or more following ways: determining uplink transmission resource numbering values, and determining the mapping relationship from the uplink transmission resource numbering values, wherein the mapping relationship between TBS indexes or MCS indexes and the uplink transmission numbering values is predefined; or determining that a TBS index or a MCS index can be sent on any uplink transmission resource according to the TBS index or the MCS index indicated through broadcast, wherein, that the TBS index or the MCS index indicated through broadcast can be sent on any uplink transmission resource is predefined; or, determining the TBS index or the MCS index and a corresponding uplink transmission resource according to a broadcast indication.

During implementation, in the mapping relationship between the PRACH resources and the PUSCH resources, the PRACH resources are allocated in groups, and the PUSCH resources are allocated in groups, wherein, one group of PRACH resources corresponds to at least two groups of PUSCH resources; or, one group of PRACH resources corresponds to one group of PUSCH resources.

During implementation, when one group of PRACH resources corresponds to at least two groups of PUSCH resources, each PRACH resource in one group of PRACH resources corresponds to one PUSCH resource in each group of PUSCH resources; or, one group of PRACH resources is divided into several sub-groups of PRACH resources, and each sub-group of PRACH resources corresponds to one group of PUSCH resources.

A base station is provided in some embodiments of the present disclosure. The base station includes: a processor configured for reading a program in a memory to perform the following: receiving a message A (MSGA) sent by a terminal, wherein, configuring uplink transmission resources for sending the MSGA is performed by a network side, at least two uplink transmission resources exist, and sizes of uplink data blocks transmitted on the at least two uplink transmission resources are different, the terminal selects, according to a size of a transmitted uplink data block, one of the uplink transmission resources for sending the MSGA; sending a message B (MSGB) to the terminal by the network side; a transceiver configured for receiving and transmitting data under the control of the processor.

During implementation, configuring the uplink transmission resources by the network side includes: configuring Physical Random Access Channel (PRACH) resources and Physical Uplink Shared Channel (PUSCH) resources, and mapping relationship between the PRACH resources and the PUSCH resources; and allocating one or more Modulation and Coding Schemes (MCSs) or Transport Block Sizes (TBSs) and time-frequency resources of uplink transmission resources corresponding to the one or more MCSs or TBSs based on a size of each uplink data block.

During implementation, the mapping relationship between the PRACH resources and the PUSCH resources is established according to a following formula:

$$N_{preamble} = \text{ceil}(T_{preamble}/\alpha T_{PUSCH})$$

wherein, ceil is a function that returns a minimum integer larger than or equal to a specified expression, $T_{PUSCH} = T_{PO} * N_{DMRSperPO}$, $T_{PO}$=nrofslotsMsgAPUSCH*nrofMsgAPOperSlot, $N_{DMRSperPO}$ is obtained from msgA-DMRS-Configuration, $N_{POperTBS} = \text{ceil}(T_{PO}/T_{TBS}$ or $T_{MCS})$, $N_{POperTBS}$ is a quantity of PUSCH transmission resources corresponding to each TBS, $T_{TBS}$ is a total quantity of TBS indexes, and $T_{MCS}$ is a total quantity of MCS indexes, wherein the parameters have the following meanings:

$N_{preamble}$: a quantity of random access preamble (Preamble) indexes or a quantity of PRACH resources corresponding to each PUSCH resource in one cycle;

$T_{preamble}$: a total quantity of Preamble indexes or a total quantity of PRACH resources in one cycle;

$T_{PUSCH}$: a total quantity of PUSCH resources in one cycle;

$T_{PO}$: a total quantity of PUSCH transmission occasions in one cycle;

nrofslotsMsgAPUSCH: in one cycle, a total quantity of slots that can carry PUSCH transmissions;

nrofMsgAPOperSlot: a quantity of PUSCH transmission occasions in each slot;

$N_{DMRSperPO}$: a quantity of Demodulation Reference Signals (DMRS) included in each PUSCH transmission occasion;

α: an aggregation level of PUSCH resources in $T_{PO}$ within a cycle, which takes a value of α≤1.

During implementation, allocated relationship between sequence numbers of TBS indexes or MCS indexes and uplink transmission resources is: sorting PUSCH resources, by arranging PUSCH occasions in an order from low to high in a frequency domain and arranging PUSCH slot indexes in an order from low to high in a time domain; allocating one or more PUSCH occasions for multiple MCSs or TBSs, wherein $N_{POperTBS} = \text{ceil}(T_{PO}/T_{TBS})$, a matching formula between a TBS index or a MCS index and a PUSCH is that: a j-th TBS index or a j-th MCS index corresponds to a k-th PUSCH transmission resource: jTBSindex or jMCSindex=mod(kPUSCHindex, $T_{TBS}$ or $T_{MCS}$); or, allocating $N_{POperTBS}$ to each TBS index or MCS index from low to high, starting from a lowest TBS index or MCS index; or, specifying a quantity of PUSCH occasions corresponding to MCS indexes or TBS indexes by a high-layer signaling, wherein allocation to each TBS index or MCS index is $N_1$, $N_2$, $N_3$ ... $N_n$, $N_1+N_2+N_3+ \ldots +N_n=T_{PO}$, from low to high, starting from a lowest TBS index or a lowest MCS index, wherein $N_{POperTBS}$ is a quantity of PUSCH transmission resources corresponding to each TBS or MCS, $T_{TBS}$ is a total quantity of TBS indexes, $T_{PO}$ is a total quantity of PUSCH transmission occasions within one cycle, and $T_{MCS}$ is a total quantity of MCS indexes.

During implementation, configuring is performed in one or more of the following ways: configuring uplink transmission resources and different sequence numbers of TBS indexes or MCS indexes, wherein the network side and the UE predefine the mapping relationship between the sequence numbers of TBS indexes or MCS indexes and the uplink transmission resources; or configuring a plurality of MCS indexes that can be transmitted in any uplink transmission resource in the MSGA and different sequence numbers of TBS indexes or MCS indexes, wherein, the network side does not allocate a dedicated uplink transmission resource in the MSGA for each TBS or MCS, and the network side performs blind decoding of a modulation and coding mode on the uplink transmission resources; or, configuring uplink transmission resources and mapping relationship between the uplink transmission resources and sequence numbers of TBS indexes or MCS indexes, wherein, the mapping relationship between the uplink transmission resources and the sequence numbers of TBS indexes or MCS indexes is notified to the UE through broadcasting.

During implementation, the mapping relationship between TBS indexes or MCS indexes and uplink transmission resources is indicated to the UE in one or more following ways: numbering uplink transmission resources, and predefining the mapping relationship between the TBS indexes or the MCS indexes and uplink transmission resource numbering values, and indicating the mapping relationship through the uplink transmission resource numbering values; or, predefining that TBS indexes or MCS indexes indicated through broadcast can be transmitted on any uplink transmission resource, and indicating the TBS indexes or the MCS indexes through broadcast; or, indicating the TBS indexes or the MCS indexes and corresponding uplink transmission resources through broadcast.

During implementation, in the mapping relationship between the PRACH resources and the PUSCH resources, the PRACH resources are allocated in groups, and the PUSCH resources are allocated in groups, wherein, one group of PRACH resources corresponds to at least two groups of PUSCH resources; or, one group of PRACH resources corresponds to one group of PUSCH resources.

During implementation, when one group of PRACH resources corresponds to at least two groups of PUSCH resources, each PRACH resource in one group of PRACH resources corresponds to one PUSCH resource in each group of PUSCH resources; or, one group of PRACH resources is divided into several sub-groups of PRACH resources, and each sub-group of PRACH resources corresponds to one group of PUSCH resources.

A user equipment is provided in some embodiments of the present disclosure. The user equipment includes: a processor configured for reading a program in a memory to perform the following: obtaining uplink transmission resources for sending a MSGA, wherein configuring the uplink transmission resources for sending the MSGA is performed by a network side, at least two uplink transmission resources exist, sizes of uplink data blocks transmitted on different uplink transmission resources are different; selecting one of the uplink transmission resources according to a size of a transmitted uplink data block; sending the MSGA to a network side on the selected uplink transmission resource; a transceiver configured for receiving and transmitting data under the control of the processor.

During implementation, configuring uplink transmission resources by the network side includes: configuring PRACH resources and PUSCH resources and mapping relationship between the PRACH resources and PUSCH the resources; and allocating one or more MCSs or TBSs and time-frequency resources of uplink transmission resources corresponding to each MCS or TBS by the network side based on a size of each uplink data block.

During implementation, the mapping relationship between PRACH resources and PUSCH resources is determined according to the following formula:

$$N_{preamble} = \text{ceil}(T_{preamble}/\alpha T_{PUSCH})$$

where, ceil is a function that returns a minimum integer larger than or equal to a specified expression, $T_{PUSCH} = T_{PO} * N_{DMRSperPO}$, $T_{PO}$=nrofslotsMsgAPUSCH*nrofMsgAPOperSlot, * nrofMsgAPOperSlot, $N_{DMRSperPO}$ is obtained from msgA-DMRS-Configuration, $N_{POperTBS}$=ceil ($T_{PO}/T_{TBS}$ or $T_{MCS}$), $N_{POperTBS}$ is a quantity of PUSCH transmission resources corresponding to each TBS, $T_{TBS}$ is a total quantity of TBS indexes, and $T_{MCS}$ is a total quantity of MCS indexes, wherein the parameters have the following meanings:

$N_{preamble}$: a quantity of random access preamble (Preamble) indexes or a quantity of PRACH resources corresponding to each PUSCH resource in one cycle;

$T_{preamble}$: a total quantity of Preamble indexes or a total quantity of PRACH resources in one cycle;

$T_{PUSCH}$: a total quantity of PUSCH resources in one cycle;

$T_{PO}$: a total quantity of PUSCH transmission occasions in one cycle;

nrofslotsMsgAPUSCH: in one cycle, a total quantity of slots that can carry PUSCH transmissions;

nrofMsgAPOperSlot: a quantity of PUSCH transmission occasions in each slot;

$N_{DMRSperPO}$: a quantity of Demodulation Reference Signals (DMRS) included in each PUSCH transmission occasion;

α: an aggregation level of PUSCH resources in $T_{PO}$ within a cycle, which takes a value of α≤1.

$N_{preamble}$: a quantity of random access preamble (Preamble) indexes or a quantity of PRACH resources corresponding to each PUSCH resource in one cycle;

$T_{preamble}$: a total quantity of Preamble indexes or a total quantity of PRACH resources in one cycle;

$T_{PUSCH}$: a total quantity of PUSCH resources in one cycle;

$T_{PO}$: a total quantity of PUSCH transmission occasions in one cycle;

nrofslotsMsgAPUSCH: in one cycle, a total quantity of slots that can carry PUSCH transmissions;

nrofMsgAPOperSlot: a quantity of PUSCH transmission occasions in each slot;

$N_{DMRSperPO}$: a quantity of Demodulation Reference Signals (DMRS) included in each PUSCH transmission occasion;

α: an aggregation level of PUSCH resources in $T_{PO}$ within a cycle, which takes a value of α≤1.

During implementation, allocated relationship between sequence numbers of TBS indexes or MCS indexes and uplink transmission resources is: sorting PUSCH resources, by arranging PUSCH occasions in an order from low to high in a frequency domain and arranging PUSCH slot indexes in an order from low to high in a time domain; allocating one or more PUSCH occasions for multiple MCSs or TBSs, wherein $N_{POperTBS}$=ceil($T_{PO}/T_{TBS}$), a matching formula between a TBS index or a MCS index and a PUSCH is that: a j-th TBS index or a j-th MCS index corresponds to a k-th PUSCH transmission resource: jTBSindex or jMCSindex=mod(kPUSCHindex, $T_{TBS}$ or $T_{MCS}$); or, allocating $N_{POperTBS}$ to each TBS index or MCS index from low to high, starting from a lowest TBS index or MCS index; or, specifying a quantity of PUSCH occasions corresponding to MCS indexes or TBS indexes by a high-layer signaling, wherein allocation to each TBS index or MCS index is $N_1$, $N_2$, $N_3$ ... $N_n$, $N_1+N_2+N_3+ ... +N_n=T_{PO}$, from low to high, starting from a lowest TBS index or a lowest MCS index, wherein $N_{POperTBS}$ is a quantity of PUSCH transmission resources corresponding to each TBS or MCS, $T_{TBS}$ is a total quantity of TBS indexes, $T_{PO}$ is a total quantity of PUSCH transmission occasions within one cycle, and $T_{MCS}$ is a total quantity of MCS indexes.

During implementation, configuration performed by the network side is determined in one or more of the following ways: determining uplink transmission resources and TBSs or MCSs configured by the network side by the user equipment, according to the mapping relationship between sequence numbers of TBS indexes or MCS indexes and uplink transmission resources agreed on by the user equipment and the network side in advance; or determining that the MSGA is sent on any uplink transmission resource in the MSGA configured by the network side, according to the MCS index and correspondence between the sequence numbers of TBS indexes or MCS indexes and the uplink transmission resources; or determining the uplink transmission resources and the TBSs or MCSs configured by the network side, according to the mapping relationship between the sequence numbers of TBS indexes or MCS indexes and the uplink transmission resources broadcast by the network side.

During implementation, determining the uplink transmission resources and the TBSs or the MCSs configured by the network side includes: determining the TBSs or the MCSs and the PRACH resources and the PUSCH resources in the MSGA from a received broadcast signaling; determining, according to the mapping relationship, a quantity of information bits that can be carried in each uplink transmission resource in the MSGA; selecting one of the uplink transmission resources according to a size of an uplink data block to be transmitted and determining a corresponding TBS or MCS.

During implementation, determining the uplink transmission resources and the TBSs or the MCSs configured by the network side includes: determining, from a received broadcast signaling, sequence numbers of TBS indexes or MCS indexes and PRACH resources and PUSCH resources in the MSGA allocated for the sequence numbers of TBS indexes or MCS indexes; determining a quantity of information bits that can be carried in each uplink transmission resource in the MSGA corresponding to each TBS index sequence number or MCS index sequence number; selecting one of the uplink transmission resources according to a size of an uplink data block to be transmitted and determining a corresponding TBS or MCS.

During implementation, determining the corresponding TBS or MCS includes: if the broadcast signaling includes a fixed MCS level, determining the corresponding TBS; if the broadcast signaling includes a plurality of MCS levels, selecting one or more MCS levels that can match a RSRP and/or a SINK, and selecting a lowest MCS level as a finally transmitted MCS level, in case that a plurality of matched MCS levels exist.

During implementation, when a plurality of uplink transmission resources are selectable for an MCS level, an uplink transmission resource is randomly selected from the plurality of uplink transmission resources, or an uplink transmission resource is selected according to time-frequency resource timing of the uplink transmission resources.

During implementation, the mapping relationship between the TBS indexes or MCS indexes and uplink transmission resources is determined according to indication sent by the network side in one or more following ways: determining uplink transmission resource numbering values, and determining the mapping relationship from the uplink transmission resource numbering values, wherein the mapping relationship between TBS indexes or MCS indexes and the uplink transmission numbering values is predefined; or determining that a TBS index or a MCS index can be sent on any uplink transmission resource according to the TBS index or the MCS index indicated through broadcast, wherein, that the TBS index or the MCS index indicated through broadcast can be sent on any uplink transmission resource is predefined; or, determining the TBS index or the MCS index and a corresponding uplink transmission resource according to a broadcast indication.

During implementation, in the mapping relationship between the PRACH resources and the PUSCH resources, the PRACH resources are allocated in groups, and the PUSCH resources are allocated in groups, wherein, one group of PRACH resources corresponds to at least two groups of PUSCH resources; or, one group of PRACH resources corresponds to one group of PUSCH resources.

During implementation, when one group of PRACH resources corresponds to at least two groups of PUSCH resources, each PRACH resource in one group of PRACH resources corresponds to one PUSCH resource in each group of PUSCH resources; or, one group of PRACH resources is divided into several sub-groups of PRACH resources, and each sub-group of PRACH resources corresponds to one group of PUSCH resource.

A random access device is provided in some embodiments of the present disclosure, the random access device includes: a network-side reception module, configured for receiving a message A (MSGA) sent by a terminal, wherein, configuring uplink transmission resources for sending the MSGA is performed by a network side, at least two uplink transmission resources exist, and sizes of uplink data blocks transmitted on the at least two uplink transmission resources are different, the terminal selects, according to a size of a transmitted uplink data block, one of the uplink transmission resources for sending the MSGA; a network-side transmission module, configured for sending a message B (MSGB) to the terminal.

A random access device is provided in some embodiments of the present disclosure. The device includes: a terminal-side obtaining module, configured for obtaining uplink transmission resources for sending a MSGA, wherein configuring the uplink transmission resources for sending the MSGA is performed by a network side, at least two uplink transmission resources exist, sizes of uplink data blocks transmitted on different uplink transmission resources are different; a terminal-side selection module, configured for selecting one of the uplink transmission resources according to a size of a transmitted uplink data block; a terminal-side sending module, configured for sending the MSGA to the network side on the selected uplink transmission resource.

A computer-readable storage medium is provided in some embodiments of the present disclosure, wherein the computer-readable storage medium stores a program for performing steps of the random access methods provided above.

Beneficial effects of the present disclosure are as follow: in the technical solutions provided by some embodiments of the present disclosure, since the network side configures multiple uplink transmission resources for transmitting MSGAs in the random access procedure and sizes of uplink data blocks transmitted on the uplink transmission resources are different, and the terminal may select one of the uplink transmission resources to transmit the MSGA according to the size of the transmitted uplink data block. Since the terminal can select corresponding uplink transmission resources according to the size of the data block needing to be transmitted by the terminal itself, it can also flexibly provide different data block transmissions for one or more users according to the requirements of different users.

BRIEF DESCRIPTION OF THE DRAWINGS

The drawings described herein are intended to facilitate further understanding of the present disclosure and form a part of the present disclosure, and illustrative embodiments of the present disclosure and description of the present disclosure are intended to explain the present disclosure and are not intended to unduly limit the present disclosure.

FIG. 1 is a schematic diagram of a four-step contention-based random access procedure (4-step RACH) in the Background;

FIG. 2 is a schematic diagram of a two-step contention-based random access procedure (2-step RACH) in the Background;

FIG. 3 is a schematic flowchart of a random access method at a network side according to some embodiments of the present disclosure;

DETAILED DESCRIPTION

In the course of designing the present invention, the inventor notes that: the number of bits supported by uplink data transmission PUSCH in the MsgA in 2-step RACH is limited to 56 bits or 72 bits, and in a non-connected state, a network does not support transmission of large data blocks (600-800 bits or even 1000 bits).

In addition, the relate art does not support transmission of multiple data block types.

The network supports that only a fixed Modulation and coding scheme (MCS) and a fixed time-frequency resource are allocated to PUSCH in advance, to support transmission of a small number of bits.

Based on this, the technical solutions provided by some embodiments of the present disclosure will, in a process of initiating the random access to the network by the UE, and when the UE is in the non-connected state, flexibly provide different data block transmissions for one or more users according to different needs of the users. Specific embodiments of the present disclosure are described below in conjunction with the accompanying drawings.

In the course of illustration, explanation will be made from implementations at the UE side and at the base station side, respectively, and then an example of cooperative implementation of the UE and the base station will be given to better understand the implementation of the schemes given in some embodiments of the present disclosure. Such description does not mean that the UE and the base station must be implemented together or separately, but in fact, when the UE and the base station are implemented separately, the problems at the UE side and at the base station side are also separately solved, and when the UE and the base station are used in combination, better technical results may be obtained.

FIG. 3 is a schematic flowchart of a random access method at a network side, and as shown in the figure, the method may include steps 301 and 302.

Step 301: receiving a MSGA from a terminal by a network side, wherein uplink transmission resources for transmitting the MSGA are configured by the network side, at least two uplink transmission resources exist, and uplink data blocks transmitted on each of the at least two uplink transmission resources have different sizes; the terminal selects, according to a size of a transmitted uplink data block, one of the uplink transmission resources for transmitting the MSGA.

Step 302: sending a MSGB to the terminal by the network side.

Figure 4:
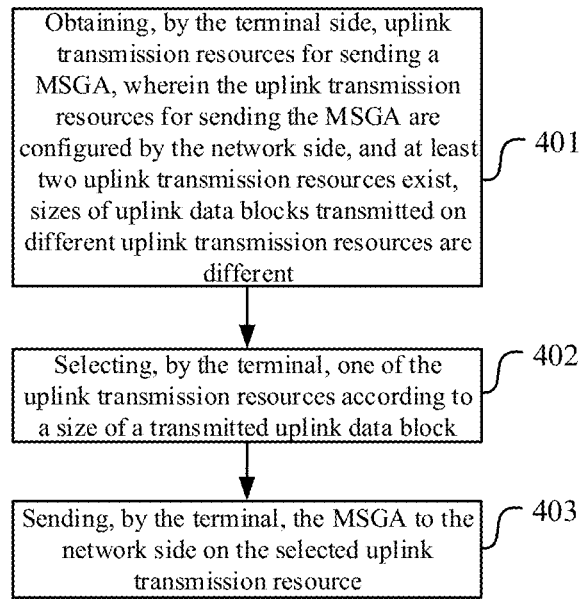
FIG. 4 is a flowchart of a random access method at a terminal side according to some embodiments of the present disclosure.

FIG. 4 is a schematic flowchart of implementation of a random access method at the terminal side, as shown in FIG. 4, the method may include steps 401-403.

Step 401: obtaining, by the terminal side, uplink transmission resources for sending a MSGA, wherein the uplink transmission resources for sending the MSGA are configured by the network side, and at least two uplink transmission resources exist, sizes of uplink data blocks transmitted on different uplink transmission resources are different.

Step 402: selecting, by the terminal, one of the uplink transmission resources according to a size of a transmitted uplink data block.

Step 403: sending, by the terminal, the MSGA to the network side on the selected uplink transmission resource.

Specifically, the network side can support simultaneous transmissions of multiple types (including more than 2 types) of uplink data block sizes (from tens of bits to thousands of bits) for the MSGA in the procedure of 2-step RACH. Different data blocks are allocated to one or more MCSs and time-frequency resources corresponding to the one or more MCS through network configuration or physical layer mapping, and a network also configures mapping relationship between PRACH resources and PUSCH resources in the MSGA, or mapping relationship between PRACH resources and PUSCH resources in the MSGA is also predefined by the network and the terminal. The terminal calculates a carry capacity of each uplink transmission resource of the MSGA according to the network configuration and compares that with actually transmitted data of the terminal, and finds an appropriate MSGA uplink transmission resource for transmitting uplink data.

During implementation, configuring uplink transmission resources at the network side includes configuring PRACH resources and PUSCH resources, and mapping relationship between PRACH resources and PUSCH resources; and further includes: allocating one or more MCSs or TBSs and time-frequency resources of uplink transmission resources corresponding to each MCS or TBS by the network side based on a size of each uplink data block.

Specifically, from the perspective of the network side, a procedure mainly includes following four steps:

1. the network configures multiple MSGA uplink transmission resources to support simultaneous transmissions of more than two uplink data block sizes (from tens of bits to thousands of bits);

2. the uplink transmission resources include PRACH resources and PUSCH resources, and the network configures the PRACH resources and the PUSCH resources and the mapping relationship, and allocates one or more MCSs and corresponding time-frequency resources for multiple (more than two) uplink data block sizes;

3. the network receives the MSGA from the terminal;

4. the network sends an MSGB to the terminal, that is, sends a random access response (RAR) to the terminal.

From the perspective of the terminal side, a procedure mainly includes following three steps:

1. the UE obtains a plurality of sets of MSGA configurations from the network side;

2. the UE selects a set of MSGA configurations based on specific rules, such as RSRP (Reference Signal Received Power), SINR (Signal to Interference plus Noise Ratio), and a size of transmitted data;

3. the UE performs MSGA transmission according to the selected set of configurations.

Figure 5:
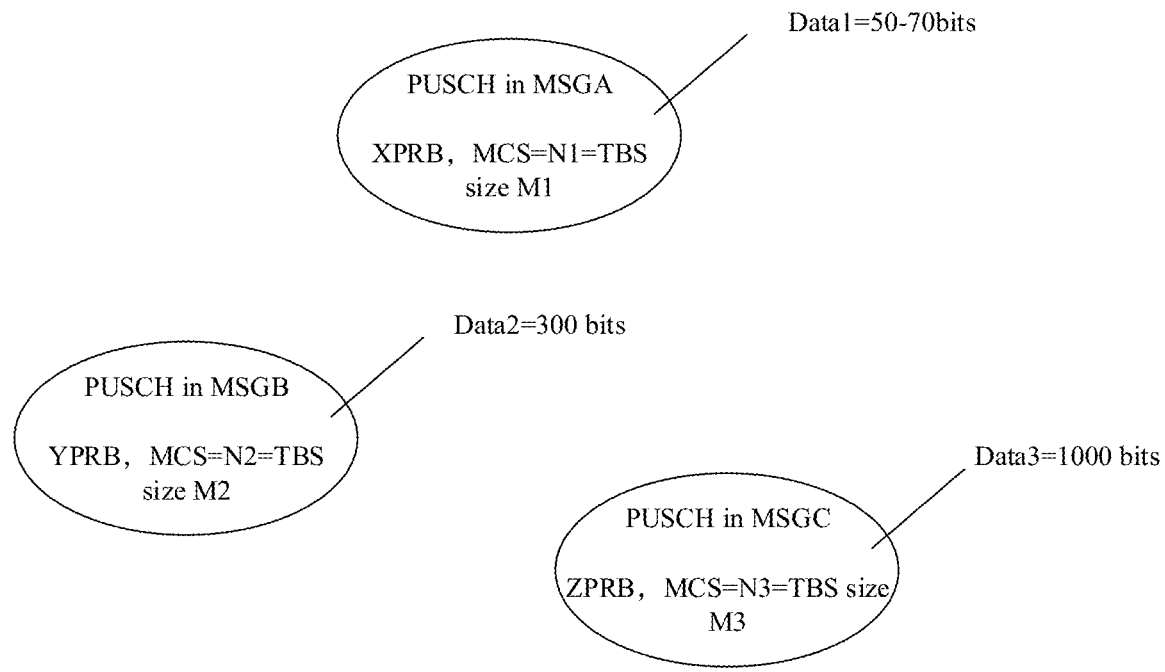
FIG. 5 is a schematic diagram of resource allocation according to some embodiments of the present disclosure.

FIG. 5 is a schematic diagram of resource allocation, and as shown in FIG. 5, three sizes of uplink data blocks to be transmitted by MSGA uplink transmission resources are configured, respectively, i.e., as shown in FIG. 5, Data1 is 50-70 bits, Data2 is 300 bits, and Data3 is 1000 bits. As shown in the FIG. 5, corresponding uplink transmission resources PUSCH in the MSGA are respectively:

Data1: XPRB (physical resource block), MCS=N1=TBS (Transport-block Size) size M1;

Data: YPRB, MCS=N2=TBS size M2;

Data3: ZPRB, MCS=N3=TBS size M3.

During implementation, the mapping relationship between PRACH resources and PUSCH resources may be established according to the following formula:

$$N_{preamble}=\text{ceil}(T_{preamble}/\alpha T_{PUSCH})$$

Where, ceil is a function that returns the minimum integer larger than or equal to a specified expression, $T_{PUSCH}=T_{PO}*N_{DMRSperPO}$, $T_{PO}=\text{nrofslotsMsgAPUSCH}*\text{nrofMsgAPOperSlot}$, $N_{DMRSperPO}$ is obtained from msgA-DMRS-Configuration, $N_{POperTBS}=\text{ceil}(T_{PO}/T_{TBS}$ or $T_{MCS})$, $N_{POperTBS}$ is the number of PUSCH transmission resources corresponding to each TBS, $T_{TBS}$ is the total number of TBS indexes, and $T_{MCS}$ is the total number of MCS indexes, where each parameter has the following meanings:

$N_{preamble}$: the number of preamble indexes or the number of PRACH resources corresponding to each PUSCH resource in one cycle;

$T_{preamble}$: the total number of preamble indexes or the total number of PRACH resources in one cycle;

$T_{PUSCH}$: the total number of PUSCH resources in one cycle;

$T_{PO}$: the total number of PUSCH transmission occasions in one cycle;

nrofslotsMsgAPUSCH: in one cycle, the total number of slots that can carry PUSCH transmissions;

nrofMsgAPOperSlot: the number of PUSCH transmission occasions in each slot;

$N_{DMRSperPO}$: the number of DMRSs (demodulated reference signals) included in each PUSCH transmission occasion;

α: an aggregation level of PUSCH resources in $T_{PO}$ within a cycle, which takes a value of α≤1.

Reference is made to Example 9 below for a specific implementation of α.

During implementation, allocation relationship between sequence numbers of TBS indexes or sequence numbers of MCS indexes and uplink transmission resources may be as follow:

ordering the PUSCH resources, where PUSCH occasions are arranged from low to high in a frequency domain and PUSCH slot indexes are arranged from low to high in a time domain;

allocating one or more PUSCH occasions for multiple MCSs or TBSs, where $N_{POperTBS}=\text{ceil}(T_{PO}/T_{TBS})$, a matching formula between a TBS index or a MCS index and a PUSCH is: the j-th TBS index or MCS index corresponds to the k-th PUSCH transmission resource:

jTBSindex or jMCSindex=mod (kPUSCHindex , $T_{TBS}$ or $T_{MCS}$); or, allocating $N_{POperTBS}$ for each TBS index or MCS index in an order from low to high, starting from the lowest TBS index or MCS index;

or, specifying the number of PUSCH occasions corresponding to the MCS index or the TBS index through a high-layer signaling, wherein allocation for each TBS index or the MCS index in an order from low to high starting from the lowest TBS index or MCS index is $N_1$, $N_2$, $N_3$ ... $N_n$, $N_1+N_2+N_3+ ... +N_n=T_{PO}$;

wherein $N_{POperTBS}$ is the number of PUSCH transmission resources corresponding to each TBS or MCS, $T_{TBS}$ is the total number of TBS indexes, $T_{PO}$ is the total number of PUSCH transmission occasions within one cycle, and $T_{MCS}$ is the total number of MCS indexes.

Specifically, a rule that the TBS or MCS corresponds to the PUSCH may be implemented as follows:

firstly, the PUSCH resources are sorted, a principle of the sorting is to start with the lowest PUSCH slot index, arrange the PUSCH occasions in the frequency domain from low to high, and then arrange the PUSCH slot indexes from low to high;

then, one or more PUSCH occasions may be allocated to a plurality of MCSs/TBSs, and the principle of the allocating is $N_{POperTBS}=\text{ceil}(T_{PO}/T_{TBS})$, $N_{POperTBS}$ is the number of PUSCH transmission resources corresponding to each TBS, $T_{TBS}$ is the total number of TBS indexes; in order to reduce the influence of frequency-domain fading channels, the matching formula between a TBS index and a PUSCH is that: the j-th TBS index corresponds to the k-th PUSCH transmission resource:

jTBSindex or jMCSindex=mod(kPUSCHindex, $T_{TBS}$ or $T_{MCS}$;

or, $N_{POperTBS}$ may be allocated to each TBS index from low to high, starting from the lowest TBS index.

During implementation, the above TBS may be equivalently replaced by MCS.

Optionally, another way is that the number of PUSCH occasions corresponding to the MCS index is directly specified by the high-layer signaling; the principle of this corresponding is that allocation of each TBS index is $N_1$, $N_2$, $N_3$ ... $N_n$, $N_1+N_2+N_3+ ... +N_n=T_{PO}$, from low to high, starting from the lowest TBS index.

1. implementation of resource configuration at the network side will be described hereinafter.

During implementation, the network side may perform configuration in one or more of the following ways:

the network side configures uplink transmission resources and different sequence numbers of TBS indexes or sequence numbers of MCS indexes, wherein the network side and the UE predefine mapping relationship between the sequence numbers of the TBS indexes or the sequence numbers of the MCS indexes and the uplink transmission resources; or the network side configures a plurality of MCS indexes that can be transmitted in any uplink transmission resource in the MSGA and different sequence numbers of TBS indexes or sequence numbers of MCS indexes, wherein, the network does not allocate a dedicated uplink transmission resource in the MSGA for each TB S or MCS, and the network side performs blind decoding of a modulation mode on the uplink transmission resource; or, the network side configures uplink transmission resources, and mapping relationship between the uplink transmission resources and sequence numbers of TBS indexes or sequence numbers of MCS indexes, wherein, the network side notifies the UE of the mapping relationship between the uplink transmission resources and sequence numbers of TBS indexes or sequence numbers of MCS indexes through broadcasting.

Specifically, when the network side performs resource configuration, the network side broadcasts specific information and number of TBSs or MCSs that need to be supported, and uplink transmission resources of the MSGA. There are at least three modes of the configuration at the network side:

1. first mode:

the network side configures all MSGA uplink transmission resources (including preamble resources and PUSCH uplink transmission resources) and different sequence numbers of TBS indexes or sequence numbers of MCS indexes corresponding to the MSGA uplink transmission resources; in this mode, the network side and the UE need to agree on mapping relationship between sequence numbers of TBS indexes or sequence numbers of MCS indexes and the MSGA uplink transmission resources.

2. second mode:

a plurality of sequence numbers of MCS indexes is configured by the network side, and the MCSs can be transmitted by any uplink transmission resource in the MSGA; the network does not need to allocate dedicated uplink transmission resources in the MSGA for each MCS; the network side in this mode needs to perform blind decoding to a modulation mode on the uplink transmission resource.

3. third mode:

the network side directly broadcasts sequence numbers of TBS indexes or sequence numbers of MCS indexes and corresponding MSGA uplink transmission resources (including preamble resources+PUSCH uplink transmission resources), and in this mode, the network side and the UE do not need to agree on mapping relationship between sequence numbers of TBS indexes or sequence numbers of MCS indexes and the MSGA uplink transmission resources; the UE finds corresponding uplink transmission resources according to the configuration broadcasted by the network side.

2. for the three resource configuration modes at the network side, implementation at the UE side will be described below.

A first network configuration method is as follows.

During implementation, determining, by the terminal, the uplink transmission resources and the TBSs or the MCSs configured by the network side includes: determining the TBSs or the MCSs and the PRACH resources and the PUSCH resources in the MSGA from a received broadcast signal; determining, according to the mapping relationship, the number of information bits that can be carried in each uplink transmission resource in the MSGA; selecting one of the uplink transmission resources according to a size of an uplink data block to be transmitted and determining the corresponding TBS or MCS.

The details can be as follows:

The UE receives the specific information and number of the TBSs/MCSs included in the broadcast signal, and preamble resource allocation and PUSCH resource allocation in the MSGA; based on these, the UE will know specific locations and the total number of the uplink transmission resources of the MSGA currently configured by the network, and the specific information and the number of the TBSs/MCSs currently indicated by the network.

The UE may calculate, according to the mapping relationship established between each resource index and the TBS/MCS index predefined with the network by the UE, how many information bits each uplink transmission resource on the MSGA can carry.

Then, the UE calculates the number of bits to be transmitted by the UE itself according to a service demand of the UE itself, and compares the calculated number with the number of bits carried by each resource, finds a transmission resource which is equal to or greater than the number of bits to be transmitted by the UE itself and is closest to the number of bits to be transmitted by the UE itself During implementation, determining the corresponding TBS or MCS by the terminal includes: if the broadcast signaling includes a fixed MCS level, determining the corresponding TBS by the terminal; if the broadcast signaling includes a plurality of MCS levels, selecting one or more MCS levels that can match the RSRP and/or the SINK by the terminal, and selecting the lowest MCS level as the finally transmitted MCS level, in case that the plurality of matched MCS levels exist.

During specific implementation, when a plurality of uplink transmission resources are selectable for one MCS level, the terminal randomly selects an uplink transmission resource from the plurality of uplink transmission resources, or selects an uplink transmission resource according to time-frequency resource timing of the plurality of uplink transmission resources.

Specifically, two aspects can be considered: if the network broadcasts a fixed MCS level, then only the size of the TBS and the size of the uplink transmission resource block need to be considered; if the network broadcasts a plurality of MCS level sequence numbers, then the UE may first select, according to the RSRP and/or the SINR, one or more matched MCS levels from the plurality of MCS level sequence numbers indicated in the broadcast signaling, and then find the uplink transmission resource of the MSGA corresponding to the one or more MCS levels, and then according to the found uplink transmission resource, determine data bits carried by each resource, and then compare the determined data bits with actual transmission bits of the UE, and finally find the suitable uplink transmission resource.

Further, if multiple uplink transmission resources of a MSGA that can be selected exist for one MCS level, then the UE can randomly select a resource or find a first resource by sorting time-frequency resources, and if necessary, add padding bits, and then, perform modulation and coding according to the MCS level corresponding to a resource block, and transmit data on the selected resource block.

A second network configuration method is as follows.

During implementation, determining, by the terminal, the uplink transmission resources and the TBSs or the MCSs configured by the network side includes: determining, from a received broadcast signal, sequence numbers of TBS indexes or sequence numbers of MCS indexes and PRACH resources and PUSCH resources, in the MSGA, allocated according to sequence numbers of the TBS indexes or sequence numbers of the MCS index; and determining the amount of information bits that each uplink transmission resource in the MSGA corresponding to each TBS index sequence number or each MCS index sequence number can carry; selecting one of the uplink transmission resources according to a size of an uplink data block to be transmitted and determining a corresponding TBS or MCS.

In the broadcast signaling received by UE, included are index sequence numbers and numbers of TBSs/MCSs, and MSGA uplink transmission resources (including preamble resource allocation and PUSCH resource allocation) allocated for the index sequence numbers of the TBSs/MCSs included in the broadcast signaling received by the UE.

Accordingly, the UE knows the specific information and number of the TBSs/MCSs currently configured by the network, and the location and the number of the MSGA uplink transmission resources corresponding to each TB S/MCS index.

Hereby, the UE can calculate how many information bits the MSGA can carry on each uplink transmission resource, and then the UE calculates, according to service requirement of the UE itself, the number of bits that the UE needs to transmit, and the UE compares the calculated number of bits with the number of bits carried by each resource, and finds the corresponding transmission resource which is equal to or larger than the number of bits that the UE needs to transmit and is closest to the number of bits that the UE needs to transmit.

During implementation, determining the corresponding TBSs or MCSs by the terminal includes: if the broadcast signaling includes a fixed MCS level, determining the corresponding TBSs by the terminal; if the broadcast signaling includes a plurality of MCS levels, selecting one or more MCS levels that can match the RSRP and/or the SINR by the terminal, and selecting the lowest MCS level as the finally transmitted MCS level, in case that the plurality of matched MCS levels exist.

During specific implementation, when a plurality of uplink transmission resources are selectable for an MCS level, the terminal randomly selects an uplink transmission resource, or selects an uplink transmission resource according to the time-frequency resource timing of the uplink transmission resource.

Specifically, two aspects can be considered: if the network broadcasts a fixed MCS level, then only the size of the TBS needs to be considered, of course, during implementation, whether MSGA resources can be used by the current RSRP and SINR should also be considered; if the UE cannot use the MSGA uplink transmission resource, the UE also needs to select a normal access manner, and then performs transmission after having accessed to the network; if the network broadcasts a plurality of MCS level sequence numbers, then the UE may first select, according to the RSRP and/or the SINR, one or more matched MCS levels from the plurality of MCS level sequence numbers indicated in the broadcast signaling, and then find the uplink transmission resource of the MSGA corresponding to the one or more MCS levels, and then according to the found uplink transmission resource, determine data bits carried by each resource, and then compare the determined data bits with actual transmission bits of the UE, and finally find the suitable uplink transmission resource; if there are multiple matched MCS levels, and select the lowest MCS level in the multiple matched MCS levels as the MCS level finally sent, and then determine the uplink transmission resource corresponding to the MCS level as the finally suitable uplink transmission resource.

Further, if necessary, padding bits are added, and then modulation and coding are performed according to the MCS level corresponding to the resource block, and data is transmitted on the selected resource block.

3. Three implementations of the mapping relationship between MSGA resources and TBS indexes/MCS indexes are described below.

During implementation, the network side may indicate the mapping relationship between the TBS indexes or the MCS indexes and the uplink transmission resources to the UE in one or more of the following manners: numbering uplink transmission resources, and predefining the mapping relationship between the TBS indexes or the MCS indexes and uplink transmission resource numbering values, and indicating the mapping relationship through the uplink transmission resource numbering values; or, predefining that TBS indexes or MCS indexes indicated through broadcast can be transmitted on any uplink transmission resource, and indicating the TBS indexes or the MCS indexes through broadcast; or, indicating the TBS indexes or the MCS indexes and the corresponding uplink transmission resources through broadcast.

Accordingly, during implementation, the terminal determines the configuration at the network side in one or more of the following manners: the terminal determines the uplink transmission resources configured by the network side and the TBSs or MCSs, according to the mapping relationship between the sequence numbers of the TBS indexes or the sequence numbers of the MCS indexes and the uplink transmission resources agreed on in advance between the network side and the terminal; or, according to the MCS index and correspondence between different sequence numbers of TBS indexes or sequence numbers of MCS indexes and uplink transmission resources, the terminal determines to transmit the MSGA on any uplink transmission resource in the MSGA configured by the network side; or, the terminal determines the uplink transmission resource and the TBS or the MCS configured by the network side, according to the mapping relationship between the uplink transmission resources and the sequence numbers of TBS indexes or the sequence numbers of MCS indexes, notified by the network side through broadcast.

Details can be as follows.

1. first mode:

this mode is a mode that implicitly indicates the mapping relationship between the TBS indexes/MCS indexes and the MSGA uplink transmission resources, and the mapping relationship needs to be determined in advance by the UE and the network side. First, both the network side and the UE need to rank uplink transmission resources (including preamble resource allocation and PUSCH resource allocation) in the MSGA, for example, if the total number of resources is N, then each resource needs to be numbered (0, 1, ..., N−1), the mapping relationship between each resource numbering value and the sequence numbers of TBS indexes/ MCS indexes is established.

2. second mode:

this mode is a mode that implicitly indicates the mapping relationship between the TBS indexes/MCS indexes and the MSGA uplink transmission resources, and the mapping relationship needs to be determined in advance by the UE and the network side. The multiple TBS indexes or MCS indexes broadcast by the network side can be transmitted on any uplink transmission resource in MSGA. The network does not need to allocate a dedicated uplink transmission resource in MSGA for each TBS index or MCS index. In this mode, the network side needs to perform blind decoding of a modulation mode on the uplink transmission resource.

3. third mode:

this mode is a mode that the MSGA uplink transmission resource corresponding to each TBS index or MCS index is directly carried in a broadcast signaling.

4. implementation of mapping between preamble resources and PUSCH resources in MSGA resources will be described below.

During implementation, in the mapping relationship between the PRACH resources and the PUSCH resources, the PRACH resources are allocated in groups, and the PUSCH resources are allocated in groups, wherein, one group of PRACH resources corresponds to at least two groups of PUSCH resources; or, one group of PRACH resources corresponds to one group of PUSCH resources.

In a specific implementation, when one group of PRACH resources corresponds to at least two groups of PUSCH resources, each PRACH resource in one group of PRACH resources corresponds to one PUSCH resource in each group of PUSCH resources; or, one group of PRACH resources is divided into several sub-groups of PRACH resources, and each sub-group of PRACH resources corresponds to one group of PUSCH resources.

Specifically, in the mapping between Preamble resources and PUSCH resources in the MSGA resources, the MSGA resources may include two groups of resources, i.e., a Preamble group and a PUSCH resource group, and the mapping relationship between the two groups of resources may be as follows:

(1) resources in one Preamble group may correspond to multiple PUSCH resource groups; or, (2) resources in one Preamble group may correspond to one PUSCH resource group.

Specifically, when resources in one Preamble group correspond to a plurality of PUSCH resource groups, one preamble resource (a preamble code and RACH transmission resource) in one Preamble group may correspond to one PUSCH resource in each of a plurality of PUSCH resource groups; or, resources in one Preamble group resource are divided into several Preamble resource sub-groups according to the total number of PUSCH resource groups, and each resource sub-group corresponds to one PUSCH resource group.

When resources of one Preamble group resource correspond to one PUSCH resource group, if there are several Preamble group resource networks, the corresponding number of PUSCH resource group resources are configured.

Hereinafter, description is made by way of specific examples.

First, description of implementation at the network side.

EXAMPLE 1

In this example, for each TBS data block, different TBSs are matched when time-domain resources of the PUSCH uplink resources are the same and frequency-domain resources of the PUSCH uplink resources are different.

The base station transmits a broadcast signaling which includes PUSCH transmission resources (including: the number of PUSCH transmission slots (nrofslotsMsgA-PUSCH), the number of PUSCH transmission resources (nrofMsgAPOperSlot) included in each slot, a TBS index (MSGA-TBSlndex), a modulation and coding level (MSGA-MCS), time-domain resource allocation (a start symbol and a PUSCH length indication SLIV (start and length indicator value)), a time-domain interval (a guard Period MsgA PUSCH) of two PUSCH transmission resources in one slot, a frequency-domain spacing (guard band MsgA PUSCH) of two PUSCH transmission resources in one slot, an initial frequency-domain allocation indication (including: a frequency-domain start location indication (frequencystartMsgAPUSCH) and the number of PRBs (nrofPRBsperMsgAPOperTBS)) for the PUSCH transmission resources, a pilot signal configuration (msgA-DMRS-Configuration) of the PUSCH transmission resources.

A format of broadcast information at the network side may be shown in Table 1.

TABLE 1 physical layer information included in the broadcast signaling of Example 1

| Parameter (IE) | Description | Number of bits |
|---|---|---|
| MSGA-MCS | Modulation and coding level of PUSCH transmission | 5 bits |
| guard Period MsgA PUSCH | Time-domain interval of two PUSCH transmission resources in a slot | 8 bits |
| guard Band MsgA PUSCH | Frequency-domain spacing of two PUSCH transmission resources in a slot | 8 bits |
| frequencystartMsgAPUSCH | Start frequency-domain allocation indication of PUSCH transmission resources, which is consistent in each slot | 8 bits |

TABLE 1-continued physical layer information included in the broadcast signaling of Example 1

| Parameter (IE) | Description | Number of bits |
|---|---|---|
| SLIV (Start and length indicator value) | Time-domain indication of PUSCH resources | 6 bits (3 bits for indicating a start symbol and 3 bits for indicating a PUSCH length) |
| nrofslotsMsgAPUSCH | Number of PUSCH transmission slots | 8 bits |
| nrofMsgAPOperSlot | Number of PUSCH transmission resources included in each slot | 8 bits |
| msgA-DMRS-Configuration | Pilot signal configuration indicating PUSCH transmission resources | 32 bits |
| TBS indexi | TBS index, multiple TBS indexes may be included in the broadcast signaling | 8 bits |
| nrofPRBsperMsgAPOperTBS | Different PRB resources are allocated to each TBS, nrofPRBsperMsgAPOperTBS | 8 bits |

MSGA physical layer resources allocated by the network side in one cycle include all PRACH resources ($T_{PRACH}$) and all PUSCH resources ($T_{PUSCH}$), and the correspondence between PRACH transmission resource and PUSCH transmission resources may be shown in Formula 1, one PUSCH may correspond to at least one PRACH resource.

$$N_{preamble} = \text{ceil}(T_{preamble}/T_{PUSCH}) \quad (1)$$

$T_{PUSCH} = T_{PO} \times N_{DMRSperPO}$,
$T_{PO} = \text{nrofslotsMsgAPUSCH} \times \text{nrofMsgAPOperSlot}$,
$N_{DMRSperPO}$ is obtained from msgA-DMRS-Configuration.
$N_{POperTBS} = \text{ceil}(T_{PO}/T_{TBS} \text{ or } T_{MCS})$, $N_{POperTBS}$ is the number of PUSCH transmission resources corresponding to each TBS, $T_{TBS}$ is the total number of TBS indexes, and $T_{MCS}$ is the total number of MCS indexes; and in order to reduce the influence of frequency-domain fading channels, a matching formula of the TBS index and the PUSCH is as follows: the j-th TBS index corresponds to the k-th PUSCH transmission resource:

$$j_{TBSindex} = \text{mod}(k_{PUSCHindex}, T_{TBS}) \quad (2)$$

where each parameter has the following meaning:

$N_{preamble}$: the number of Preamble indexes or the number of PRACH resources corresponding to each PUSCH resource in one cycle;

$T_{preamble}$: the total number of Preamble indexes or the total number of PRACH resources in one cycle;

$T_{PUSCH}$: the total number of PUSCH resources in one cycle;

$T_{PO}$: the total number of PUSCH transmission occasions in one cycle;

nrofslotsMsgAPUSCH: in one cycle, the total number of slots that can carry PUSCH transmissions;

nrofMsgAPOperSlot: the number of PUSCH transmission occasions in each slot;

$N_{DMRSperPO}$: the number of DMRSs (demodulated reference signals) included in each PUSCH transmission occasion;

When the TBS resources are uniformly allocated, the following may be implemented: the total number of PUSCH transmission resources is 15, the total number of TBS indexes is 5, and resource matching is shown in Table 2 below. In the Table 2, a horizontal axis of the Table 2 represents a time domain, and a vertical axis of the Table 2 represents a frequency domain.

TABLE 2 mapping between TBS indexes and PUSCH transmission resources

| PO 2 | PO 5 | PO 8 | PO 11 | PO 14 |
|---|---|---|---|---|
| (TBS2) | (TBS0) | (TBS3) | (TBS1) | (TBS4) |
| PO 1 | PO 4 | PO 7 | PO 10 | PO 13 |
| (TBS1) | (TBS4) | (TBS2) | (TBS0) | (TBS3) |
| PO 0 | PO 3 | PO 6 | PO 9 | PO 12 |
| (TBS0) | (TBS3) | (TBS1) | (TBS4) | (TBS2) |

When the TBS resources are non-uniformly allocated, the following may be implemented: the total number of PUSCH transmission resources is 15, the total number of TBS indexes is 3, wherein the number of TBS 0 resource allocation: the number of TBS 1 resource allocation: the number of TBS 2 resource allocation=2: 2: 1. Resource matching is shown in Table 3 below. In the table, the horizontal axis of the Table 3 represents the time domain, and the vertical axis of the Table 3 represents the frequency domain.

TABLE 3 mapping between TBS indexes and PUSCH transmission resources

| PO 2 | PO 5 | PO 8 | PO 11 | PO 14 |
|---|---|---|---|---|
| (TBS1) | (TBS0) | (TBS1) | (TBS0) | (TBS2) |
| PO 1 | PO 4 | PO 7 | PO 10 | PO 13 |
| (TBS0) | (TBS2) | (TBS1) | (TBS0) | (TBS1) |
| PO 0 | PO 3 | PO 6 | PO 9 | PO 12 |
| (TBS0) | (TBS1) | (TBS0) | (TBS2) | (TBS1) |

Figure 6:
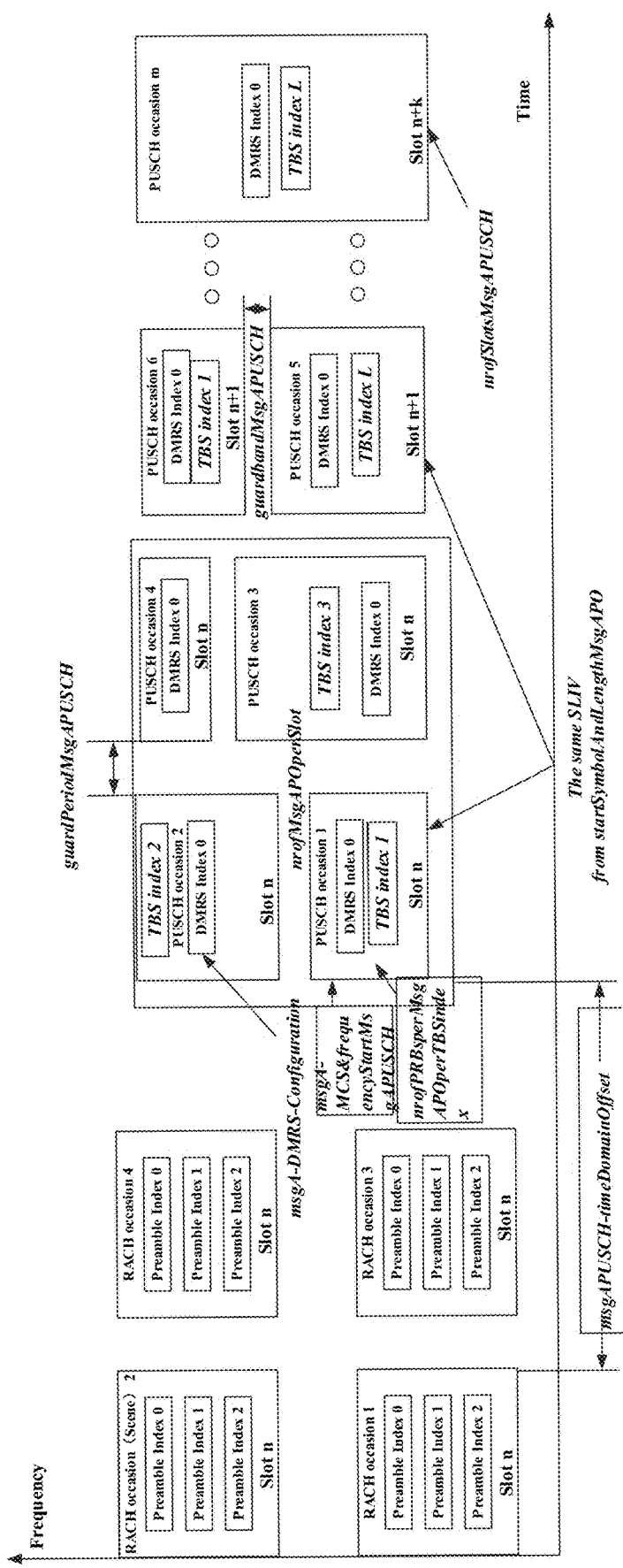
FIG. 6 is a schematic diagram of time-frequency resource allocation and correspondence between PRACH and PUSCH in Example 1 of the present disclosure.
Figure 7:
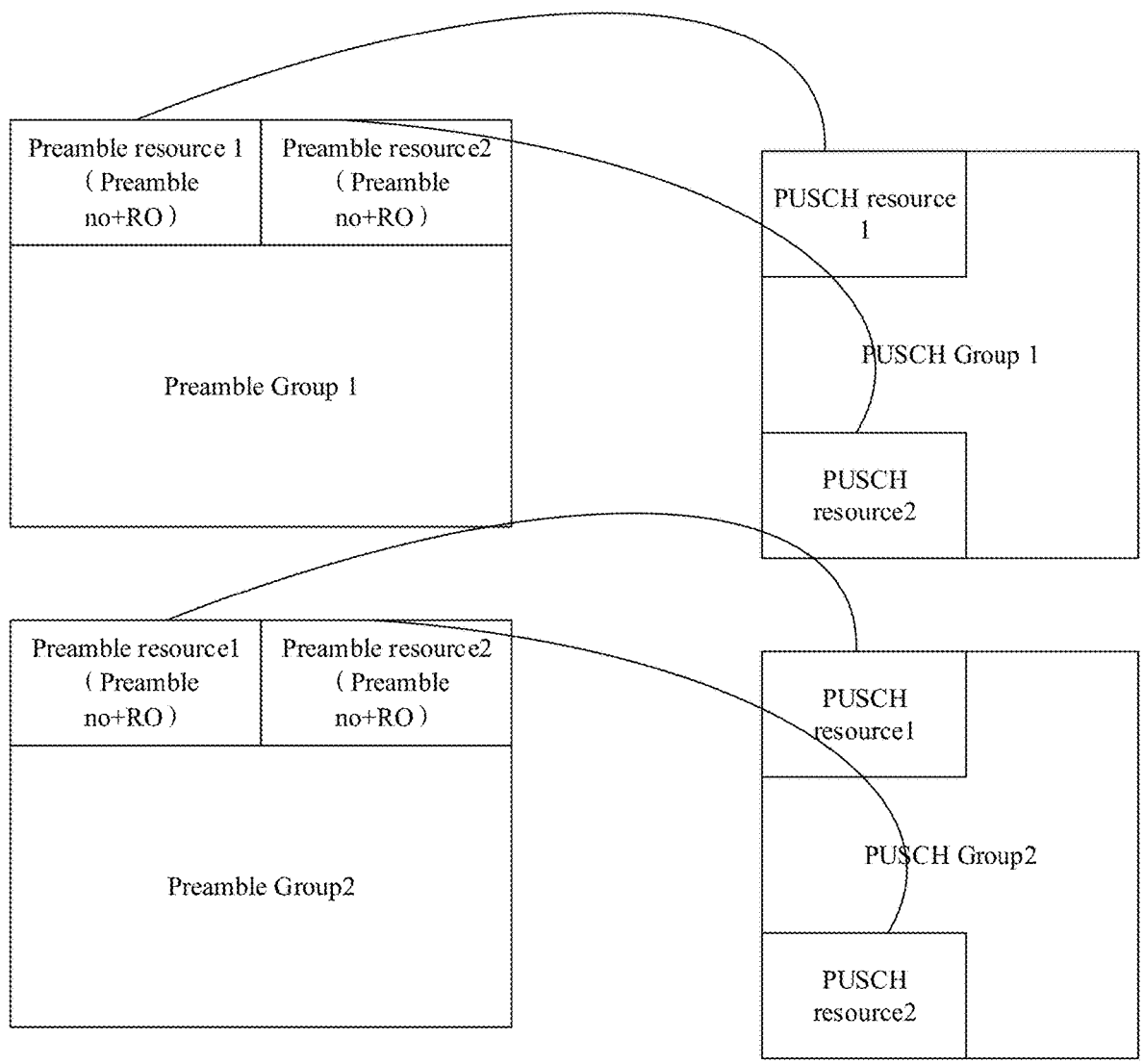
FIG. 7 is a schematic diagram of one-to-one mapping of two PRACH resource groups and two PUSCH resource groups according to some embodiments of the present disclosure.
Figure 8:
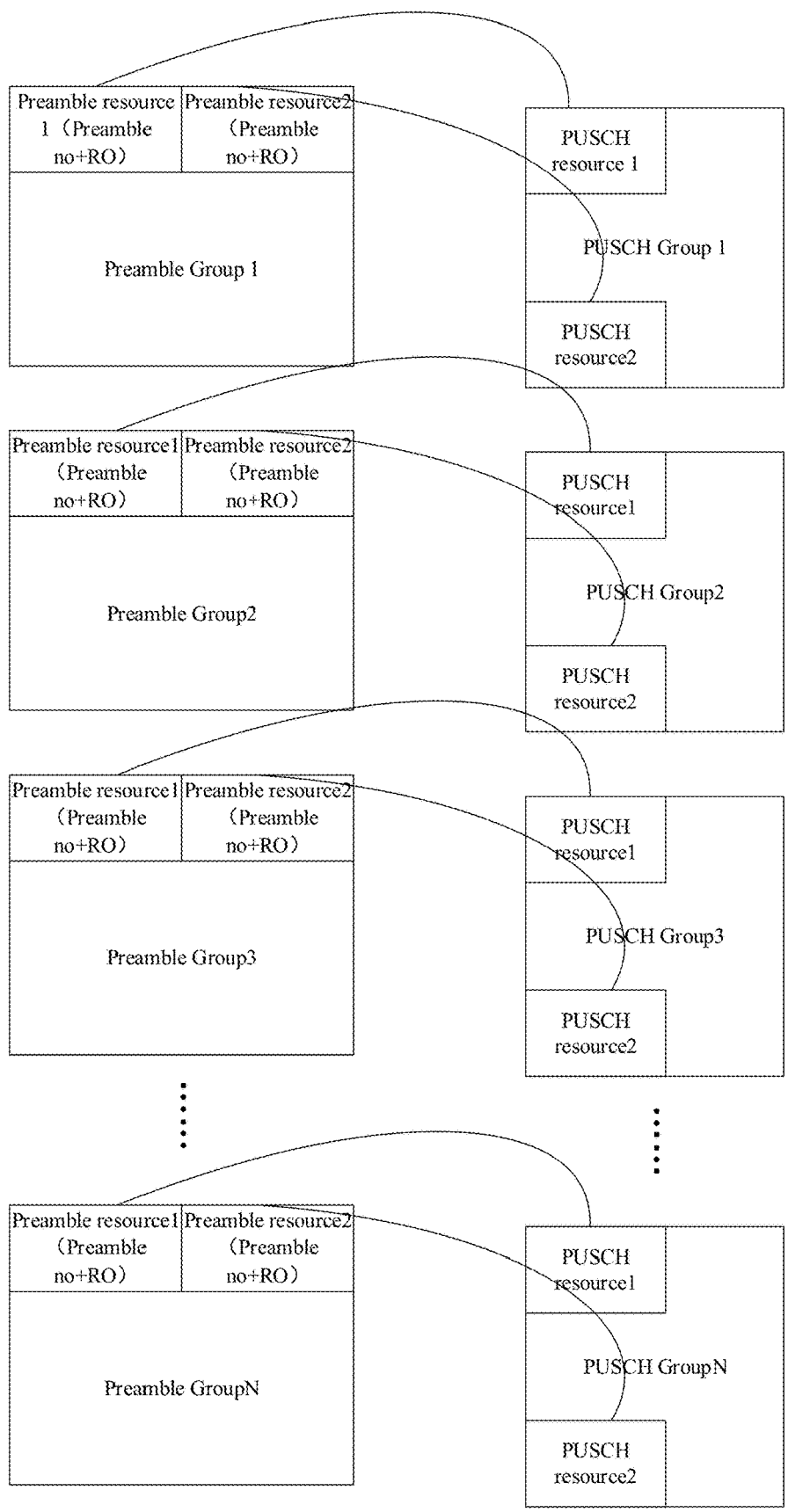
FIG. 8 is a schematic diagram of one-to-one mapping of multiple PRACH resource groups and multiple PUSCH resource groups according to some embodiments of the present disclosure.
Figure 9:
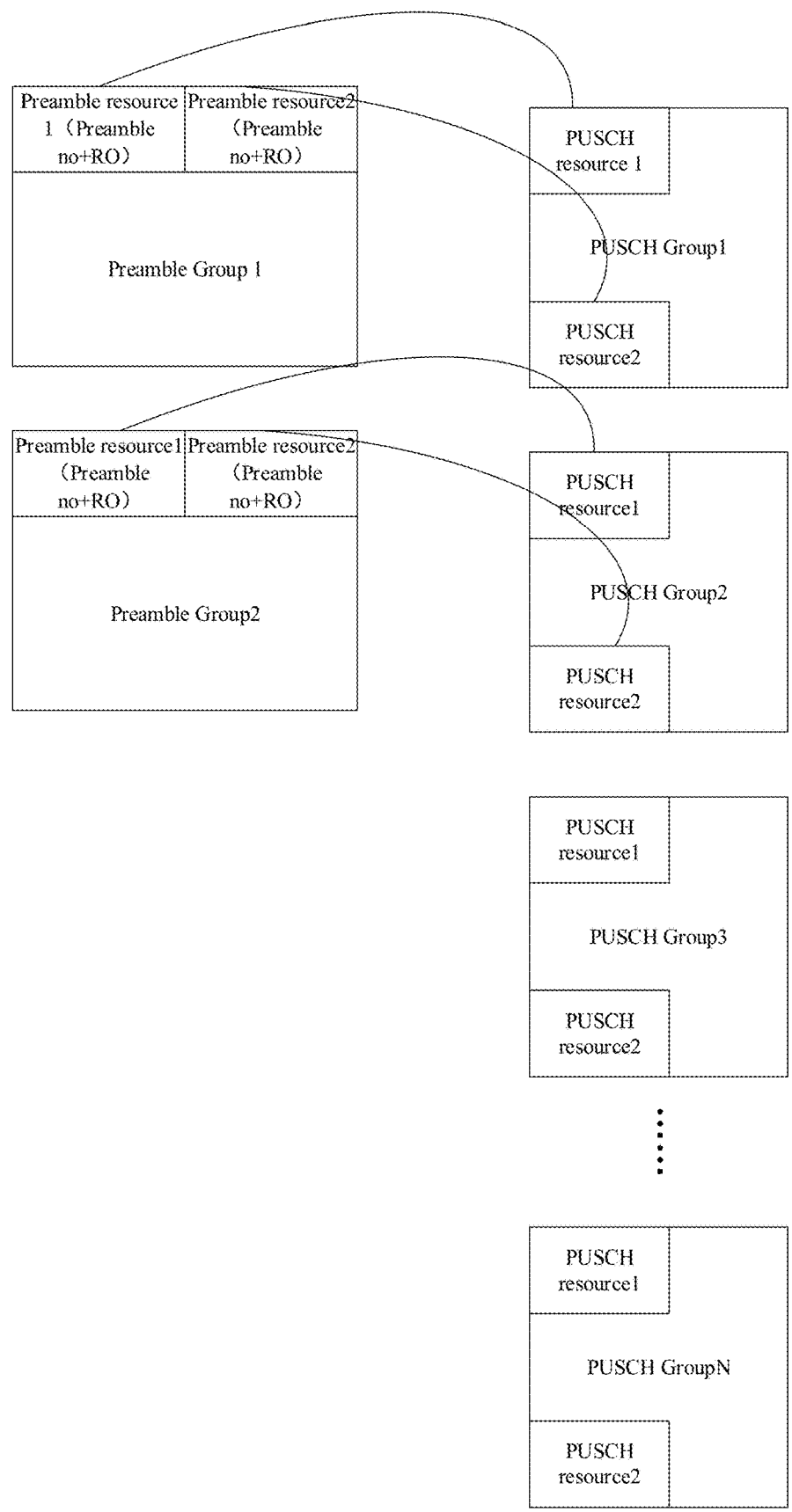
FIG. 9 is a schematic diagram of one-to-one mapping of multiple PRACH resource groups and multiple PUSCH resource groups according to some embodiments of the present disclosure.
Figure 10:
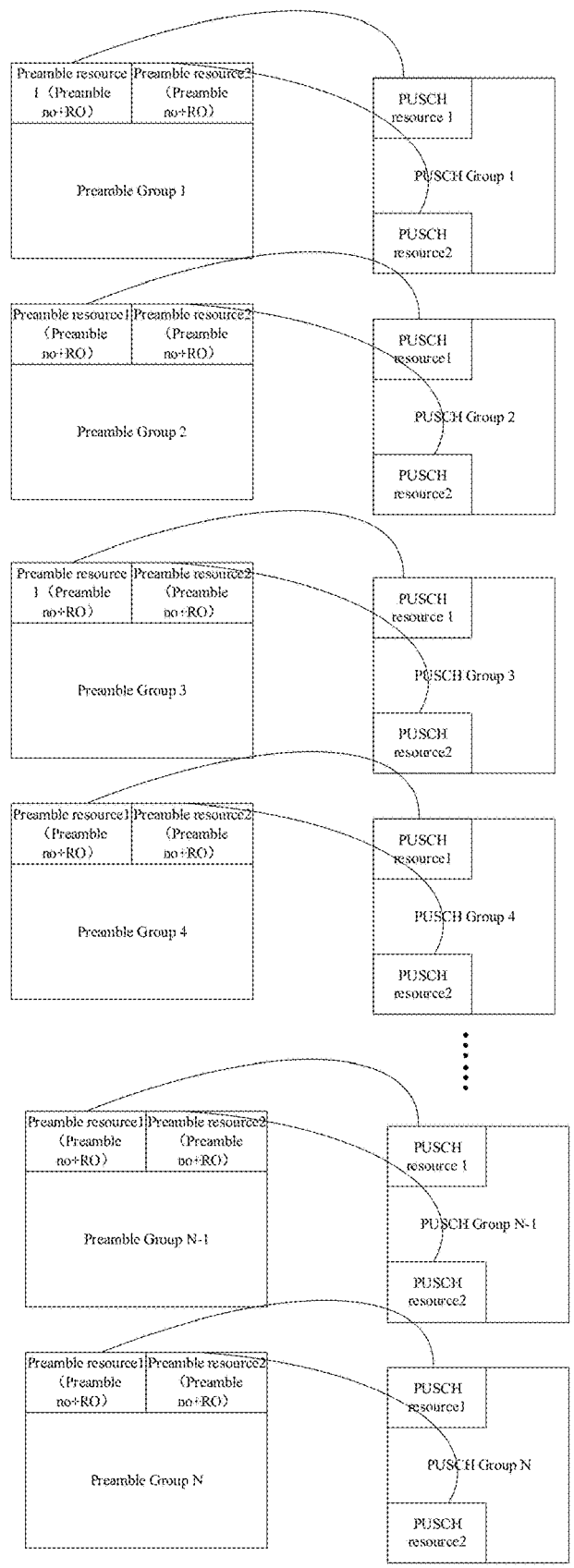
FIG. 10 is a schematic diagram of one-to-many mapping of multiple PRACH resource groups and multiple PUSCH resource groups according to some embodiments of the present disclosure.
Figure 11:
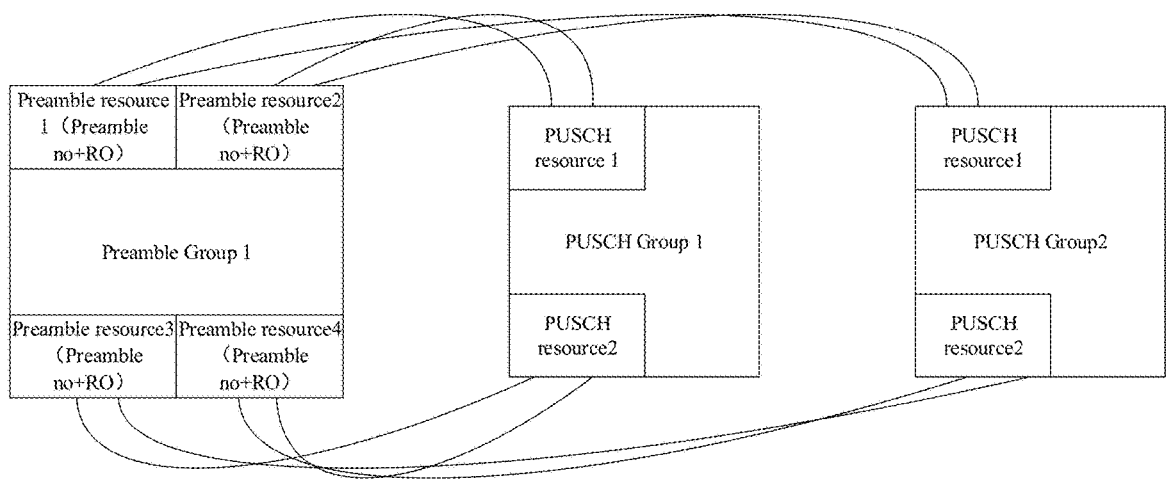
FIG. 11 is a schematic diagram of a first one-to-many mapping mode of a PRACH resource group and PUSCH resource groups according to some embodiments of the present disclosure.
Figure 12:
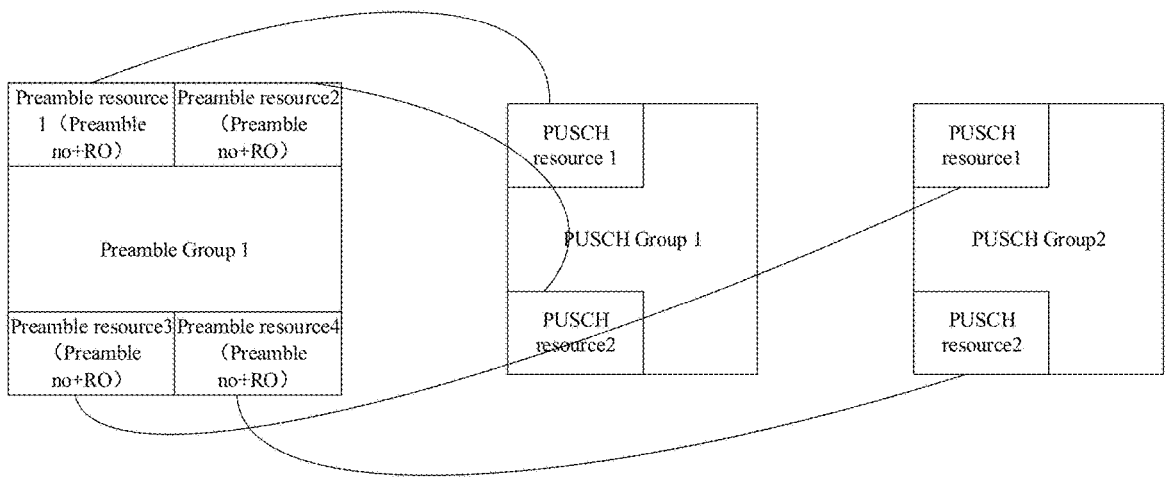
FIG. 12 is a schematic diagram of a second one-to-many mapping mode of a PRACH resource group and PUSCH resource groups according to some embodiments of the present disclosure.

FIG. 6 is a schematic diagram of time-frequency resource allocation and correspondence between PRACH and PUSCH in Example 1, and FIG. 7 is a schematic diagram of one-to-one mapping of two PRACH resource groups and two PUSCH resource groups; FIG. 8 is a schematic diagram of one-to-one mapping of multiple PRACH resource groups and multiple PUSCH resource groups; FIG. 9 is a schematic diagram of one-to-one mapping of multiple PRACH resource groups and multiple PUSCH resource groups, and FIG. 10 is a schematic diagram of one-to-many mapping of multiple PRACH resource groups and multiple PUSCH resource groups, FIG. 11 is a schematic diagram of a first one-to-many mapping mode of a PRACH resource group and PUSCH resource groups, and FIG. 12 is a schematic diagram of a second one-to-many mapping mode of a PRACH resource group and PUSCH resource groups, as shown in the figures, a mapping manner between PRACH resources and PUSCH resources in MSGA resources may be as follows.

The MSGA resources include two types of resource groups, the PRACH resource groups and the PUSCH resource groups, and the mapping relationship between the two resource groups may be that one PRACH resource group corresponds to multiple PUSCH resource groups, or one PRACH resource group corresponds to one PUSCH resource group.

(1) resources of the PRACH resource group and resources of the PUSCH resource group are mapped one-to-one, and one preamble resource (a preamble code and a resource for RACH transmission) in one PRACH resource group may correspond to one PUSCH resource in each PUSCH resource group of the plurality of PUSCH resource groups.

As shown in FIG. 7 and FIG. 8, resources in the PRACH resource group and resources in the PUSCH resource group in the figures are one-to-one mapping, the network may configure multiple groups of resource, i.e., the PRACH resource groups and the PUSCH resource groups, and the PRACH resource groups correspond to the PUSCH resource groups in a one-to-one manner. Meanwhile, the MCS of each PUSCH resource group is configurable, specifically, each PRACH resource and each PUSCH resource may be configured to have the one-to-one correspondence, or multiple PRACH resources in one PRACH resource group may correspond to one PUSCH resource in one PUSCH resource group.

Corresponding to FIG. 9, the network may also configure multiple groups of resources, i.e., PRACH resource groups and PUSCH resource groups, some PUSCH resource groups have a corresponding PRACH resource group, and some PUSCH resource groups have no corresponding PRACH resource group, since resource in these PRACH resource groups are used by a fixed terminal, these resources have an effective TA (Timing Advanced) requirement.

Corresponding to FIG. 10, the network may also configure multiple groups of resources, i.e., PRACH resource groups and PUSCH resource groups, and each PRACH resource group corresponds to two or more PUSCH resource groups. Meanwhile, the MCS of each PUSCH resource group is configurable or fixed.

(2) One-to-many mapping of PRACH resource groups and PUSCH resource groups, resources of one PRACH resource group are divided into several PRACH resource sub-groups according to the total number of PUSCH resource groups, and each resource sub-group corresponds to one PUSCH resource group.

One PRACH resource sub-group may correspond to one PUSCH resource group, which means that if there are several PRACH resource sub-groups, the network side will configure a corresponding number of PUSCH resource groups. Actually, a PUSCH resource group includes a plurality of PUSCH resources, and a PRACH resource group includes a plurality of PRACH resource groups.

As shown in FIG. 11, one PRACH resource group may correspond to two or more PUSCH resource groups, and one PRACH resource sub-group of one PRACH resource group may correspond to one PUSCH resource in two or more PUSCH resource groups, the base station may determine whether there is data transmission on two or more PUSCH resources by means of blind decoding.

As shown in FIG. 12, one PRACH resource group may correspond to two or more PUSCH resource groups, a part of resources of the PRACH resource group corresponds to the PUSCH resources in a first PUSCH resource group, and another part of the resources of the PRACH resource group corresponds to the PUSCH resources in a second PUSCH resource group.

In FIG. 11, it is shown that different PRACH resources may correspond to PUSCH resources of different PUSCH resource groups respectively, and the base station (gNB) finds the PUSCH resources transmitted by the terminal by blindly decoding all possible PUSCH transmission resources. If two UEs transmit the same PRACH+two different PUSCHs and the network successfully demodulates data of the two PUSCHs, then the base station (gNB) transmits success RAR (RAR Success), and if timing advance (TA) transmission information is not carried, and the two UEs know that the base station (gNB) has successfully received uplink data carried by the PUSCHs but collision of PRACH occurs, then the two UEs will send only the PRACH again to obtain TA. If the network transmits the success RAR carrying the TA, then both UE use this TA for data transmission, and if the data transmission fails, the 2-step RACH needs to be restarted.

In FIG. 12, each PRACH resource corresponds to only a unique PUSCH resource.

EXAMPLE 2

In this example, different TBSs are matched for different cases where frequency-domain resources are the same and where time-domain resources are different in the PUSCH resources of each TBS data block.

A new IE (Information Element) in the broadcast signaling sent by the base station includes: a TBS index (MSGA-TBS index), a time-domain resource allocation (a start symbol and a PUSCH length indication SLIVperTBS (a start and length indicator value per TBS), the SLIV for each TBS block), the number of PRB (nrofPRBsperMsgAPO), the format of the network-side broadcast information is shown in Table 4.

TABLE 4 physical layer information included in broadcast signaling in Example 2

| Parameter (IE) | Description | Number of bits |
| --- | --- | --- |
| nrofPRBsperMsgAPO | Frequency-domain resource allocation of PUSCH, nrofPRBsperMsgAPOperTBS | 8 bits |
| TBS indexi | TBS index, multiple TBS indexes may be included in the broadcast signaling | 8 bits |
| SLIVperTBS | Time-domain indication of allocating PUSCH resources for each TBS | 6 bits (3 bits for indicating a start symbol and 3 bits for indicating a PUSCH length) |

During specific implementation, implementation of this part may be the same as the implementation of Example 1.

The MSGA physical-layer resources allocated by the network side in one cycle include total PRACH resources ($T_{PRACH}$) and total PUSCH resources ($T_{PUSCH}$), and the correspondence between PRACH transmission resources and PUSCH transmission resources can be as shown in Formula 3. one PUSCH may correspond to at least one PRACH resource.

$$N_{preamble} = \text{ceil}(T_{preamble}/T_{PUSCH}) \quad (3)$$

$T_{PUSCH} = T_{PO} \times N_{DMRSperPO}$,
$T_{PO} = \text{nrofslotsMsgAPUSCH} \times \text{nrofMsgAPOperSlot}$,
$N_{DMRSperPO}$ is obtained from msgA-DMRS-Configuration. At the same time, $N_{POperTBS} = \text{ceil}(T_{PO}/T_{TBS})$, $N_{POperTBS}$ is the number of PUSCH transmission resources corresponding to each TBS, and $T_{TBS}$ is the total number of TBS indexes; in order to reduce the influence of frequency-domain fading channels, a matching formula of the TBS index and the PUSCH is as follows: the j-th TBS index corresponds to the k-th PUSCH transmission resource:

$$j_{TBSindex} = \text{mod}(k_{PUSCHindex}, T_{TBS}) \quad (4)$$

Please refer to description of the Example 1 for meaning of the parameters.

When the TBS resources are uniformly allocated, the following may be implemented: the total number of PUSCH transmission resources is 15, the total number of TBS indexes is 5, and the resource matching is shown in the following Tables 5-1, 5-2 and 5-3. In the tables, a horizontal axis of a table represents a time domain, and a vertical axis of a table represents a frequency domain.

TABLE 5-1

| mapping between TBS indexes and PUSCH transmission resources | | | | |
|---|---|---|---|---|
| PO 2 (TBS2) | PO 5 (TBS0) | PO 8 (TBS3) | PO 11 (TBS1) | PO 14 (TBS4) |
| PO 1 (TBS1) | PO 4 (TBS4) | PO 7 (TBS2) | PO 10 (TBS0) | PO 13 (TBS3) |
| PO 0 (TBS0) | PO 3 (TBS3) | PO 6 (TBS1) | PO 9 (TBS4) | PO 12 (TBS2) |

Optionally, the following table may also be applied:

TABLE 5-2

| mapping between TBS indexes and PUSCH transmission resources | | | | |
|---|---|---|---|---|
| PO 2 (TBS0) | PO 5 (TBS1) | PO 8 (TBS2) | PO 11 (TBS3) | PO 14 (TBS4) |

TABLE 5-2-continued

| mapping between TBS indexes and PUSCH transmission resources | | | | |
|---|---|---|---|---|
| PO 1 (TBS0) | PO 4 (TBS1) | PO 7 (TBS2) | PO 10 (TBS3) | PO 13 (TBS4) |
| PO 0 (TBS0) | PO 3 (TBS1) | PO 6 (TBS2) | PO 9 (TBS3) | PO 12 (TBS4) |

When the TBS resources are non-uniformly allocated, the following may be implemented: the total number of PUSCH transmission resources is 15, the total number (the network can flexibly configure according to a traffic volume) of TBS indexes is 5, where the number of TBS0 is 2, the number of TBS1 is 2, the number of TBS2 is 1, and the resource matching is shown in Table 6 below. In that table, the horizontal axis of the table represents the time domain, and the vertical axis of the table represent the frequency domain.

TABLE 6

| mapping between TBS indexes and PUSCH transmission resources | | | | |
|---|---|---|---|---|
| PO 2 (TBS1) | PO 5 (TBS0) | PO 8 (TBS1) | PO 11 (TBS0) | PO 14 (TBS2) |
| PO 1 (TBS0) | PO 4 (TBS2) | PO 7 (TBS1) | PO 10 (TBS0) | PO 13 (TBS1) |
| PO 0 (TBS0) | PO 3 (TBS1) | PO 6 (TBS0) | PO 9 (TBS2) | PO 12 (TBS1) |

Figure 13:
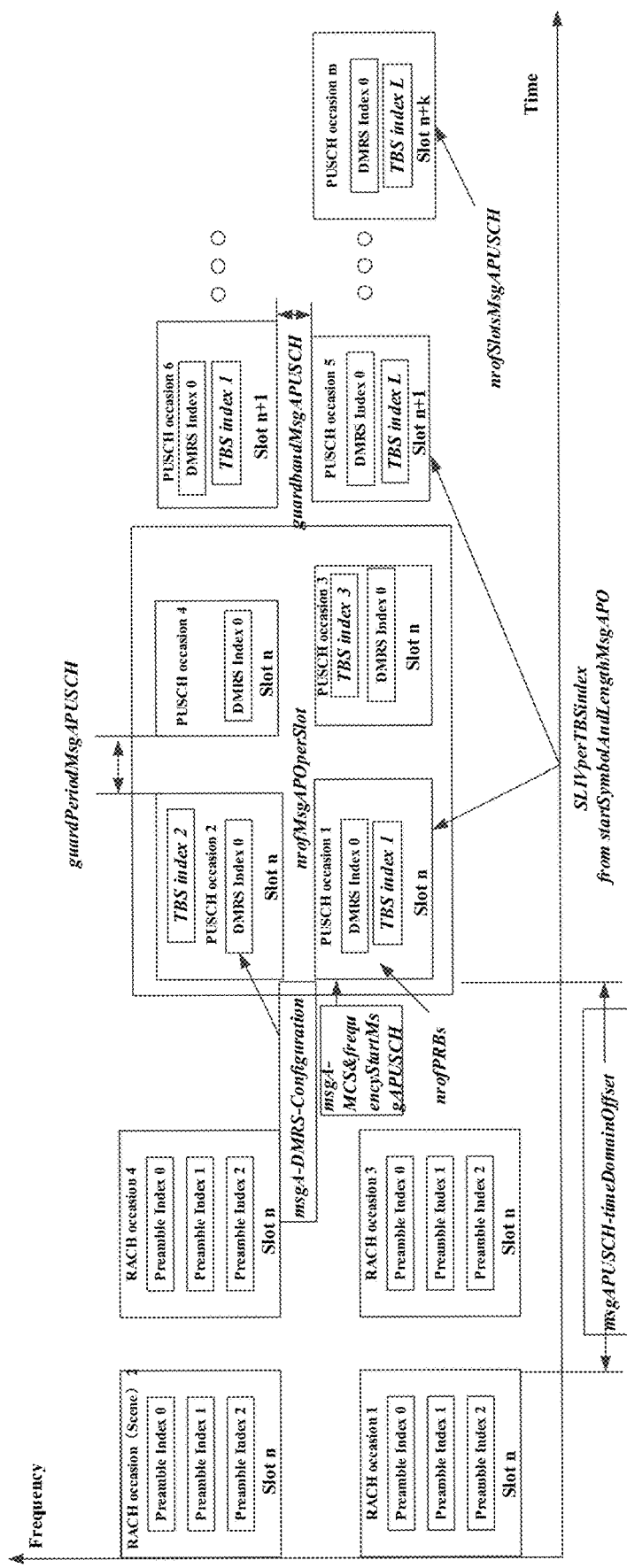
FIG. 13 is a schematic diagram of time-frequency resource allocation and correspondence between PRACH and PUSCH in Example 2 of the present disclosure.

FIG. 13 is a schematic diagram of time-frequency resource allocation and correspondence between PRACH and PUSCH in Example 2, and during specific implementation, the mapping between PRACH resources and PUSCH resources in MSGA resources in Example 1 may be referred to.

EXAMPLE 3

In this example, different TBSs may be matched for cases where time-frequency resources are all different for PUSCH resources for TBS data blocks.

The base station transmits the broadcast signaling, The new IEs included in the signaling are: TBS index (MSGA-TBS Index), time-domain resource allocation (start symbol and PUSCH length indication (symbol length indicator value SLIVperTBS (start symbol and length MsgA PO), SLIV for each TBS block), the number of PRBs (nrof-PRBsperMsgAPOperTBS), the format of network-side broadcast information is shown in Table 7.

TABLE 7

| the broadcast signaling in Example 3 contains new physical layer information | | |
|---|---|---|
| Parameter (IE) | Description | Number of bits |
| TBS index | TBS index, multiple TBS indexes may be included in the broadcast signaling | 8 bits |
| nrofPRBsperMsgAPOperTBS | Different PRB resources are allocated to each TBS, nrofPRBsperMsgAPOperTBS | 8 bits |
| SLIVperTBS | Time-domain indication of allocating PUSCH resources for each TBS | 6 bits (3 bits for indicating a start symbol and 3 bits for indicating a PUSCH length) |

In particular implementation, implementation of this part may be the same as implementation of Example 1.

MSGA physical layer resources allocated by the network side in one cycle include total PRACH resources (TPRACH) and all PUSCH resources ($T_{PUSCH}$), and the correspondence between PRACH transmission resources and PUSCH transmission resources may be shown in Formula 5, one PUSCH may correspond to at least one PRACH resource.

$$N_{preamble} = \text{ceil}(T_{preamble}/T_{PUSCH}) \qquad (5)$$

$T_{PUSCH} = T_{PO} \times N_{DMRSperPO}$,
$T_{PO} = \text{nrofslotsMsgAPUSCH} \times \text{nrofMsgAPOperSlot}$,
$N_{DMRSperPO}$ is obtained from msgA-DMRS-Configuration. Meanwhile, $N_{POperTBS} = \text{ceil}(T_{PO}/T_{TBS})$, $N_{POperTBS}$ is the number of PUSCH transmission resources corresponding to each TBS, $T_{TBS}$ is the total number of TBS indexes; and in order to reduce the influence of frequency-domain fading channels, a matching formula of the TBS index and the PUSCH is as follows: the j-th TBS index corresponds to the k-th PUSCH transmission resource:

$$j_{TBSindex} = \text{mod}(k_{PUSCHindex}, T_{TBS}) \qquad (6)$$

Please refer to description of the Example 1 for meaning of the parameters.

When the TBS resources are uniformly allocated, the following may be implemented: the total number of PUSCH transmission resources is 15, the total number of TBS indexes is 5, and the resource matching is shown in the following Table 8. In the table, a horizontal axis of a table represents a time domain, and a vertical axis of a table represents a frequency domain.

TABLE 8 mapping between TBS indexes and PUSCH transmission resources

| PO 2 | PO 5 | PO 8 | PO 11 | PO 14 |
|---|---|---|---|---|
| (TBS2) | (TBS0) | (TBS3) | (TBS1) | (TBS4) |
| PO 1 | PO 4 | PO 7 | PO 10 | PO 13 |
| (TBS1) | (TBS4) | (TBS2) | (TBS0) | (TBS3) |
| PO 0 | PO 3 | PO 6 | PO 9 | PO 12 |
| (TBS0) | (TBS3) | (TBS1) | (TBS4) | (TBS2) |

When the TBS resources are non-uniformly allocated, the following may be implemented: the total number of PUSCH transmission resources is 15, the total number of TBS indexes is 5, where the number of TBS0 is 2, the number of TBS1 is 2, the number of TBS2 is 1, and the resource matching is shown in Table 9 below. In that table, the horizontal axis of the table represents the time domain, and the vertical axis of the table represent the frequency domain.

TABLE 9 mapping between TBS indexes and PUSCH transmission resources

| PO 2 | PO 5 | PO 8 | PO 11 | PO 14 |
|---|---|---|---|---|
| (TBS1) | (TBS0) | (TBS1) | (TBS0) | (TBS2) |
| PO 1 | PO 4 | PO 7 | PO 10 | PO 13 |
| (TBS0) | (TBS2) | (TBS1) | (TBS0) | (TBS1) |
| PO 0 | PO 3 | PO 6 | PO 9 | PO 12 |
| (TBS0) | (TBS1) | (TBS0) | (TBS2) | (TBS1) |

Figure 14:
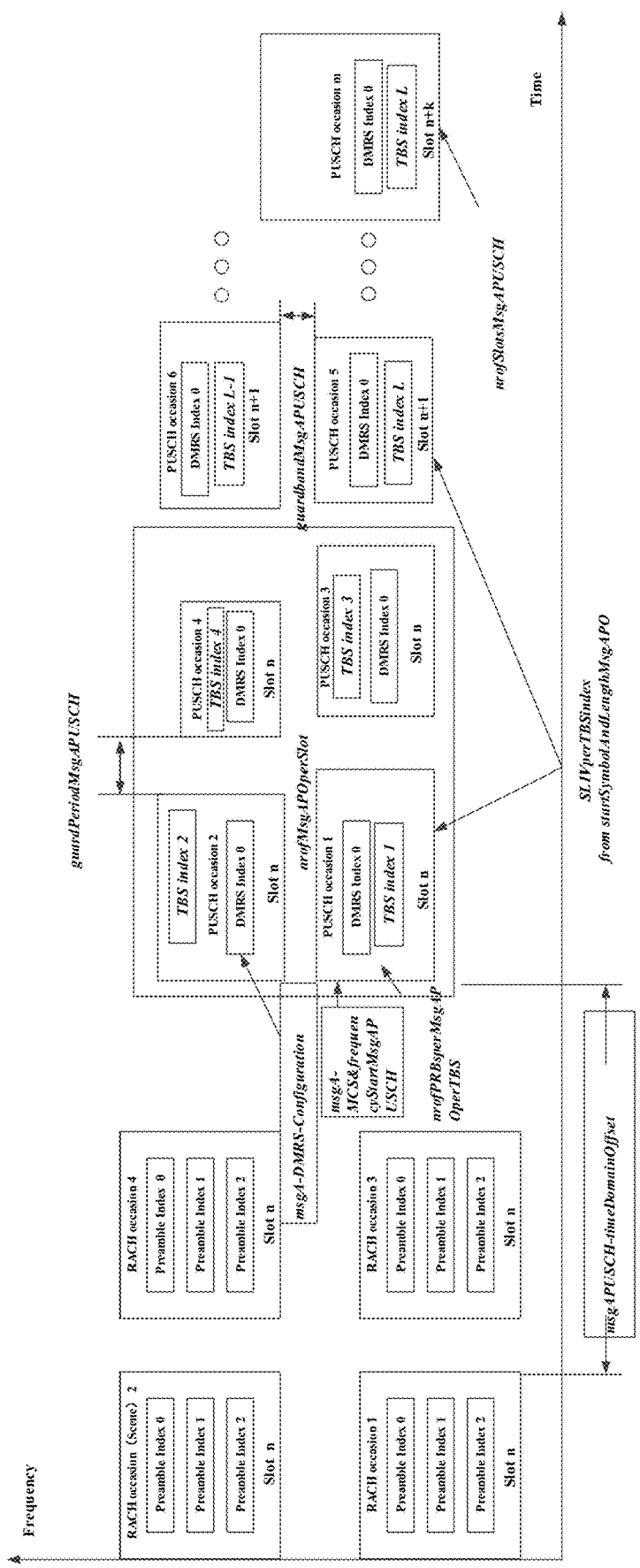
FIG. 14 is a schematic diagram of time-frequency resource allocation and correspondence between PRACH and PUSCH of MsgA in RACH in Example 3 of the present disclosure.

FIG. 14 is a schematic diagram of time-frequency resource allocation and correspondence between PRACH and PUSCH of MsgA in RACH in Example 3, and during specific implementation, the mapping between PRACH resources and PUSCH resources in MSGA resources in Example 1 may be referred to.

EXAMPLE 4

In this example, a plurality of transport blocks (TBS) are supported by uplink data transmission PUSCH in MSGA of 2-step RACH, and fixed time-frequency resources are allocated while a corresponding modulation and coding level (MCS level) is allocated for each TBS.

The network side has at least three ways to associate MCS with MSGA uplink transmission resources.

(1) the network side may allocate a dedicated MSGA uplink transmission resource for each MCS.

The base station transmits a broadcast signaling. The new IE in the signaling includes a modulation and coding level index (MSGA-MCSindex i) (the network can configure multiple indexes), time-domain resource allocation (start symbol and PUSCH length indication (start and length indicator value SLIVperMCSindex (start and length per MCS index)), the number of PRBs (nrofPRB sperMsgAPOperMCS).

The format of the network-side broadcast information is shown in Table 10. A method of matching PUSCH resources with a MCS and a method of matching PUSCH resources with PRACH resources are agreed upon by the UE and the network side in advance. Then the UE may allocate information according to the network-side broadcast information or specific resource allocation information.

Optionally, in Network Configuration 2 in Table 11, the network side only broadcasts all necessary MCS levels, and mapping relationship between the MCS level and the PUSCH is previously agreed between the network side and the UE, the mapping relationship is shown in Table 12 and Table 13.

TABLE 10 physical layer information included in a broadcast signaling of Network Configuration 1 in Example 4

| Parameter (IE) | Description | Number of bits |
|---|---|---|
| MSGA-MCS index i{ | MCS index, multiple MCS indexes may be included in the broadcast signaling | 4 bits |
| nrofPRBsperMsgAPOperMCS | Allocating different PRB resources for different MCSs | 8 bits |

TABLE 10-continued physical layer information included in a broadcast
signaling of Network Configuration 1 in Example 4

| Parameter (IE) | Description | Number of bits |
|---|---|---|
| SLIVperMCS | Time-domain indication of allocating PUSCH resources for each MCS | 6 bits (3 bits for indicating a start symbol and 3 bits for indicating a PUSCH length) |
| } | | |

(2) The network side does not need to allocate a dedicated MSGA uplink transmission resource for each MCS, and the uplink transmission resource of each MSGA can support all MCS levels included in the broadcast signaling.

The UE may select a corresponding MCS level according to a channel condition and data amount of the UE and send the MCS level on the uplink transmission resource of a selected MSGA, and the network performs blind detection on the transmitted data according to all modulation and coding MCS levels being broadcast.

Each PUSCH resource supports all MCS levels. The MSG-A SINK (MSGA signal to interference plus noise ratio threshold) threshold is added to indicate that this MCS index can be used when the SINR of the terminal is greater than or equal to this threshold. As shown in Table 11.

TABLE 11 physical layer information included in the broadcast
signaling of Network Configuration 2 in Example 4

| Parameter (IE) | Description | Number of bits |
|---|---|---|
| nr of MSGA-MCS index{ | MSGA-MCS index includes the total number | 3 bits |
| MSGA-MCS index i | MCS index, the broadcast signaling may include multiple MCS indexes, a value of i ranges from 1 to nr of MSGA-MCS index | 4 bits |
| MSG-A SINR threshold | The MCS index may be used if greater than or equal to this SINR threshold | 5 bits |
| } | | |

MSGA physical layer resources allocated by the network side in one cycle include all PRACH resources ($T_{PRACH}$) and all PUSCH resources ($T_{PUSCH}$), and the correspondence between PRACH resources and PUSCH transmission resources may be shown in Formula 7, one PUSCH may correspond to at least one PRACH resource.

$$N_{preamble} = \text{ceil}(T_{preamble}/T_{PUSCH}) \quad (7)$$

$T_{PUSCH} = T_{PO} \times N_{DMRSperPO}$,
$T_{PO} = \text{nrofslotsMsgAPUSCH} \times \text{nrofMsgAPOperSlot}$,
$N_{DMRSperPO}$ is obtained from msgA-DMRS-Configuration. Meanwhile, $N_{POperTBS} = \text{ceil } T_{PO}/T_{TBS}$ or $T_{MCS}$), $N_{POperMCSindex}$ is the number of PUSCH transmission resources included in each MCS index, $T_{MCSindex}$ is the total number of MCS indexes; and in order to reduce the influence of frequency-domain fading channels, a matching formula of the MCS index and the PUSCH is as follows: the j-th MCS index corresponds to the k-th PUSCH transmission resource:

$$j_{MCSindex} = \text{mod}(k_{PUSCHindex}, T_{MCSindex}) \quad (8)$$

When the MCS index resources are uniformly allocated, the following may be implemented: the total number of PUSCH transmission resources is 15, the total number of MCS indexes is 5, and the resource matching is shown in Table 12 below. In the table, the horizontal axis of the table represents the time domain, and the vertical axis of the table represents the frequency domain.

TABLE 12 mapping between MCS indexes and PUSCH transmission resources

| PO 2 | PO 5 | PO 8 | PO 11 | PO 14 |
|---|---|---|---|---|
| (MCSindex 2) | (MCSindex 0) | (MCSindex 3) | (MCSindex 1) | (MCSindex 4) |
| PO 1 | PO 4 | PO 7 | PO 10 | PO 13 |
| (MCSindex 1) | (MCSindex 4) | (MCSindex 2) | (MCSindex 0) | (MCSindex 3) |
| PO 0 | PO 3 | PO 6 | PO 9 | PO 12 |
| (MCSindex0) | (MCSindex3) | (MCSindex 1) | (MCSindex 4) | (MCSindex 2) |

When the TBS resources are non-uniformly allocated, the following may be implemented: the total number of PUSCH transmission resources is 15, the total number of MCS indexes is 5, where the number of MCS indexes 0 is 2, the number of MCS indexes 1 is 2, the number of MCS indexes 2 is 1, and the resource matching is shown in Table 13 below. In the table, the horizontal axis of the table represents the time domain, and the vertical axis of the table represents the frequency domain.

TABLE 13 mapping between MCS indexes and PUSCH transmission resources

| PO 2 (MCSindex 1) | PO 5 (MCSindex 0) | PO 8 (MCSindex 1) | PO 11 (MCSindex 0) | PO 14 (MCSindex 2) |
|---|---|---|---|---|
| PO 1 (MCSindex 0) | PO 4 (MCSindex 2) | PO 7 (MCSindex 1) | PO 10 (MCSindex 0) | PO 13 (MCSindex 1) |
| PO 0 (MCSindex 0) | PO 3 (MCSindex 1) | PO 6 (MCSindex 0) | PO 9 (MCSindex 2) | PO 12 (MCSindex 1) |

Figure 15:
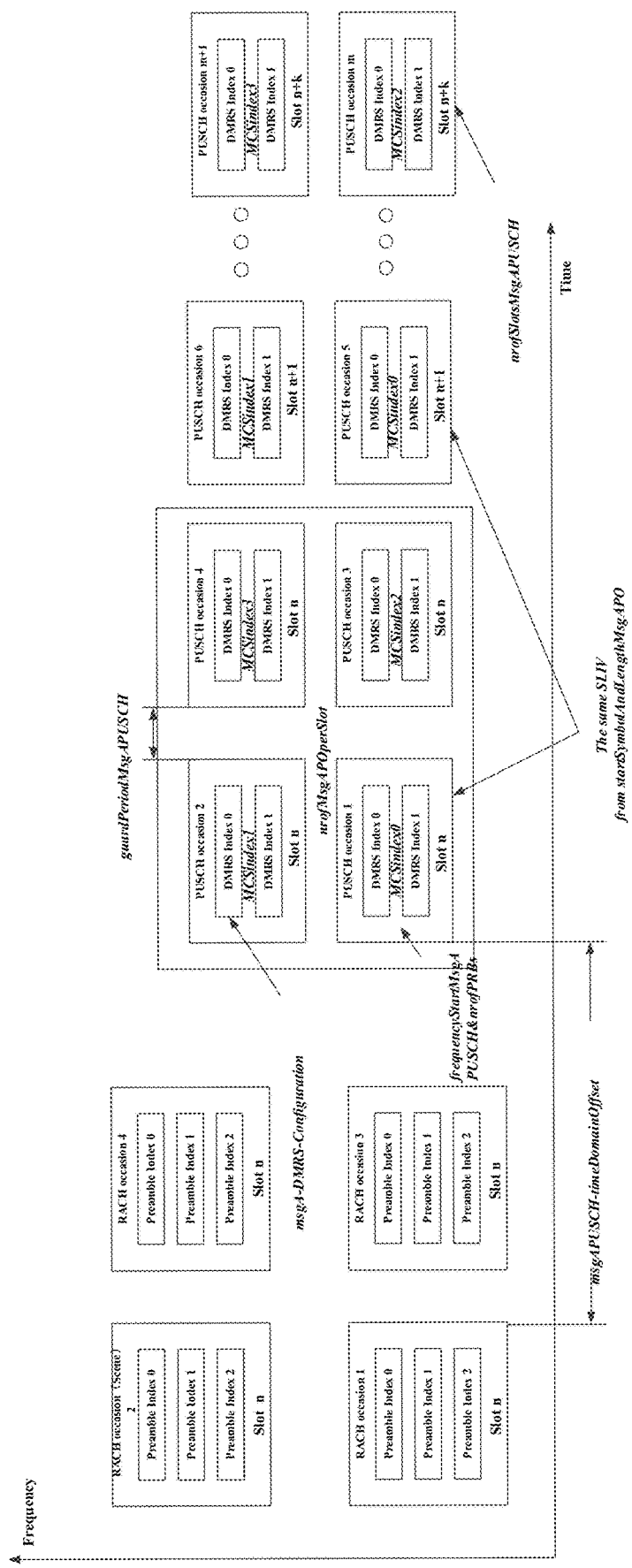
FIG. 15 is a schematic diagram of time-frequency resource allocation and correspondence between PRACH and PUSCH of MsgA in 2-step RACH in Example 4 of the present disclosure.

FIG. 15 is a schematic diagram of time-frequency resource allocation and correspondence between PRACH and PUSCH in MsgA in 2-step RACH in Example 4, and during specific implementation, the mapping between PRACH resources and PUSCH resources in MSGA resources in Example 1 may be referred to.

(3) The network side directly broadcasts sequence numbers of transport coded block TBS indexes or sequence numbers of MCS indexes and the corresponding MSGA uplink transmission resources (the preamble resource+the PUSCH uplink transmission resource). The network side and the UE do not need to agree on the mapping relationship between the TBS index or the MCS index and the MSGA uplink transmission resources. The UE finds corresponding uplink transmission resource according to network configuration, to transmit uplink data.

Mode 1: the network broadcasts one PRACH resource group and one PUSCH resource group, the PUSCH resource group includes a plurality of MCS indexes, and the network allocates corresponding PUSCH time-frequency resources for each MCS index, and each MCS index and corresponding PUSCH time-frequency resource correspond to a data block length TBS.

The base station transmits a broadcast signaling. The signaling includes PUSCH transmission resources (the number (nrofslotsMsgAPUSCH) of PUSCH transmission slots, the number (nrofMsgAPOperslot) of PUSCH transmission resources included in each slot, a TBS index (MSGA-TBSlndex), modulation and coding level (MSGA-MCS), time-domain resource allocation (start symbol and PUSCH length indication (symbol length indicator value SLIV (start and length indicator value)))), a time-domain interval of two PUSCH transmission resources in one slot (guard Period MsgA PUSCH), a frequency-domain spacing (guard band MsgA PUSCH) of two PUSCH transmission resources in one slot, a start frequency-domain allocation indication for PUSCH transmission resources (frequency-domain start position indication (frequencystartMsgAPUSCH) and the number of PRBs (nrofPRBsperMsgAPO), a pilot signal configuration (msgA-DMRS-Configuration) of PUSCH transmission resources, the total number of MCS indexes supported by MSGA (MSGA-MCS total), time-frequency resources (1, 2, ..., total) (MSGA-MCS-i (1, 2, ..., total) enumerating each MCS index and corresponding allocation. The format of the network-side broadcast information is shown in Table 14.

TABLE 14 physical layer information included in the broadcast signaling in the Mode 1

| Parameter (IE) | Description | Number of bits |
|---|---|---|
| MSGA-MCS total | total number of MCS indexes supported by MSGA | 5 bits |
| MSGA-MCS-i (1, 2, ... ,total) { | time-frequency resources (1, 2, ..., total) enumerating each MCS index and corresponding allocation | 4 bits |
| MSGA-MCS index | PUSCH transmitting Modulation and coding level | 4 bits |
| guard Period MsgA PUSCH | Time-domain interval between two PUSCH transmission resources in one slot | 8 bits |
| guard band MsgA PUSCH | Frequency-domain spacing between two PUSCH transmission resources in one slot | 8 bits |

TABLE 14-continued physical layer information included in the broadcast signaling in the Mode 1

| Parameter (IE) | Description | Number of bits |
|---|---|---|
| frequencystartMsgAPUSCH | Start frequency-domain allocation indication of PUSCH transmission resources, which is the same in each slot | 8 bits |
| SLIV | Time-domain indication of PUSCH resources | 6 bits (3 bits for indicating a start symbol and 3 bits for indicating a PUSCH length) |
| nrofslotsMsgAPUSCH | Number of PUSCH transmission slots | 8 bits |
| nrofMsgAPOperSlot | Number of PUSCH transmission resources included in each slot | 8 bits |
| msgA-DMRS-Configuration | Pilot signal configuration indicating PUSCH transmission resources | 32 bits |
| nrofPRBsperMsgAPO | Frequency-domain allocation of PUSCH resources, nrofPRBsperMsgAPOperTBS | 8 bits |
| } | | |

Figure 16:
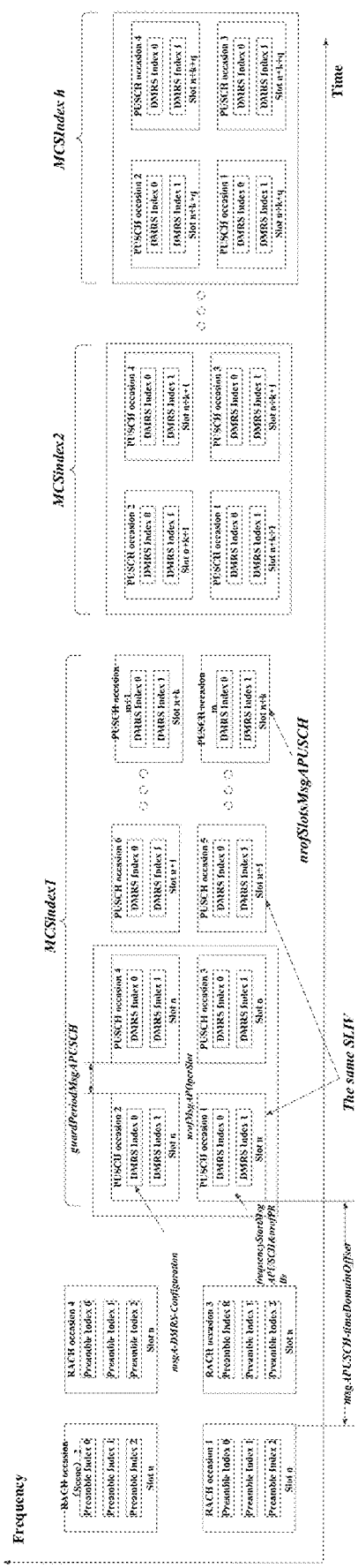
FIG. 16 is a schematic diagram of time-frequency resource allocation and correspondence between PRACH and PUSCH in Mode 1 of Mode (3) in Embodiment 4 of the present disclosure.

FIG. 16 is a schematic diagram of the time-frequency resource allocation and the correspondence between PRACH and PUSCH in Mode 1 of Mode (3) in Example 4. During specific implementation, reference may be made to the implementation of the mapping between PRACH resources and PUSCH resources in MSGA resources in Example 1.

Mode 2: the network side allocates a plurality PRACH resource groups and a plurality of PUSCH resource groups to the MSGA, the PRACH resource groups are in one-to-one correspondence to the PUSCH resource groups, and each PUSCH resource in a PUSCH resource group corresponds to one MCS and corresponding PUSCH time-frequency resources. Each PUSCH resource in a PUSCH resource group corresponds to a data transmission block TBS length.

The base station transmits a broadcast signaling, The signaling includes PUSCH transmission resources (the number (nrofslotsMsgAPUSCH) of PUSCH transmission slots, the number (nrofMsgAPOperslot) of PUSCH transmission resources included in each slot, a TBS index (MSGA-TBSlndex), modulation and coding level (MSGA-MCS), time-domain resource allocation (start symbol and PUSCH length indication (symbol length indicator value SLIV (start and length indicator value MsgA PO)))), a time-domain interval of two PUSCH transmission resources in one slot (guard Period MsgA PUSCH), a frequency-domain spacing (guard band MsgA PUSCH) of two PUSCH transmission resources in one slot, a start frequency-domain allocation indication for PUSCH transmission resources (frequency-domain start position indication (frequencystartMsgA-PUSCH) and the number of PRBs (nrofPRBsperMsgAPO), a pilot signal configuration (msgA-DMRS-Configuration) of PUSCH transmission resources, the total number of MCS indexes supported by MSGA (MSGA-MCS total), time-frequency resources (1, 2, . . . , total) (MSGA-MCS-i (1, 2, . . . , total) enumerating each MCS index and corresponding allocation. The format of the network-side broadcast information is shown in Table 15.

TABLE 15

Physical layer information included in the broadcast signaling in mode 2 in mode (3)

| Parameter (IE) | Description | Number of bits |
|---|---|---|
| MsgA-PUSCH-ResourceId1 | total number of MCS indexes supported by MSGA | 5 bits |
| { | time-frequency resources (1, 2, . . . , total) enumerating each MCS index and corresponding allocation | 4 bits |
| MSGA-MCS index | PUSCH transmitting Modulation and coding level | 4 bits |
| guard Period MsgA PUSCH | Time-domain interval between two PUSCH transmission resources in one slot | 8 bits |

TABLE 15-continued

Physical layer information included in the broadcast signaling in mode 2 in mode (3)

| Parameter (IE) | Description | Number of bits |
| --- | --- | --- |
| guard band MsgA PUSCH | Frequency-domain spacing between two PUSCH transmission resources in one slot | 8 bits |
| frequencystartMsgAPUSCH | Start frequency-domain allocation indication of PUSCH transmission resources, which is the same in each slot | 8 bits |
| SLIV | Time-domain indication of PUSCH resources | 6 bits (3 bits for indicating a start symbol and 3 bits for indicating a PUSCH length) |
| nrofslotsMsgAPUSCH | Number of PUSCH transmission slots | 8 bits |
| nrofMsgAPOperSlot | Number of PUSCH transmission resources included in each slot | 8 bits |
| msgA-DMRS-Configuration | Pilot signal configuration indicating PUSCH transmission resources | 32 bits |
| nrofPRBsperMsgAPO | Frequency-domain allocation of PUSCH resource, nrofPRBsperMsgAPOperTBS | 8 bits |
| } | | |
| MsgA-PUSCH-ResourceId 2 | total number of MCS indexes supported by MSGA | 5 bits |
| { | time-frequency resources (1, 2, . . . , total) enumerating each MCS index and corresponding allocation | 4 bits |
| MSGA-MCS index | PUSCH transmitting Modulation and coding level | 4 bits |
| guard Period MsgA PUSCH | Time-domain interval between two PUSCH transmission resources in one slot | 8 bits |
| guard band MsgA PUSCH | Frequency-domain spacing between two PUSCH transmission resources in one slot | 8 bits |
| frequencystartMsgAPUSCH | Start frequency-domain allocation indication of PUSCH transmission resources, which is the same in each slot | 8 bits |
| SLIV | Time-domain indication of PUSCH resources | 6 bits (3 bits for indicating a start symbol and 3 bits for indicating a PUSCH length) |
| nrofslotsMsgAPUSCH | Number of PUSCH transmission slots | 8 bits |
| nrofMsgAPOperSlot | Number of PUSCH transmission resources included in each slot | 8 bits |
| msgA-DMRS-Configuration | Pilot signal configuration indicating PUSCH transmission resources | 32 bits |
| nrofPRBsperMsgAPO | Frequency-domain allocation of PUSCH resources, nrofPRBsperMsgAPOperTBS | 8 bits |
| } | | |

TABLE 15-continued

Physical layer information included in the
broadcast signaling in mode 2 in mode (3)

| Parameter (IE) | Description | Number of bits |
| --- | --- | --- |
| . . . | . . . | . . . |
| MsgA-PUSCH-ResourceId m | total number of MCS indexes supported by MSGA | 5 bits |
| { | time-frequency resources (1, 2, . . . , total) enumerating each MCS index and corresponding allocation | 4 bits |
| MSGA-MCS index | PUSCH transmitting Modulation and coding level | 4 bits |
| guard Period MsgA PUSCH | Time-domain interval between two PUSCH transmission resources in one slot | 8 bits |
| guard band MsgA PUSCH | Frequency-domain spacing between two PUSCH transmission resources in one slot | 8 bits |
| frequencystartMsgAPUSCH | Start frequency-domain allocation indication of PUSCH transmission resources, which is the same in each slot | 8 bits |
| SLIV | Time-domain indication of PUSCH resources | 6 bits (3 bits for indicating a start symbol and 3 bits for indicating a PUSCH length) |
| nrofslotsMsgAPUSCH | Number of PUSCH transmission slots | 8 bits |
| nrofMsgAPOperSlot | Number of PUSCH transmission resources included in each slot | 8 bits |
| msgA-DMRS-Configuration | Pilot signal configuration indicating PUSCH transmission resources | 32 bits |
| nrofPRBsperMsgAPO | Frequency-domain allocation of PUSCH resource, nrofPRBsperMsgAPOperTBS | 8 bits |
| } | | |

Figure 17:
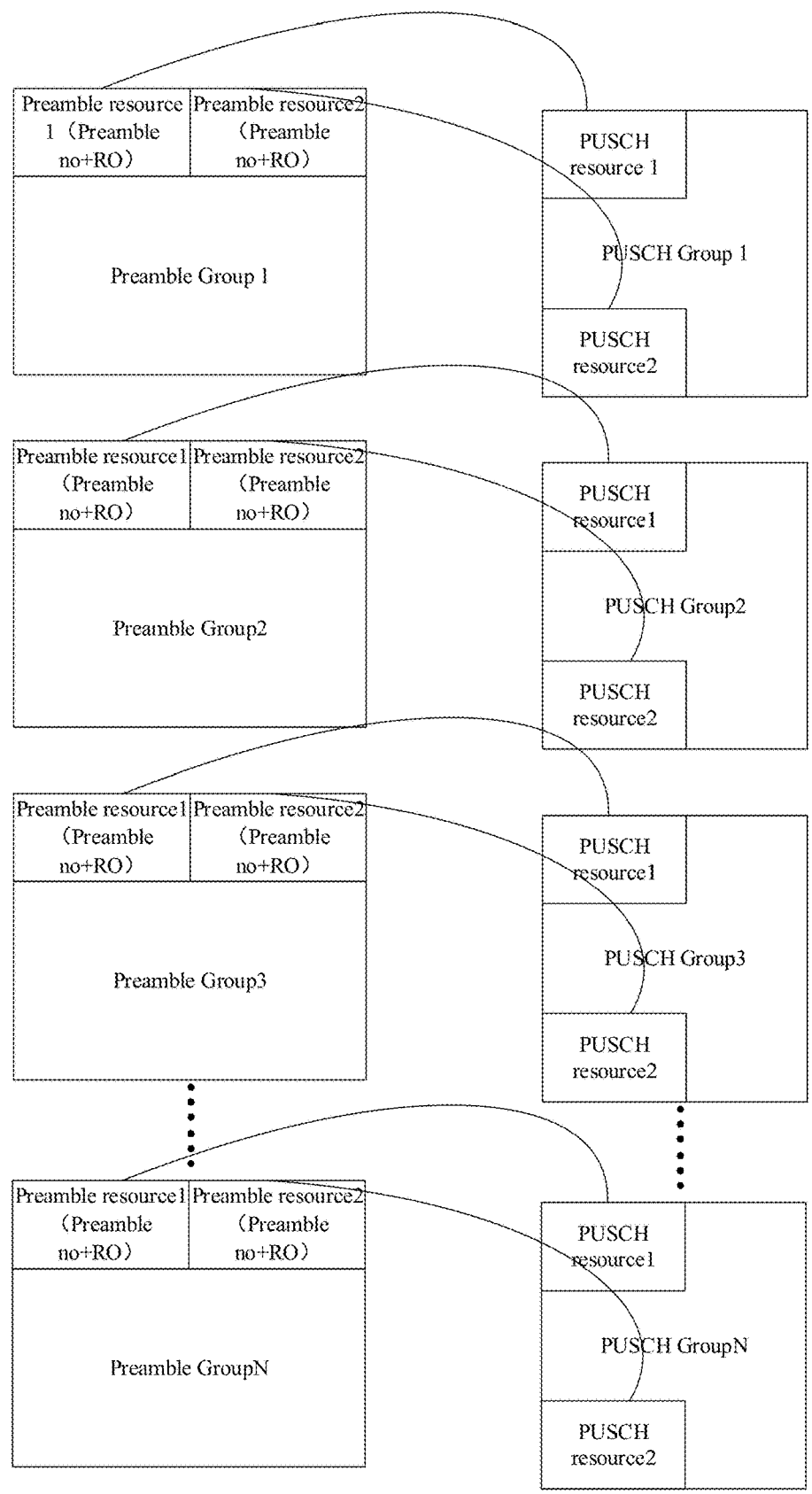
FIG. 17 is a schematic diagram of time-frequency resource allocation and correspondence between PRACH and PUSCH in Mode (3) Mode 2 in Example 4 of the present disclosure.

FIG. 17 is a schematic diagram of time-frequency resource allocation and correspondence between PRACH and PUSCH in mode (3) of mode 2 in Example 4. As shown in FIG. 17, mapping between PRACH resources and PUSCH resources in MSGA resources can be implemented as follows:

The MSGA resources include two groups of resources, i.e., a PRACH resource group and a PUSCH resource group, and the mapping relationship between the two groups of resources may be that one PRACH resource may correspond to a plurality of PUSCH resource groups, or one PRACH resource may correspond to one PUSCH resource group.

(1) a PRACH resource group and PUSCH resources are mapped in a one-to-one manner, one preamble resource (a preamble code and a resource for RACH transmission) in one PRACH resource group may correspond to one PUSCH resource in each of a plurality of PUSCH resource groups.

As shown in FIG. 7 and FIG. 8, a resource in the PRACH resource group and a resource of a PUSCH resource group resources in the figures are mapped in a one-to-one manner, the network may configure multiple PRACH resource groups and multiple PUSCH resource groups, and each PRACH resource group and each PUSCH resource group are mapped in a one-to-one manner. Meanwhile, the MCS of each PUSCH resource group is configurable, specifically, each PRACH resource and each PUSCH resource may be configured to be in a one-to-one correspondence, or multiple PRACH resources in one PRACH resource group may correspond to one PUSCH resource in one PUSCH resource group.

As shown in FIG. 9, the network may also configure multiple groups of resources, i.e., PRACH resource groups and PUSCH resource groups, some PUSCH resource groups have a corresponding PRACH resource group, and some PUSCH resource groups have no corresponding PRACH resource group, since resources in these PRACH resource groups are used by a fixed terminal.

(2) One-to-many mapping is configured for PRACH resource groups and PUSCH resource groups, resources of one PRACH resource group are divided into several PRACH resource sub-groups according to the total number of PUSCH resource groups, and each resource sub-group corresponds to one PUSCH resource group.

FIG. 11 and FIG. 12 are schematic diagrams illustrating mapping relationship between a PRACH resource group and two or more groups. As shown in the figures, a PRACH resource group corresponds to a PUSCH resource group, PRACH resource sub-groups correspond to PUSCH resources, i.e., a group corresponds to a group, and a resource corresponds to a resource.

As shown in FIG. 11, one PRACH resource group may correspond to two or more PUSCH resource groups, and one PRACH resource sub-group of one PRACH resource group may correspond to one PUSCH resource in two or more PUSCH resource groups, respectively. The terminal may transmit data on one or more PUSCH resources, and the base station may determine whether there is data transmission on two or more PUSCH resources through blind decoding.

As shown in FIG. 12, one PRACH resource group may correspond to two or more PUSCH groups, a part of the resources of the PRACH resource group corresponds to the PUSCH resources in the first PUSCH resource group, and another part of the resources of the PRACH resource group corresponds to the PUSCH resources in the second PUSCH resource group. FIG. 11 shows that each PRACH resource can correspond to PUSCH resources of different PUSCH resource groups, and the network side finds the PUSCH resources transmitted by the terminal by blindly decoding all possible PUSCH transmission resources. If two UEs transmit the same PRACH+two different PUSCHs and the network side successfully demodulates data of the two PUSCHs, then the network transmits success RAR, and if timing advance (TA) transmission information is not carried, and the two UEs know that the network has successfully received uplink data carried by the PUSCHs but collision of PRACH occurs, then the two UEs will send only the PRACH again to obtain TA. If the network transmits the success RAR carrying the TA, then both UE use this TA for data transmission, and if the data transmission fails, the 2-step RACH needs to be restarted.

In FIG. 12, each PRACH resource corresponds to only a unique PUSCH resource.

When the MSGA resources are mapped to the TBS indexes/MCS indexes, there can be at least three following modes, and implementation is described below.

1. first mode:
this mode is a mode that implicitly indicates the mapping relationship between the TBS indexes/MCS indexes and the MSGA uplink transmission resources, and the mapping relationship needs to be determined in advance by the UE and the network side. First, both the network side and the UE need to rank uplink transmission resources (including preamble resource allocation and PUSCH resource allocation) in the MSGA, for example, if the total number of resources is N, then each resource needs to be numbered (0, 1, ... , N−1), the mapping relationship between each resource numbering value and the TBS index/MCS index is established.

2. second mode:
this mode is a mode that implicitly indicates the mapping relationship between the TBS indexes/MCS indexes and the MSGA uplink transmission resources, and the mapping relationship needs to be determined in advance by the UE and the network side. The multiple TBS indexes or MCS indexes broadcast by the network side can be transmitted on any uplink transmission resource in MSGA. The network does not need to allocate a dedicated uplink transmission resource in MSGA for each TBS index or MCS index. In this mode, the network side needs to perform blind decoding of a modulation mode on the uplink transmission resource.

3. third mode:
this mode is a mode that the MSGA uplink transmission resource corresponding to each TBS index or MCS index is directly carried in a broadcast signaling.

Hereinafter, an embodiment for mapping between preamble resources and PUSCH resources in the MSGA resources will be described.

The MSGA resources may include PRACH resource groups and PUSCH resource groups. The mapping relationship between the PRACH resource groups and PUSCH resource groups may be that a PRACH resource group corresponds to a PUSCH resource group, and a PRACH resource sub-group corresponds to a PUSCH resource.

(1) a preamble resource (a preamble code and a resource for RACH transmission) in one PRACH group may correspond to one PUSCH resource in each PUSCH resource group in a plurality of PUSCH resource group.

(2) resources of a PRACH resource group are divided into several PRACH resource sub-groups according to the total number of PUSCH resource groups, and each resource sub-group corresponds to one PUSCH resource group. That is, the network configures the number of the PUSCH resource groups to be the same as the number of PRACH resource sub-groups.

EXAMPLE 9

MSGA physical layer resources allocated by the network side in one cycle include total PRACH resources ($T_{PRACH}$) and total PUSCH resources ($T_{PUSCH}$), and the correspondence between PRACH transmission resources and PUSCH transmission resources may be shown in Formula 9, one PUSCH may correspond to at least one PRACH resource.

$$N_{preamble} = \text{ceil}(T_{preamble}/\alpha T_{PUSCH}) \qquad (9)$$

$T_{PUSCH} = T_{PO} \times N_{DMRSperPO}$,
$T_{PO}$=nrofslotsMsgAPUSCH×nrofMsgAPOperSlot,
$N_{DMRSperPO}$ is obtained from msgA-DMRS-Configuration. $\alpha$ is a PUSCH resource aggregation level in the $T_{PO}$ in one cycle and may take a value of $\alpha \leq 1$, for example, may take a value of 1, ½, ¼, ⅙, ⅛, 1/16, which is easy to understand. When the value is 1, the formula (9) is formula (7). If $\alpha<1$, it means that a plurality of PUSCH transmission resources are bundled into a PUSCH resource transmission group, and this group of resources corresponds to one or more PRACH resource sub-groups in the PRACH resource group.

Figure 23:
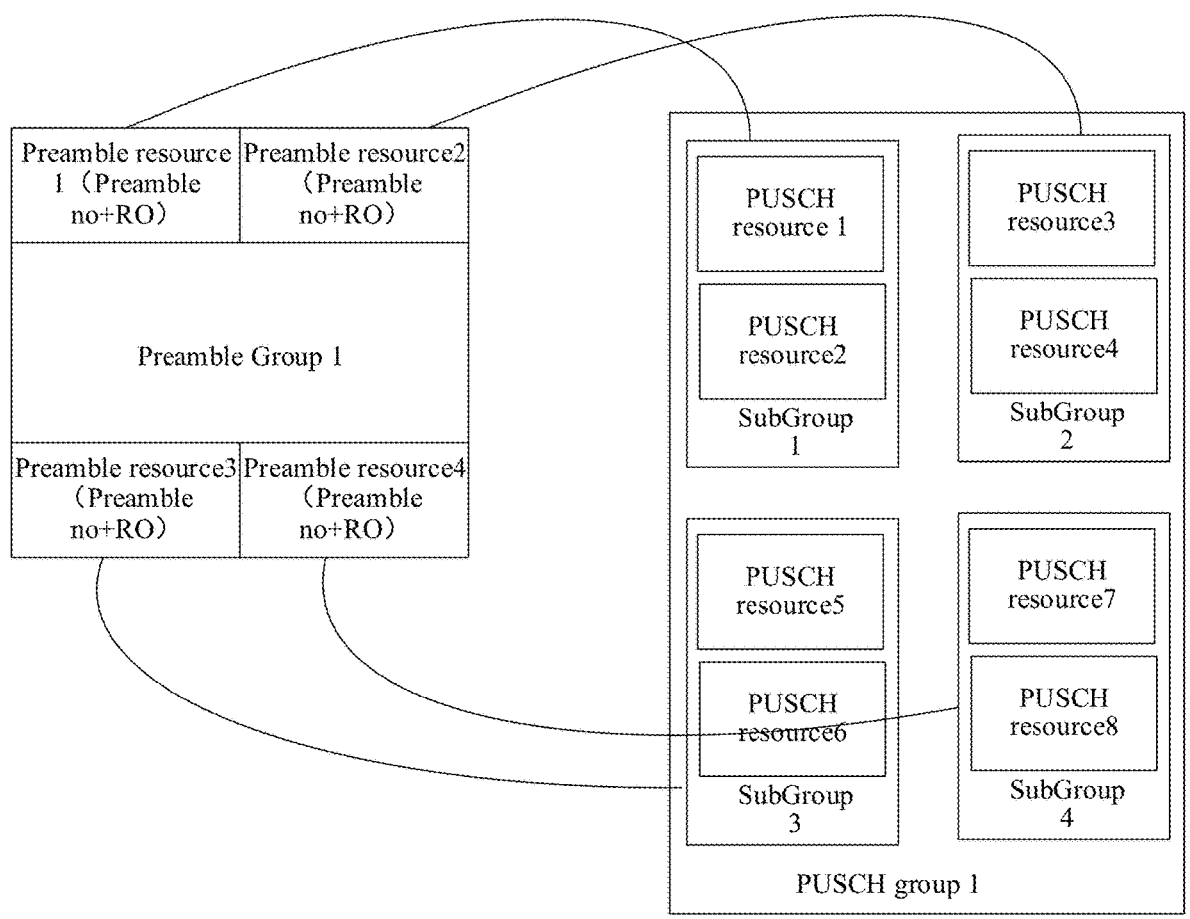
FIG. 23 is a first schematic diagram of resource allocation in case that $\alpha=\frac{1}{2}$ according to some embodiments of the present disclosure.
Figure 24:
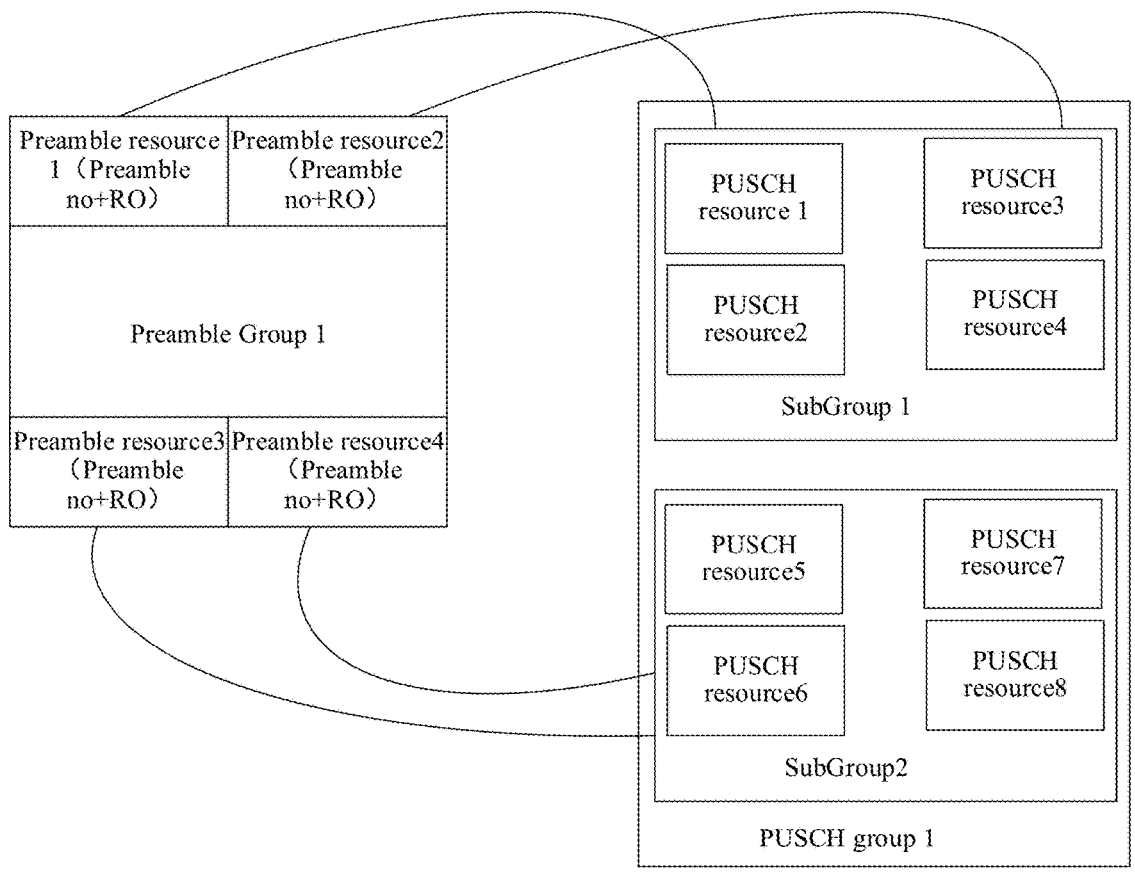
FIG. 24 is a schematic diagram of resource allocation in case that $\alpha=\frac{1}{4}$ according to some embodiments of the present disclosure.
Figure 25:
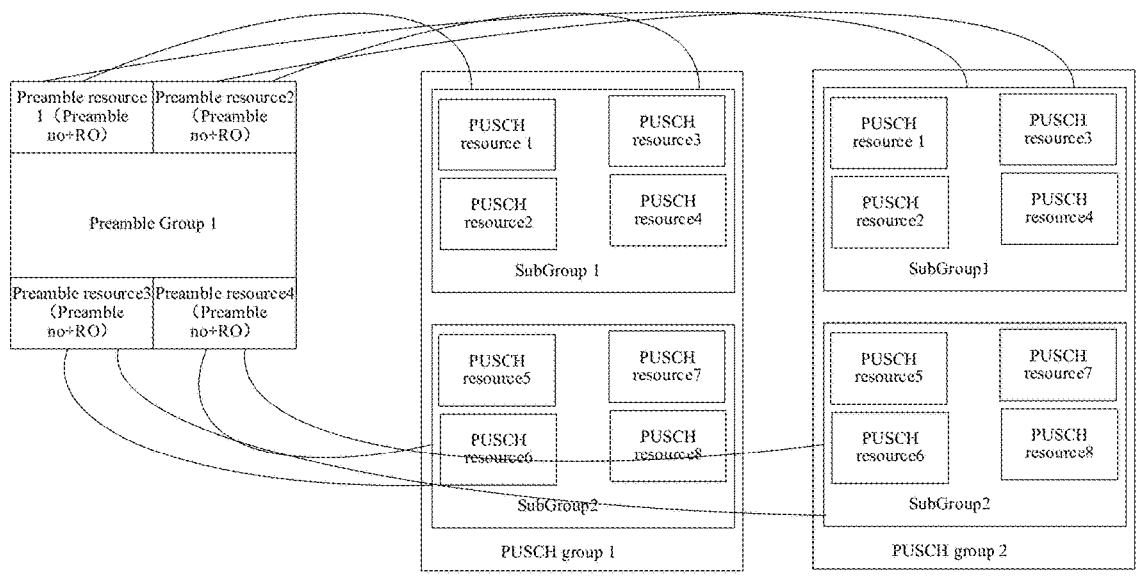
FIG. 25 is a second schematic diagram of resource allocation when $\alpha=\frac{1}{2}$ according to some embodiments of the present disclosure.

FIG. 23 is a first schematic diagram of resource allocation when $\alpha=½$, FIG. 24 is a schematic diagram of resource allocation when $\alpha=¼$, and FIG. 25 is a second schematic diagram of resource allocation when $\alpha=½$.

In FIG. 23, when $\alpha=½$, one PRACH resource group corresponds to one PUSCH resource group; in the PUSCH resource group, two PUSCH transmission occasions form one PUSCH transmission occasion resource sub-group, and each PUSCH resource sub-group corresponds to one or more PRACH resource sub-groups. Each PUSCH transmission occasion resource sub-group corresponds to $N_{DMRSperPOsubgroup}$ DMRS index.

In FIG. 24, when $\alpha=¼$, one PRACH resource group corresponds to one PUSCH resource group; in the PUSCH resource group, four PUSCH transmission occasions form one PUSCH transmission occasion resource sub-group, and each PUSCH resource sub-group corresponds to two or more PRACH resource sub-groups. Each PUSCH transmission occasion resource sub-group corresponds to $N_{DMRSperPOsubgroup}$ DMRS index.

In FIG. 25, when $\alpha=½$, one PRACH resource group corresponds to two or more PUSCH resource groups; in a PUSCH resource group, two PUSCH transmission occasions form one PUSCH transmission occasion resource sub-group, and each PUSCH resource sub-group corresponds to one or more PRACH resource sub-groups. Each PUSCH transmission occasion resource sub-group corresponds to $N_{DMRSperPOsubgroup}$ DMRS index. One PRACH resource sub-group may correspond to one PUSCH transmission occasion resource sub-group in each of the two PUSCH resource groups, and the gNB may know whether the UE transmits data in both PUSCH resource groups by blindly decoding the resources of the two PUSCH resource groups.

Implementation at the terminal side is described below.

Main steps of sending the MSGA at the terminal side are as follow.

1. the UE obtains a plurality of sets of MSGA configurations from the network side;
2. the UE selects a set of MSGA configurations based on specific rules, such as selects according to RSRP, SINR, and a size of transmitted data;
3. the UE performs MSGA transmission according to the selected set of configurations;
4. if the terminal has a large volume of data to be transmitted, but a channel condition of the terminal only permits a low modulation and coding level (MCS level), then the terminal may split the data into data blocks, and transmit part of the data blocks in a PUSCH in the MsgA, and indicates in a MAC that subsequent data blocks exist, and the network side allocates UL grant (uplink scheduling information) in success RAR in MSGB, and the UE may return to a non-connected state after transmitting successfully the data blocks in a connected state.

Specific processing at the terminal side will be described below.

EXAMPLE 5

After receiving specific information and the number of TBSs/MCSs included in the broadcast signaling, and the preamble resource allocation and the PUSCH resource allocation in the MSGA, the UE knows the specific location and the total number of uplink transmission resources of the MSGA currently configured by the network, and the specific information and the number of TBSs/MCSs currently indicated by the network.

The UE calculates how many information bits each uplink transmission resource of the MSGA can carry, according to the mapping relationship between each resource numbering value and a TBS index/MCS index agreed upon by the UE and the network in advance, and then the UE determines uplink transmission resources (the UE calculates the number of bits to be transmitted according to service requirement of the UE itself and compares the number of bits carried by each resource with the calculated number of bits, and finds a transmission resource which carries the number of bits equal to or greater than the number of bits to be sent by the UE itself and closest to the number of bits to be sent by the UE itself).

During implementation, two aspects can be considered: if the network broadcasts a fixed MCS level, then only the size of the TBS needs to be considered; if the network broadcasts a plurality of MCS level sequence numbers, then the UE needs to first select, according to the RSRP and/or the SINR, one or more matched MCS levels in the broadcast signaling, and then find the MSGA uplink transmission resource corresponding to the one or more MCS levels, and then determine data bits carried by each resource, and then compare the determined data bits with actual transmission bits of the UE, and finally find the suitable uplink transmission resource. If necessary, padding bits are added, and then data is transmitted on a selected resource block after performing modulation and coding according to the MCS level corresponding to a resource block.

Figure 18:
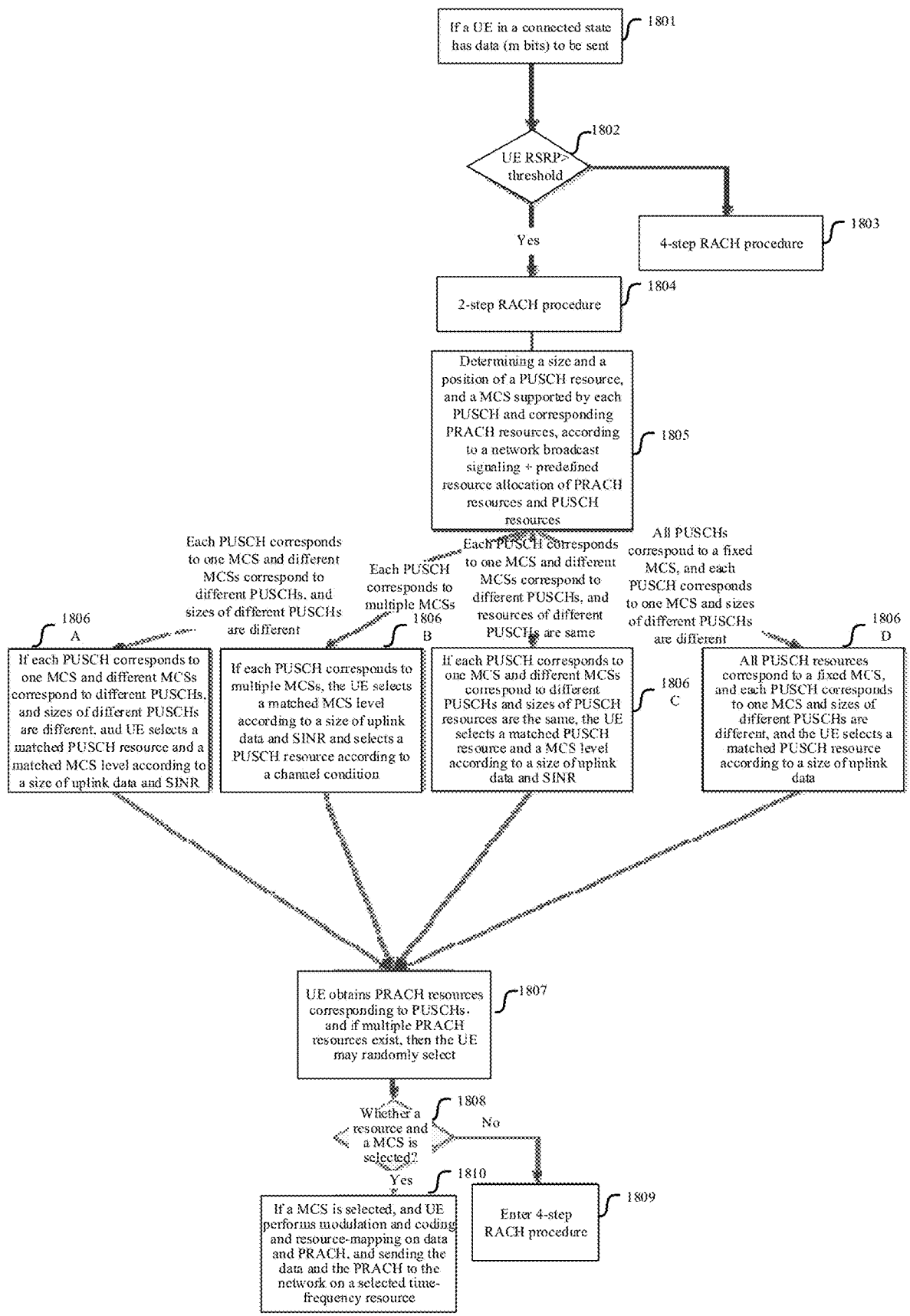
FIG. 18 is a schematic flowchart of selecting PRACH and PUSCH resources based on a MCS level at the terminal side in Example 5 of the present disclosure.

FIG. 18 is a schematic flow chart of selecting PRACH resources and PUSCH resources based on MCS level at the terminal side in Example 5, as shown in FIG. 18. From the point of view of the terminal, the following steps are mainly included:

Step 1801: the UE in the non-connected state has data to send.

Step 1802: the UE determines whether the RSRP is greater than the RSRP threshold, and if yes, then the process proceeds to step 1804, otherwise, the process proceeds to step 1803.

If the UE is in the non-connected state, such as the idle state (Idle) or the inactive state (Inactive), then the UE has uplink data to transmit and compares the RSRP of the UE itself with the RSRP threshold, and adopts the 2-step RACH, if greater than the threshold, or adopt the 4-step RACH if less than the threshold.

Step 1803: the UE enters the 4-step RACH procedure.

Step 1804: the UE enters the 2-step RACH procedure.

If the UE selects the 2-step RACH procedure, PRACH configuration information and PUSCH configuration information in the MSGA of the 2-step RACH broadcast by the network is read by the UE.

Step 1805: the UE determines the size and the locations of PUSCH resources, and a MCS supported by each PUSCH and corresponding PRACH resources according to a network broadcast signaling/according to a network broadcast signaling+pre-agreed PRACH and PUSCH resource allocation.

Step 1806A: if each PUSCH corresponds to one MCS and different MCSs correspond to different PUSCHs, the sizes of the PUSCHs are different, then the UE selects matched PUSCH resources and MCS levels according to the size of uplink data and the SINR.

Step 1806B: if each PUSCH corresponds to multiple MCSs, the UE selects a matched MCS level according to the size of uplink data and SINR and selects PUSCH resources according to channel conditions.

Step 1806C: if each PUSCH corresponds to one MCS and different MCSs correspond to different PUSCHs and the sizes of PUSCH resources are the same, the UE selects matched PUSCH resources and MCS levels according to the size of uplink data and SINR.

Step 1806D: all PUSCH resources correspond to a fixed MCS, each PUSCH corresponds to an MCS and the sizes of PUSCHs are different, and the UE selects a matched PUSCH resource according to the size of uplink data.

Step 1807: the UE acquires a PRACH resource correspond to a PUSCH, and if there are multiple PRACH resources, the UE may randomly select the PRACH resource.

Step 1808: the UE determines whether a resource and an MCS are selected, and if no, then proceeds to step 1809 for performing 4-step RACH, or if yes, then proceeds to step 1810.

Step 1809: the UE enters the 4-step RACH procedure.

Step 1810: if an MCS is selected, then the UE performs modulation and coding and resource mapping on the data and the PRACH and sends the data to the network on the corresponding time-frequency resources.

EXAMPLE 6

The broadcast signaling received by the UE includes sequence numbers and the number of TBS/MCS indexes, and uplink transmission resources (the preamble resource allocation and the PUSCH resource allocation) in the MSGA allocated for the sequence numbers of TBS/MCS indexes included in the broadcast signaling received by the UE, the UE knows the specific information and the number of TBSs/MCSs currently indicated by the network, and the specific location and the number of MSGA uplink transmission resources corresponding to each TBS/MCS index.

Based on this, the UE calculates how many information bits each uplink transmission resource of the MSGA can carry, and then the UE determines uplink transmission resources (the UE calculates the number of bits to be transmitted according to service requirement of the UE itself and compares the number of bits carried by each resource with the calculated number of bits, and finds a transmission resource which carries the number of bits equal to or greater than the number of bits to be sent by the UE itself and closest to the number of bits to be sent by the UE itself).

During implementation, two aspects can be considered: if the network broadcasts a fixed MCS level, then only the size of the TBS needs to be considered (of course, whether MSGA resources can be used by the current RSRP and SINK should also be considered; if the UE cannot use the MSGA uplink transmission resource, the UE also needs to select a normal access manner, and then performs transmission after having accessed to the network); if the network broadcasts a plurality of MCS level sequence numbers, then the UE needs to first select, according to the RSRP and/or the SINR, one or more matched MCS levels in the broadcast signaling, and then find the MSGA uplink transmission resource corresponding to the one or more MCS levels, and then determine data bits carried by each resource, and then compare the determined data bits with actual transmission bits of the UE, and finally find the suitable uplink transmission resource. If necessary, padding bits are added, and then data is transmitted on a selected resource block after performing modulation and coding according to the MCS level corresponding to a resource block.

For implementation of the PRACH and PUSCH resource selection procedure based on the MCS level at the terminal side, implementation and description of FIG. 17 in Example 5 may be referenced.

EXAMPLE 7

The network side allocates a plurality of PRACH resource groups and PUSCH resource groups to the MSGA, the PRACH resource groups and the PUSCH resource groups are in a one-to-one correspondence, and each resource of a PUSCH resource group corresponds to one MCS and corresponding PUSCH time-frequency resources. Each resource of a PUSCH resource group corresponds to a data transmission block TBS length.

Figure 19:
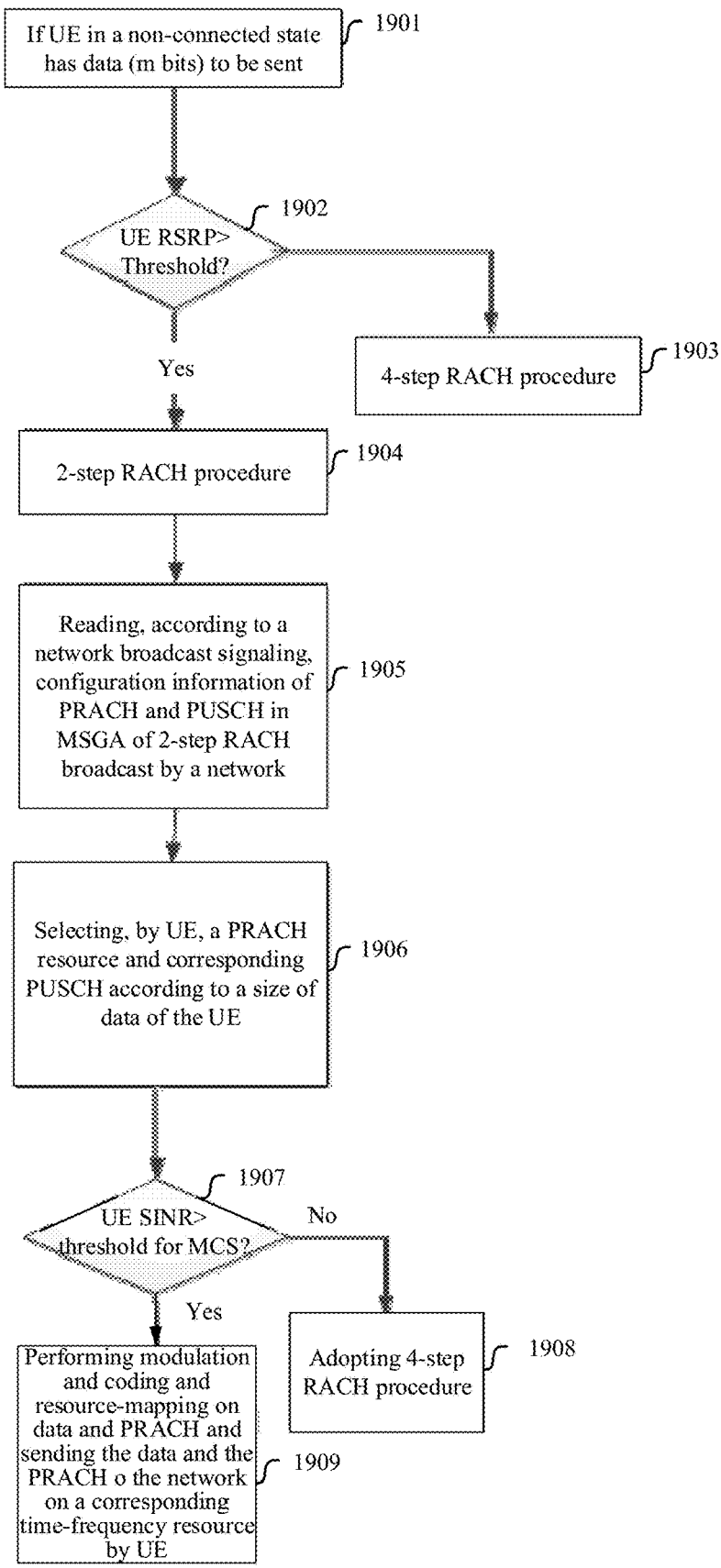
FIG. 19 is a schematic flowchart of selecting PRACH and PUSCH resources based on a MCS level at the terminal side in Example 7 of the present disclosure.

FIG. 19 is a flowchart of selecting PRACH resources and PUSCH resources based on a MCS level at the terminal side in Example 7, and as shown in FIG. 19, from the perspective of the terminal, the flowchart mainly includes the following steps:

Step 1901: the UE in the non-connected state has data to send.

Step 1902: the UE determines whether the RSRP is greater than the RSRP threshold; if yes, the UE proceeds to step 1904, otherwise, the UE proceeds to step 1903.

If the UE is in the non-connected state, such as the idle state (Idle) or the inactive state (Inactive), then the UE has uplink data to transmit and compares the RSRP of the UE itself with the RSRP threshold, and adopts the 2-step RACH if greater than the threshold, or adopt the 4-step RACH if less than the threshold.

Step 1903: the UE enters the 4-step RACH procedure.

Step 1904: the UE enters the 2-step RACH procedure.

If the UE selects the 2-step RACH procedure, PRACH configuration information and PUSCH configuration information in the MSGA of the 2-step RACH broadcast by the network is read by the UE.

Step 1905: the UE reads the PRACH configuration information and the PUSCH configuration information in the MSGA of the 2-step RACH broadcasted by the network, according to the broadcast signaling broadcast by the network.

Step 1906: the UE selects PRACH resources and corresponding PUSCH resources according to the size of data of the UE.

Step 1907: the UE determines whether the SINR is greater than the SINR threshold corresponding to the MCS, and if the SINR is less than the SINR threshold, then the UE proceeds to step 1908 to execute the 4-step RACH, or if the SINR is larger than the SINR threshold, then the UE proceeds to the step 1909.

The UE determines whether the SINR is greater than the SINR threshold corresponding to the MCS, and if not greater than the SINR threshold, then the 4-step RACH is performed.

Step 1908: the process enters the 4-step RACH procedure.

Step 1909: the UE performs modulation and coding on the data and the PRACH and performs resource mapping on the data and the PRACH, and sends the data to the network on the corresponding time-frequency resources.

EXAMPLE 8

The network side may configure multiple PRACH resource groups and multiple PUSCH resource groups, some PUSCH resource groups have corresponding PRACH resource groups, some PUSCH resource groups do not have corresponding PRACH resource groups, since these resources are used for a fixed terminal, these resources have an effective TA (Timing Advanced).

Figure 20:
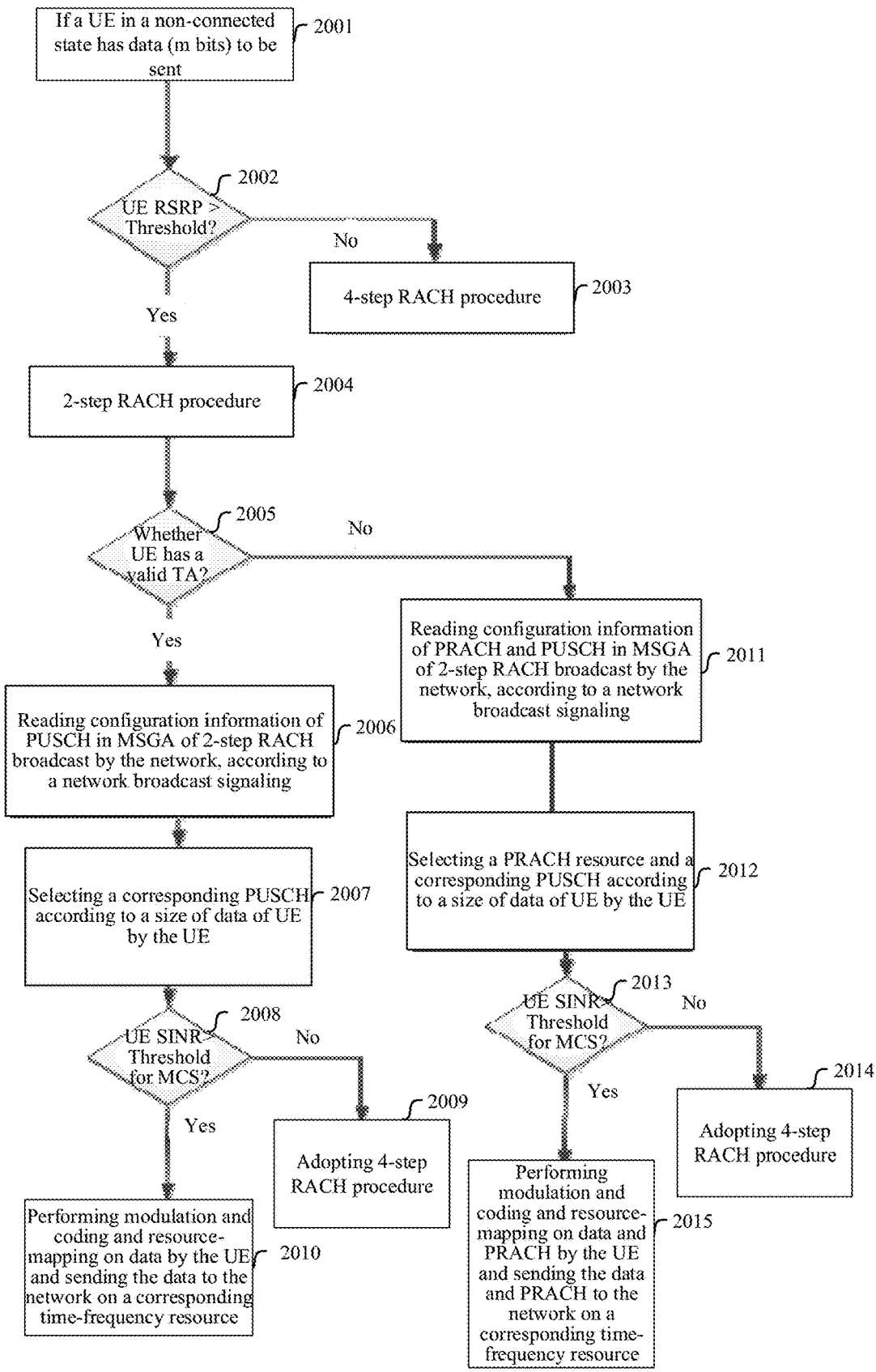
FIG. 20 is a schematic flowchart of selecting PRACH and PUSCH resources based on a MCS level at the terminal side in Example 8 of the present disclosure.

FIG. 20 is a schematic flow chart of selecting PRACH resources and PUSCH resources based on a MCS level at the terminal side in Example 8. as shown in FIG. 20, from the point of view of the terminal, the flow chart mainly includes the following steps:

Step 2001: the UE in the non-connected state has data to send.

Step 2002: the UE determines whether the RSRP is greater than the RSRP threshold; if yes, the process proceeds to step 2004, otherwise, the process proceeds to step 2003.

If the UE is in the non-connected state and the UE has uplink data to send and compares the RSRP of the UE with the RSRP threshold; if the RSRP is larger than the threshold, then 2-step RACH is adopted, or if the RSRP is smaller than the threshold, then 4-step RACH is adopted.

Step 2003: the UE enters the 4-step RACH procedure.

Step 2004: the UE enters the 2-step RACH procedure.

Step 2005: whether the UE has a valid TA is determined; if yes, the process proceeds to step 2006, otherwise, the process proceeds to step 2011.

If the UE selects the 2-step RACH procedure, whether there is a valid TA is determined, and if there is a valid TA, only the data is transmitted; if there is no valid TA, then the UE needs to send the PRACH+PUSCH.

If there is a valid TA, the PUSCH configuration information in the MSGA of the 2-step RACH broadcast by the network is read. The UE judges whether the SINR is greater than the SINR threshold corresponding to the MCS, and if not greater than the SINR threshold, then the 4-step RACH is performed. If the SINR of the UE is great than the SINR threshold corresponding to the MCS, then the UE performs modulation and coding on the data and performs resource mapping on the data and sends the data to the network on the corresponding time-frequency resources.

If there is no valid TA, then the PRACH configuration information and the PUSCH configuration information in the MSGA of the 2-step RACH broadcast by the network is read. The UE selects PRACH resources and corresponding PUSCH resources according to the size of the data of the UE. The UE determines whether the SINR is greater than the SINR threshold corresponding to the MCS, and if not greater than the SINR threshold, then the 4-step RACH is performed. If the SINR of the UE is greater than the SINR threshold corresponding to the MCS, then the UE performs modulation and coding on the data and the PRACH and performs resource mapping on the data and the PRACH, and sends the data and the PRACH to the network on the corresponding time-frequency resources.

Step 2006: the PUSCH configuration information in the MSGA of the 2-step RACH broadcasted by the network is read according to the broadcast signaling broadcast by the network.

Step 2007: the UE selects a corresponding PUSCH resource according to the size of the data of the UE.

Step 2008: the UE judges whether the SINR is greater than the SINR threshold corresponding to the MCS, and if the SINR is less than the SINR threshold, then the UE proceeds to step 2009 to execute the 4-step RACH; if the SINR is greater than the SINR threshold, then proceeds to step 2009.

Step 2009: the UE enters the 4-step RACH procedure.

Step 2010: the UE performs modulation and coding and performs resource mapping on the data and sends the data to the network on corresponding time-frequency resources.

Step 2011: the PRACH configuration information and the PUSCH configuration information in the MSGA of the 2-step RACH broadcast by the network is read according to the broadcast signaling broadcast by the network.

Step 2012: the UE selects PRACH resources and corresponding PUSCH resources according to the size of the data of the UE.

Step 2013: the UE determines whether the SINR is greater than the SINR threshold corresponding to the MCS, and if the SINR is less than SINR threshold, then proceeds to the step 2014 to perform the 4-step RACH; if the SINR is greater than the SINR threshold, then proceeds to step 2015.

Step 2014: the UE enters the 4-step RACH procedure.

Step 2015: the UE performs modulation and coding and resource mapping on the data and the PRACH and sends the data and the PRACH to the network on the corresponding time-frequency resources.

Based on the same inventive concept, some embodiments of the present disclosure also provide a base station, a user equipment, a random access device on a network side, a random access device on a terminal side, and a computer-readable storage medium. Since the principle of solving the problem by these devices is similar to the random access method, the implementation of these devices may refer to the implementation of the method, and repetition of description of the devices as compared with description of the method is not further described.

In implementing the technical solutions provided by some embodiments of the present disclosure, the embodiments may be implemented as follows.

Figure 21:
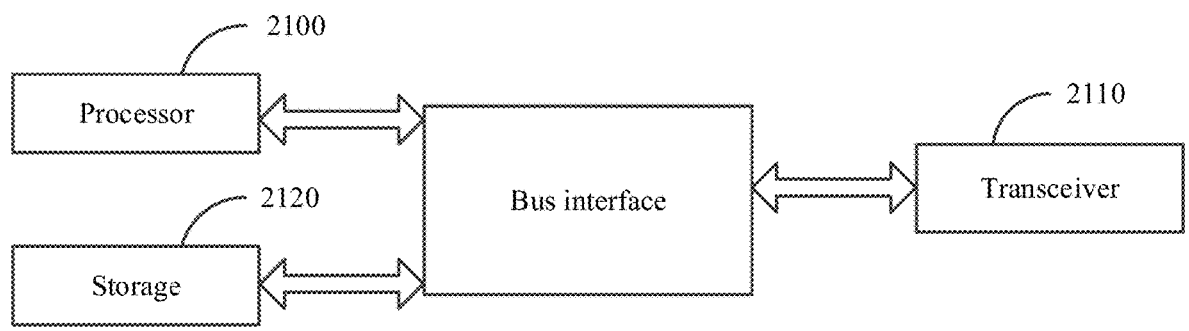
FIG. 21 is a structural schematic diagram of a base station according to some embodiments of the present disclosure.

FIG. 21 is a structural schematic diagram of a base station, as shown in the figure, the base station includes a processor 2100, a memory 2120 and a transceiver 2110. The processor 2100 is configured for reading a program in the memory 2120 and performing the following steps: receiving a MSGA from a terminal, wherein uplink transmission resources for transmitting the MSGA are configured by the network side, at least two uplink transmission resources exist, and uplink data blocks transmitted on each of the at least two uplink transmission resources have different sizes; the terminal selects, according to a size of a transmitted uplink data block, one of the uplink transmission resources for transmitting the MSGA; sending a MSGB to the terminal.

The transceiver 2110 is configured for receiving and transmitting data under the control of the processor 2100.

During implementation, configuring uplink transmission resources includes configuring PRACH resources and PUSCH resources, and mapping relationship between the PRACH resources and the PUSCH resources; and allocating one or more MCSs or TBSs and time-frequency resources of uplink transmission resources corresponding to the one or more MCSs or TBSs based on a size of each uplink data block.

During implementation, the mapping relationship between PRACH resources and PUSCH resources is established according to the following formula:

$$N_{preamble} = \text{ceil}(T_{preamble}/\alpha T_{PUSCH})$$

Where, ceil is a function that returns the minimum integer larger than or equal to a specified expression, $T_{PUSCH} = T_{PO} * N_{DMRSperPO}$; $T_{PO} = \text{nrofslotsMsgAPUSCH} * \text{nrofMsgAPOperSlot}$, $N_{DMRSperPO}$ is obtained from msgA-DMRS-Configuration, $N_{POperTBS} = \text{ceil}(T_{PO}/T_{TBS} \text{ or } T_{MCS})$, $N_{POperTBS}$ is the number of PUSCH transmission resources corresponding to each TBS, $T_{TBS}$ is the total number of TBS indexes, and $T_{MCS}$ is the total number of MCS indexes, where each parameter has the following meanings:

$N_{preamble}$: the number of preamble indexes or the number of PRACH resources corresponding to each PUSCH resource in one cycle;

$T_{preamble}$: the total number of preamble indexes or the total number of PRACH resources in one cycle;

$T_{PUSCH}$: the total number of PUSCH resources in one cycle;

$T_{PO}$: the total number of PUSCH transmission occasions in one cycle;

nrofslotsMsgAPUSCH: in one cycle, the total number of slots that can carry PUSCH transmissions;

nrofMsgAPOperSlot: the number of PUSCH transmission occasions in each slot;

$N_{DMRSperPO}$: the number of DMRSs included in each PUSCH transmission occasion;

α: an aggregation level of PUSCH resources in $T_{PO}$ within a cycle, which takes a value of α≤1.

During implementation, the relationship between sequence numbers of the TBS indexes or sequence numbers of the MCS indexes and the uplink transmission resources when allocating is: sorting the PUSCH resource by arranging PUSCH occasions in an order from low to high in the frequency domain, and arranging PUSCH slot indexes in an order from low to high in the time domain; allocating one or more PUSCH occasions for multiple MCSs or TBSs, wherein $N_{POperTBS} = \text{ceil}(T_{PO}/T_{TBS})$, the matching formula between a TBS index or a MCS index and a PUSCH is that: the j-th TBS index or the j-th MCS index corresponds to the k-th PUSCH transmission resource:

jTBSindex or jMCSindex=mod (kPUSCHindex , $T_{TBS}$ or $T_{MCS}$);

or, $N_{POperTBS}$ may be allocated to each TBS index or MCS index from low to high, starting from the lowest TBS index or MCS index;

or, the number of PUSCH occasions corresponding to the MCS index or the TBS index is specified by the high-layer signaling; allocation of each TBS index or MCS index is $N_1$, $N_2, N_3 \ldots N_n$, $N_1+N_2+N_3+\ldots+N_n=T_{PO}$, from low to high, starting from the lowest TBS index or the lowest MCS index, wherein $N_{POperTBS}$ is the number of PUSCH transmission resources corresponding to each TBS or MCS, $T_{TBS}$ is the total number of TBS indexes, $T_{PO}$ is the total number of PUSCH transmission occasions within one cycle, and $T_{MCS}$ is the total number of MCS indexes.

During implementation, the configuration is performed in one or more of the following ways:

configuring uplink transmission resources and different sequence numbers of TBS indexes or MCS indexes, wherein the network side and the UE predefine mapping relationship between the sequence numbers of the TBS indexes or the MCS indexes and the uplink transmission resources; or configuring a plurality of MCS indexes that can be transmitted in any uplink transmission resource in the MSGA and different sequence numbers of TBS indexes or MCS indexes, wherein, the network does not allocate a dedicated uplink transmission resource in the MSGA for each TBS or MCS, and the network side performs blind decoding of a modulation mode on the uplink transmission resource; or, configuring uplink transmission resources, and mapping relationship between the uplink transmission resources and sequence numbers of the TBS indexes or the MCS indexes, wherein, the mapping relationship between the uplink transmission resources and the sequence numbers of the TBS indexes or the MCS indexes is notified to the UE through broadcasting.

During implementation, the mapping relationship between the TBS indexes or MCS indexes and uplink transmission resources is indicated to the UE in one or more following ways:

numbering uplink transmission resources, and predefining the mapping relationship between the TBS indexes or the MCS indexes and uplink transmission resource numbering values, and indicating the mapping relationship through the uplink transmission resource numbering values; or, predefining that TBS indexes or MCS indexes indicated through broadcast can be transmitted on any uplink transmission resource, and indicating the TBS indexes or the MCS indexes through broadcast; or, indicating the TBS indexes or the MCS indexes and the corresponding uplink transmission resources through broadcast.

During implementation, in the mapping relationship between the PRACH resources and the PUSCH resources, the PRACH resources are allocated in groups, and the PUSCH resources are allocated in groups, wherein, one group of PRACH resources corresponds to at least two groups of PUSCH resources; or, one group of PRACH resources corresponds to one group of PUSCH resources.

During implementation, when one group of PRACH resources corresponds to at least two groups of PUSCH resources, each PRACH resource in one group of PRACH resources corresponds to one PUSCH resource in each group of PUSCH resources; or, one group of PRACH resources is divided into several sub-groups of PRACH resources, and each sub-group of PRACH resources corresponds to one group of PUSCH resources.

In FIG. 21, a bus architecture may include any number of interconnected buses and bridges. Specifically, various circuits such as one or more processors represented by the processor 2100 and a memory represented by the memory 2120 linked together. The bus architecture may also link together various other circuits, such as peripherals, voltage regulators, and power management circuits, all of which are well known in the art and thus will not be described further herein. A bus interface provides the interface. The transceiver 2110 may be a plurality of elements, i.e., including a transmitter and a receiver, for providing means for communicating with various other devices over a transmission medium. The processor 2100 is responsible for managing the bus architecture and general processing, and the memory 2120 may store data used by the processor 2100 in performing operations.

Some embodiments of the present disclosure provide a random access device. The random access device includes: a network-side reception module, configured for receiving a MSGA from a terminal, wherein uplink transmission resources for transmitting the MSGA are configured by the network side, at least two uplink transmission resources exist, and uplink data blocks transmitted on each of the at least two uplink transmission resources have different sizes; the terminal selects, according to a size of a transmitted uplink data block, one of the uplink transmission resources for transmitting the MSGA; a network-side transmission module, configured for sending a MSGB to the terminal.

Details of this embodiment may be obtained by referring to specific implementation of the random access method at the network side.

For convenience of description, parts of the device described above are described separately in terms of functions divided into various modules or units. Of course, functionality of each module or unit may be implemented in one or more pieces of software or hardware when implementing the present disclosure.

Figure 22:
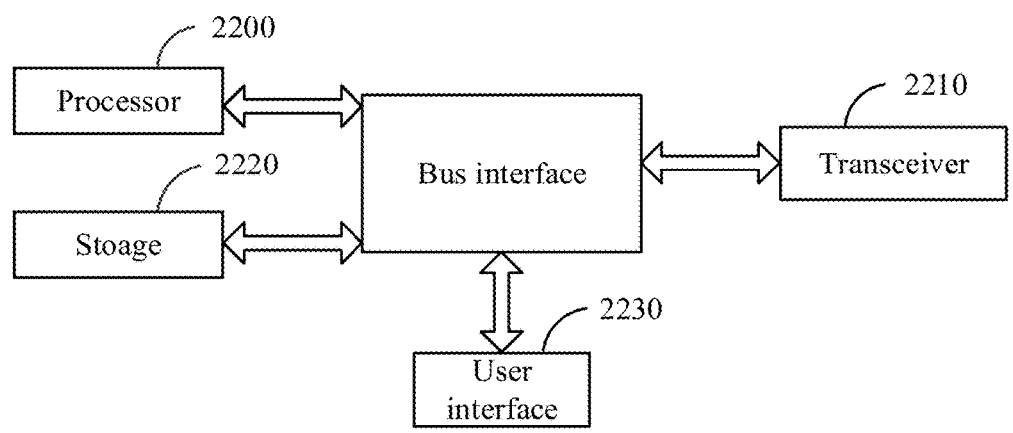
FIG. 22 is a structural schematic diagram of a UE according to some embodiments of the present disclosure.

FIG. 22 is a structural schematic diagram of a UE, as shown in the figure, the user equipment includes a processor 2200, a transceiver 2210, and a memory 2220.

The processor 2200 is configured for reading a program in the memory 2220 and performing the following steps: obtaining uplink transmission resources for sending a MSGA, wherein the uplink transmission resources for sending the MSGA are configured by a network side, and at least two uplink transmission resources exist, sizes of uplink data blocks transmitted on different uplink transmission resources are different; selecting one of the uplink transmission resources according to a size of a transmitted uplink data block; sending the MSGA to the network side on the selected uplink transmission resource.

The transceiver 2210 is configured for receiving and transmitting data under the control of the processor 2200.

During implementation, configuring uplink transmission resources at the network side includes configuring PRACH resources and PUSCH resources, and mapping relationship between PRACH resources and PUSCH resources; and allocating one or more MCSs or TBSs and time-frequency resources of uplink transmission resources corresponding to each MCS or TBS by the network side based on a size of each uplink data block.

During implementation, the mapping relationship between PRACH resources and PUSCH resources is established according to the following formula:

$$N_{preamble} = \text{ceil}(T_{preamble}/\alpha T_{PUSCH})$$

Where, ceil is a function that returns the minimum integer larger than or equal to a specified expression, $T_{PUSCH} = T_{PO} * N_{DMRSperPO}$, $T_{PO} = \text{nrofslotsMsgAPUSCH} * \text{nrofMsgAPOperSlot}$, $N_{DMRSperPO}$ is obtained from msgA-DMRS-Configuration, $N_{POperTBS} = \text{ceil}(T_{PO}/T_{TBS} \text{ or } T_{MCS})$, $N_{POperTBS}$ is the number of PUSCH transmission resources corresponding to each TBS, $T_{TBS}$ is the total number of TBS indexes, and $T_{MCS}$ is the total number of MCS indexes, where each parameter has the following meanings:

$N_{preamble}$: the number of preamble indexes or the number of PRACH resources corresponding to each PUSCH resource in one cycle;

$T_{preamble}$: the total number of preamble indexes or the total number of PRACH resources in one cycle;

$T_{PUSCH}$: the total number of PUSCH resources in one cycle;

$T_{PO}$: the total number of PUSCH transmission occasions in one cycle;

nrofslotsMsgAPUSCH: in one cycle, the total number of slots that can carry PUSCH transmissions;

nrofMsgAPOperSlot: the number of PUSCH transmission occasions in each slot;

$N_{DMRSperPO}$: the number of DMRSs included in each PUSCH transmission occasion;

α: an aggregation level of PUSCH resources in $T_{PO}$ within a cycle, which takes a value of α≤1.

During implementation, relationship that is allocated between the sequence numbers of TBS indexes or MCS index and uplink transmission resources is:

sorting the PUSCH resources by arranging PUSCH occasions in an order from low to high in a frequency domain and arranging PUSCH slot indexes in an order from low to high in a time domain;

allocating one or more PUSCH occasions for multiple MCSs or TBSs, where $N_{POperTBS} = \text{ceil} (T_{PO}/T_{TBS})$, a matching formula between a TBS index or a MCS index and a PUSCH is: the j-th TBS index or MCS index corresponds to the k-th PUSCH transmission resource:

jTBSindex or jMCSindex = mod (kPUSCHindex, $T_{TBS}$ or $T_{MCS}$); or, allocating $N_{POperTBS}$ for each TBS index or MCS index in an order from low to high, starting from the lowest TBS index or MCS index;

or, specifying the number of PUSCH occasions corresponding to the MCS index or the TBS index through a high-layer signaling, wherein allocation for each TBS index or the MCS index in an order from low to high starting from the lowest TBS index or MCS index is $N_1, N_2, N_3 \ldots N_n$, $N_1 + N_2 + N_3 + \ldots + N_n = T_{PO}$, wherein $N_{POperTBS}$ is the number of PUSCH transmission resources corresponding to each TBS or MCS, $T_{TBS}$ is the total number of TBS indexes, $T_{PO}$ is the total number of PUSCH transmission occasions within one cycle, and $T_{MCS}$ is the total number of MCS indexes.

During implementation, configuration at the network side may be determined in one or more of the following ways:

determining uplink transmission resources and TBSs or MCSs configured by the network side, according to the mapping relationship between sequence numbers of TBS indexes or MCS indexes and uplink transmission resources agreed on by the terminal and the network side in advance; or determining that the MSGA is sent on any uplink transmission resource in MSGA configured by the network side, according to the MCS index and the correspondence between sequence numbers of TBS indexes or MCS indexes and uplink transmission resources; or determining the uplink transmission resources configured by the network side, and the TBSs or MCSs, according to the mapping relationship between sequence numbers of the TBS indexes or MCS indexes and the uplink transmission resources broadcast by the network side.

During implementation, determining the uplink transmission resources and the TBSs or the MCSs configured by the network side includes: determining the TBSs or the MCSs and the PRACH resources and the PUSCH resources in the MSGA from a received broadcast signal; determining, according to the mapping relationship, the number of information bits that can be carried in each uplink transmission resource in the MSGA; selecting one of the uplink transmission resources according to a size of an uplink data block to be transmitted and determining the corresponding TBS or MCS.

During implementation, determining the uplink transmission resources and the TBSs or the MCSs configured by the network side includes: determining from a received broadcast signal the sequence numbers of the TBS indexes or the MCS indexes and the PRACH resources and the PUSCH resources in the MSGA allocated for the sequence numbers of the TBS indexes or the MCS indexes; determining the number of information bits that can be carried in each uplink transmission resource in the MSGA corresponding to each TBS index sequence number or MCS index sequence number; selecting one of the uplink transmission resources according to a size of an uplink data block to be transmitted and determining the corresponding TBS or MCS.

During implementation, determining the corresponding TBSs or MCSs includes: if the broadcast signaling includes a fixed MCS level, determining the corresponding TBSs; if the broadcast signaling includes a plurality of MCS levels, selecting one or more MCS levels that can match the RSRP and/or the SINK, and selecting the lowest MCS level as the finally transmitted MCS level, in case that the plurality of matched MCS levels exist.

During specific implementation, when a plurality of uplink transmission resources are selectable for an MCS level, the terminal randomly selects an uplink transmission resource, or selects an uplink transmission resource according to the time-frequency resource timing of the uplink transmission resource.

During implementation, the mapping relationship between the TBS indexes or MCS indexes and uplink transmission resources is determined according to indication sent by the network side in one or more following ways:

determining uplink transmission resource numbering values, and determining the mapping relationship from the uplink transmission resource numbering values, wherein the mapping relationship between TBS indexes or MCS indexes and the uplink transmission numbering values is predefined; or determining that the TBS index or the MCS index can be sent on any uplink transmission resource according to the TBS index or the MCS index indicated through broadcast, wherein, it is predefined that the TBS index or the MCS index indicated through broadcast can be sent on any uplink transmission resource; or, determining the TBS index or the MCS index and corresponding uplink transmission resource according to a broadcast indication.

During implementation, in the mapping relationship between the PRACH resources and the PUSCH resources, the PRACH resources are allocated in groups, and the PUSCH resources are allocated in groups, wherein, one group of PRACH resources corresponds to at least two groups of PUSCH resources; or, one group of PRACH resources corresponds to one group of PUSCH resources.

During, when one group of PRACH resources corresponds to at least two groups of PUSCH resources, each PRACH resource in one group of PRACH resources corresponds to one PUSCH resource in each group of PUSCH resources; or, one group of PRACH resources is divided into several sub-groups of PRACH resources, and each sub-group of PRACH resources corresponds to one group of PUSCH resources.

In FIG. 22, a bus architecture may include any number of interconnected buses and bridges. Specifically, various circuits such as one or more processors represented by the processor 2200 and a memory represented by the memory 2220 are linked together. The bus architecture may also link together various other circuits, such as peripheral devices, regulators, and power management circuits, which are well known in the art and, therefore, will not be described further herein. The bus interface provides an interface. The transceiver 2210 may be a number of elements, including a transmitter and a receiver, for providing means for communicating with various other devices over a transmission medium. For different user devices, a user interface 2230 may also be an interface that can be connected to an external or internal desired device which includes, but is not limited to, a keypad, a display, a speaker, a microphone, a joystick, etc.

The processor 2200 is responsible for managing the bus architecture and general processing, and the memory 2220 may store data used by the processor 2200 in performing operations.

Some embodiments of the present disclosure provide a random access device. The random access device includes: a terminal-side obtaining module, configured for obtaining uplink transmission resources for sending a MSGA, wherein the uplink transmission resources for sending the MSGA are configured by the network side, and at least two uplink transmission resources exist, sizes of uplink data blocks transmitted on different uplink transmission resources are different; a terminal-side selection module, configured for selecting one of the uplink transmission resources according to a size of a transmitted uplink data block; and a terminal-side transmission module, configured for sending the MSGA to the network side on the selected uplink transmission resource.

Details of this embodiment may be obtained by referring to the specific implementation of the random access method at the terminal side.

For convenience of description, parts of the device described above are described separately in terms of functions divided into various modules or units. Of course, functionality of each module or unit may be implemented in one or more pieces of software or hardware when implementing the present disclosure.

Some embodiments of the present disclosure further provide a computer-readable storage medium, which stores a program for performing the random access method described above.

Details of the computer-readable storage medium may be obtained by referring to specific implementation of the random access method on the network side and/or the terminal side.

In summary, in the technical solutions provided in some embodiments of the present disclosure, the network can support simultaneous transmissions of multiple (including more than 2) uplink data block sizes (from tens of bits to thousands of bits) for the MSGA in the 2-step RACH procedure, through network configuration or physical layer mapping. Different data blocks are allocated to one or more MCSs and corresponding time-frequency resources, and the network also configures mapping relationship between PRACH resources and PUSCH resources in the MSGA, or the mapping relationship is also predefined by the network and the terminal, and the terminal may calculate a carrying capacity of each uplink transmission resource of the MSGA according to the network configuration, and compare the calculated capacity with actual transmission data of the terminal, and find a suitable MSGA uplink transmission resource and transmit the uplink data.

Specifically, from the perspective of the network side, the network configures multiple MSGA uplink transmission resources to support simultaneous transmissions of more than two uplink data block sizes (from tens of bits to thousands of bits); the uplink transmission resources include PRACH resources and PUSCH resources, and the network configures the PRACH resources and the PUSCH resources and the mapping relationship, and allocates one or more MCSs and corresponding time-frequency resources for multiple (more than two) uplink data block sizes; the network receives the MSGA from the terminal; the network sends an MSGB to the terminal, that is, sends a random access response (RAR) to the terminal.

From the point of view of the terminal, a procedure mainly includes following three steps: the UE obtains a plurality of sets of MSGA configurations from the network side; the UE selects a set of MSGA configurations based on specific rules; the UE performs MSGA transmission according to the selected set of configurations.

Furthermore, a resource configuration scheme of the network side is specifically provided: implementation of a network resource configuration scheme by the UE; a mapping implementation scheme of MSGA resources and TBS indexes/MCS indexes; and a mapping implementation scheme of preamble resources and PUSCH resources in MSGA resources.

By using the solutions of the present application, the network can support multiple transmission blocks to be transmitted at the same time in the random access procedure, and the terminal in the non-connected state can flexibly select uplink transmission resources in MSGA to transmit data, according to a data block size required by a data service of the terminal and the channel condition.

The solutions provide more flexibility for allocation of random access resources at the network side, and improve a network resource utilization efficiency of the terminal in the non-connected state, and at the same time, the transmission of different data block sizes (from several tens of bits to thousands of bits) of the terminal in the non-connected state is supported, and requirements of different services of the terminal are met.

Those skilled in the art will appreciate that the embodiments of the present disclosure may be provided as methods, systems, or computer program products. Accordingly, the present disclosure may take the form of a hardware embodiment, a software embodiment, or an embodiment combining software and hardware aspects. The present disclosure may take the form of a computer program product implemented on one or more computer usable storage media (including, but not limited to, a disk storage, an optical storage, and the like) having computer usable program codes embodied therein.

Each module, unit, sub-unit, or sub-module may be one or more integrated circuits configured to implement the above methods, such as one or more Application Specific Integrated Circuits, or, one or more microprocessors (digital signal processor, DSP), or one or more Field Programmable Gate Array (FPGA), etc. In another example, when one of the above modules is implemented in the form of a process element invoking a program code, the processing element may be a general purpose processor such as a Central Processing Unit (CPU) or another processor that can call a program code. As another example, these modules may be integrated together and implemented in the form of a system-on-a-chip (SOC).

The present disclosure is described with reference to flowcharts and/or block diagrams of methods, apparatus (systems), and computer program products according to the embodiments of the present disclosure. It is to be understood that each flow and/or each block in a flow chart and/or a block diagram, and combinations of flows and/or blocks in a flow chart and/or block diagram, may be implemented by computer program instructions. These computer program instructions may be provided to a processor of a general purpose computer, a special purpose computer, an embedded processor or other programmable data processing devices to produce a machine, so that by using a processor of a computer or other programmable data processing device to execute the instructions, a means for implementing the functions specified in one or more flows in a flow chart and/or one or more blocks in a block diagram is generated.

These computer program instructions may also be stored in a computer-readable memory capable of directing a computer or other programmable data processing device to operate in a particular manner, so that instructions stored in the computer-readable memory produce an article of manufacture including an instruction device, the instruction device implements a function specified in one or more flows of the flowchart and one or more blocks of the block diagram.

These computer program instructions may also be loaded onto a computer or other programmable data processing devices, such that a series of operational steps are performed on the computer or other programmable devices to produce a computer-implemented process, and the instructions executed on a computer or other programmable devices provide steps for implementing the functions specified in one or more flows in the flow chart and/or one or more blocks of the block diagram.

It will be apparent to those skilled in the art that various modifications and variations can be made to the present disclosure without departing from the spirit and scope of the present disclosure. Thus, the present disclosure is intended to include such modifications and variations if the modifications and variations fall within the scope of the claims of the present disclosure and their equivalents.

What is claimed is:

1. A random access method, comprising:
receiving a message A (MSGA) from a terminal by a network side, wherein, configuring uplink transmission resources for sending the MSGA is performed by the network side, at least two uplink transmission resources exist, and sizes of uplink data blocks transmitted on the at least two uplink transmission resources are different, wherein an uplink transmission resource, for sending the MSGA, of the uplink transmission resources is selected by the terminal according to a size of a transmitted uplink data block;
sending a message B (MSGB) to the terminal by the network side,
wherein configuring the uplink transmission resources by the network side comprises:
configuring Physical Random Access Channel (PRACH) resources and Physical Uplink Shared Channel (PUSCH) resources, and mapping relationship between the PRACH resources and the PUSCH resources; and
allocating one or more Modulation and Coding Schemes (MCSs) or Transport Block Sizes (TBSs) and time-frequency resources of uplink transmission resources corresponding to the one or more MCSs or TBSs based on a size of each uplink data block,
wherein the mapping relationship between the PRACH resources and the PUSCH resources is established according to a following formula:

$$N_{preamble} = \text{ceil}(T_{preamble} / \alpha T_{PUSCH})$$

wherein, ceil is a function that returns a minimum integer larger than or equal to a specified expression, $T_{PUSCH} = T_{PO} * N_{DMRSperPO}$, $T_{PO} = \text{nrofslotsMsgAPUSCH} * \text{nrofMsgAPOperSlot}$, $N_{DMRSperPO}$ is obtained from msgA-DMRS-Configuration, $N_{POperTBS} = \text{ceil}(T_{PO}/T_{TBS} \text{ or } T_{MCS})$ $N_{POperTBS}$ is a quantity of PUSCH transmission resources corresponding to each TBS, $T_{TBS}$ is a total quantity of TBS indexes, and $T_{MCS}$ is a total quantity of MCS indexes, wherein the parameters have the following meanings:
$N_{preamble}$: a quantity of random access preamble (Preamble) indexes or a quantity of PRACH resources corresponding to each PUSCH resource in one cycle;
$T_{preamble}$: a total quantity of Preamble indexes or a total quantity of PRACH resources in one cycle;
$T_{PUSCH}$: a total quantity of PUSCH resources in one cycle;
$T_{PO}$: a total quantity of PUSCH transmission occasions in one cycle;
nrofslotsMsgAPUSCH: in one cycle, a total quantity of slots that can carry PUSCH transmissions;
nrofMsgAPOperSlot: a quantity of PUSCH transmission occasions in each slot;
$N_{DMRSperPO}$: a quantity of Demodulation Reference Signals (DMRS) comprised in each PUSCH transmission occasion;
α: an aggregation level of PUSCH resources in $T_{PO}$ within a cycle, which takes a value of $\alpha \le 1$;
and/or
wherein allocated relationship between sequence numbers of TBS indexes or MCS indexes and uplink transmission resources is:
sorting PUSCH resources, by arranging PUSCH occasions in an order from low to high in a frequency domain and arranging PUSCH slot indexes in an order from low to high in a time domain;
allocating one or more PUSCH occasions for multiple MCSs or TBSs, wherein,
allocating one or more PUSCH occasions for multiple MCSs or TBSs comprises one or more of following:
configuring $N_{POperTBS} = \text{ceil}(T_{PO}/T_{TBS})$, wherein a matching formula between a TBS index or a MCS index and a PUSCH is that: a j-th TBS index or a j-th MCS index corresponds to a k-th PUSCH transmission resource:

jTBSindex or jMCSindex=mod (kPUSCHindex, $T_{TBS}$ or $T_{MCS}$);

or, allocating $N_{POperTBS}$ to each TBS index or MCS index from low to high, starting from a lowest TBS index or MCS index;

or, specifying a quantity of PUSCH occasions corresponding to MCS indexes or TBS indexes by a high-layer signaling, wherein allocation to each TBS index or MCS index is $N_1, N_2, N_3, \ldots N_n$, $N_1+N_2+N_3+\ldots+N_n=T_{PO}$, from low to high, starting from a lowest TBS index or a lowest MCS index, wherein $N_{POperTBS}$ is a quantity of PUSCH transmission resources corresponding to each TBS or MCS, $T_{TBS}$ is a total quantity of TBS indexes, $T_{PO}$ is a total quantity of PUSCH transmission occasions within one cycle, and $T_{MCS}$ is a total quantity of MCS indexes.

2. A random access method, comprising:

obtaining uplink transmission resources for sending a MSGA by a terminal side, wherein configuring the uplink transmission resources for sending the MSGA is performed by a network side, at least two uplink transmission resources exist, sizes of uplink data blocks transmitted on different uplink transmission resources are different;

selecting one of the uplink transmission resources according to a size of a transmitted uplink data block;

sending the MSGA to the network side on the selected uplink transmission resource, wherein configuring uplink transmission resources comprises:

configuring PRACH resources and PUSCH resources and mapping relationship between the PRACH resources and PUSCH the resources; and allocating one or more MCSs or TBSs and time-frequency resources of uplink transmission resources corresponding to each MCS or TBS based on a size of each uplink data block, wherein the mapping relationship between PRACH resources and PUSCH resources is determined by the terminal according to the following formula:

$$N_{preamble}=\text{ceil}(T_{preamble}/\alpha T_{PUSCH})$$

wherein, ceil is a function that returns a minimum integer larger than or equal to a specified expression, $T_{PUSCH}=T_{PO}*N_{DMRSperPO}$, $T_{PO}$=nrofslotsMsgAPUSCH*nrofMsgAPOperSlot, $N_{DMRSperPO}$ is obtained from msgA-DMRS-Configuration, $N_{POperTBS}$=ceil($T_{PO}/T_{TBS}$ or $T_{MCS}$) $N_{POperTBS}$ is a quantity of PUSCH transmission resources corresponding to each TBS, $T_{TBS}$ is a total quantity of TBS indexes, and $T_{MCS}$ is a total quantity of MCS indexes, wherein the parameters have the following meanings:

$N_{preamble}$: a quantity of random access preamble (Preamble) indexes or a quantity of PRACH resources corresponding to each PUSCH resource in one cycle;

$T_{preamble}$: a total quantity of Preamble indexes or a total quantity of PRACH resources in one cycle;

$T_{PUSCH}$: a total quantity of PUSCH resources in one cycle;

$T_{PO}$: a total quantity of PUSCH transmission occasions in one cycle;

nrofslotsMsgAPUSCH: in one cycle, a total quantity of slots that can carry PUSCH transmissions;

nrofMsgAPOperSlot: a quantity of PUSCH transmission occasions in each slot;

$N_{DMRSperPO}$: a quantity of DMRSs comprised in each PUSCH transmission occasion;

α: an aggregation level of PUSCH resources in $T_{PO}$ within a cycle, which takes a value of $\alpha \leq 1$;

and/or wherein allocated relationship between sequence numbers of TBS indexes or MCS indexes and uplink transmission resources is:

sorting PUSCH resources, by arranging PUSCH occasions in an order from low to high in a frequency domain and arranging PUSCH slot indexes in an order from low to high in a time domain;

allocating one or more PUSCH occasions for multiple MCSs or TBSs, wherein, allocating one or more PUSCH occasions for multiple MCSs or TBSs comprises one or more of following:

configuring $N_{POperTBS}$=ceil ($T_{PO}/T_{TBS}$), wherein a matching formula between a TBS index or a MCS index and a PUSCH is that: a j-th TBS index or a j-th MCS index corresponds to a k-th PUSCH transmission resource:

jTBSindex or jMCSindex=mod (kPUSCHindex, $T_{TBS}$ or $T_{MCS}$);

or, allocating $N_{POperTBS}$ to each TBS index or MCS index from low to high, starting from a lowest TBS index or MCS index;

or, specifying a quantity of PUSCH occasions corresponding to MCS indexes or TBS indexes by a high-layer signaling, wherein allocation to each TBS index or MCS index is $N_1, N_2, N_3, \ldots N_n$, $N_1+N_2+N_3+\ldots+N_n=T_{PO}$, from low to high, starting from a lowest TBS index or a lowest MCS index, wherein $N_{POperTBS}$ is a quantity of PUSCH transmission resources corresponding to each TBS or MCS, $T_{TBS}$ is a total quantity of TBS indexes, $T_{PO}$ is a total quantity of PUSCH transmission occasions within one cycle, and $T_{MCS}$ is a total quantity of MCS indexes.

3. The method according to claim 2, wherein configuration performed by the network side is determined in one or more of the following ways:

determining uplink transmission resources and TBSs or MCSs configured by the network side by the terminal, according to the mapping relationship between sequence numbers of TBS indexes or MCS indexes and uplink transmission resources agreed on by the terminal and the network side in advance; or determining by the terminal that the MSGA is sent on any uplink transmission resource in the MSGA configured by the network side, according to the MCS index and correspondence between the sequence numbers of TBS indexes or MCS indexes and the uplink transmission resources; or determining the uplink transmission resources and the TBSs or MCSs configured by the network side by the terminal, according to the mapping relationship between the sequence numbers of TBS indexes or MCS indexes and the uplink transmission resources broadcast by the network side.

4. The method according to claim 3, wherein determining the uplink transmission resources and the TBSs or the MCSs configured by the network side by the terminal comprises:
   determining the TBSs or the MCSs and the PRACH resources and the PUSCH resources in the MSGA from a received broadcast signaling;
   determining, according to the mapping relationship, a quantity of information bits carried in each uplink transmission resource in the MSGA;
   selecting one of the uplink transmission resources according to a size of an uplink data block to be transmitted and the quantity of information bits carried in each uplink transmission and determining a corresponding TBS or MCS.

5. The method according to claim 4, wherein determining the corresponding TBS or MCS by the terminal comprises:
   if the broadcast signaling comprises a fixed MCS level, determining the corresponding TBS by the terminal;
   if the broadcast signaling comprises a plurality of MCS levels, selecting one or more MCS levels that can match a RSRP and/or a SINR, and selecting a lowest MCS level as a finally transmitted MCS level, in case that a plurality of matched MCS levels exist.

6. The method according to claim 5, wherein, when a plurality of uplink transmission resources are selectable for an MCS level, the terminal randomly selects an uplink transmission resource from the plurality of uplink transmission resources, or selects an uplink transmission resource according to time-frequency resource timing of the uplink transmission resources.

7. A base station, comprising:
   a processor configured for reading a program in a memory to perform the steps of the method according to claim 1;
   a transceiver configured for receiving and transmitting data under the control of the processor.

8. A user equipment, comprising:
   a processor configured for reading a program in a memory to perform the following:
      obtaining uplink transmission resources for sending a MSGA, wherein configuring the uplink transmission resources for sending the MSGA is performed by a network side, at least two uplink transmission resources exist, sizes of uplink data blocks transmitted on different uplink transmission resources are different;
      selecting one of the uplink transmission resources according to a size of a transmitted uplink data block;
      sending the MSGA to a network side on the selected uplink transmission resource;
   a transceiver configured for receiving and transmitting data under the control of the processor,
   wherein configuring uplink transmission resources comprises:
   configuring PRACH resources and PUSCH resources and mapping relationship between the PRACH resources and PUSCH the resources; and
   allocating one or more MCSs or TBSs and time-frequency resources of uplink transmission resources corresponding to each MCS or TBS based on a size of each uplink data block,
   wherein the mapping relationship between PRACH resources and PUSCH resources is determined by the terminal according to the following formula:

$N_{preamble} = \text{ceil}(T_{preamble}/\alpha T_{PUSCH})$ where, ceil is a function that returns a minimum integer larger than or equal to a specified expression, $T_{PUSCH} = T_{PO} * N_{DMRSperPO}$,
$T_{PO} = \text{nrofslotsMsgAPUSCH} * \text{nrofMsgAPOperSlot}$,
$N_{DMRSperPO}$ is obtained from msgA-DMRS-Configuration, $N_{POperTBS} = \text{ceil}(T_{PO}/T_{TBS}$ or $T_{MCS})$, $N_{POperTBS}$ is a quantity of PUSCH transmission resources corresponding to each TBS, $T_{TBS}$ is a total quantity of TBS indexes, and $T_{MCS}$ is a total quantity of MCS indexes, wherein the parameters have the following meanings:

$N_{preamble}$: a quantity of Preamble indexes or a quantity of PRACH resources corresponding to each PUSCH resource in one cycle;

$T_{preamble}$: a total quantity of Preamble indexes or a total quantity of PRACH resources in one cycle;

$T_{PUSCH}$: a total quantity of PUSCH resources in one cycle;

$T_{PO}$: a total quantity of PUSCH transmission occasions in one cycle;

nrofslotsMsgAPUSCH: in one cycle, a total quantity of slots that can carry PUSCH transmissions;

nrofMsgAPOperSlot: a quantity of PUSCH transmission occasions in each slot;

$N_{DMRSperPO}$: a quantity of DMRSs comprised in each PUSCH transmission occasion;

$\alpha$: an aggregation level of PUSCH resources in $T_{PO}$ within a cycle, which takes a value of $\alpha \leq 1$, and/or, wherein allocated relationship between sequence numbers of TBS indexes or MCS indexes and uplink transmission resources is:
   sorting PUSCH resources, by arranging PUSCH occasions in an order from low to high in a frequency domain and arranging PUSCH slot indexes in an order from low to high in a time domain;
   allocating one or more PUSCH occasions for multiple MCSs or TBSs, wherein,
allocating one or more PUSCH occasions for multiple MCSs or TBSs comprises one or more of following:
   configuring $N_{POperTBS} = \text{ceil}(T_{PO}/T_{TBS})$, wherein a matching formula between a TBS index or a MCS index and a PUSCH is that: a j-th TBS index or a j-th MCS index corresponds to a k-th PUSCH transmission resource:
   jTBSindex or jMCSindex = mod (kPUSCHindex, $T_{TBS}$ or $T_{MCS}$);
   or,
   allocating $N_{POperTBS}$ to each TBS index or MCS index from low to high, starting from a lowest TBS index or MCS index;
   or,
   specifying a quantity of PUSCH occasions corresponding to MCS indexes or TBS indexes by a high-layer signaling, wherein allocation to each TBS index or MCS index is $N_1, N_2, N_3 \ldots N_n$, $N_1+N_2+N_3+\ldots+N_n=T_{PO}$, from low to high, starting from a lowest TBS index or a lowest MCS index,
   wherein $N_{POperTBS}$ is a quantity of PUSCH transmission resources corresponding to each TBS or MCS, $T_{TBS}$ is a total quantity of TBS indexes, $T_{PO}$ is a total quantity of PUSCH transmission occasions within one cycle, and $T_{MCS}$ is a total quantity of MCS indexes.

9. The user equipment according to claim 8, wherein configuration performed by the network side is determined in one or more of the following ways:

determining uplink transmission resources and TBSs or MCSs configured by the network side by the terminal, according to the mapping relationship between sequence numbers of TBS indexes or MCS indexes and uplink transmission resources agreed on by the terminal and the network side in advance; or determining by the terminal that the MSGA is sent on any uplink transmission resource in the MSGA configured by the network side, according to the MCS index and correspondence between the sequence numbers of TBS indexes or MCS indexes and the uplink transmission resources; or determining the uplink transmission resources and the TBSs or MCSs configured by the network side by the terminal, according to the mapping relationship between the sequence numbers of TBS indexes or MCS indexes and the uplink transmission resources broadcast by the network side.

10. The user equipment according to claim 9, wherein determining the uplink transmission resources and the TBSs or the MCSs configured by the network side by the terminal comprises:

determining the TBSs or the MCSs and the PRACH resources and the PUSCH resources in the MSGA from a received broadcast signaling;

determining, according to the mapping relationship, a quantity of information bits carried in each uplink transmission resource in the MSGA;

selecting one of the uplink transmission resources according to a size of an uplink data block to be transmitted and the quantity of information bits carried in each uplink transmission and determining a corresponding TBS or MCS.

11. The user equipment according to claim 10, wherein determining the corresponding TBS or MCS by the terminal comprises:

if the broadcast signaling comprises a fixed MCS level, determining the corresponding TBS by the terminal;

if the broadcast signaling comprises a plurality of MCS levels, selecting one or more MCS levels that can match a RSRP and/or a SINR, and selecting a lowest MCS level as a finally transmitted MCS level, in case that a plurality of matched MCS levels exist.

12. The user equipment according to claim 11, wherein, when a plurality of uplink transmission resources are selectable for an MCS level, the terminal randomly selects an uplink transmission resource from the plurality of uplink transmission resources, or selects an uplink transmission resource according to time-frequency resource timing of the uplink transmission resources.

* * * * *